US012607874B2

(12) United States Patent
Muschielok et al.

(10) Patent No.: US 12,607,874 B2
(45) Date of Patent: Apr. 21, 2026

(54) CALCULATION OF OPHTHALMOLOGICAL LENSES

(71) Applicant: Rodenstock GmbH, Munich (DE)

(72) Inventors: Adam Muschielok, Munich (DE); Helmut Altheimer, Baisweil-Lauchdorf (DE); Patrick Kerner, Oberhaching (DE); Martin Zimmermann, Kleinberghofen (DE); Leo Schmid, Diessen (DE)

(73) Assignee: Rodenstock GmbH, Munich (DE)

( * ) Notice: Subject to any disclaimer, the term of this patent is extended or adjusted under 35 U.S.C. 154(b) by 552 days.

(21) Appl. No.: 18/040,943

(22) PCT Filed: Aug. 4, 2021

(86) PCT No.: PCT/EP2021/071710
§ 371 (c)(1),
(2) Date: Feb. 7, 2023

(87) PCT Pub. No.: WO2022/029150
PCT Pub. Date: Feb. 10, 2022

(65) Prior Publication Data
US 2023/0296918 A1 Sep. 21, 2023

(30) Foreign Application Priority Data
Aug. 7, 2020 (DE) .......................... 102020004840.4

(51) Int. Cl.
*G02C 7/02* (2006.01)
(52) U.S. Cl.
CPC ..................................... *G02C 7/028* (2013.01)
(58) Field of Classification Search
CPC ........ G02C 7/028; G02C 7/024; G02C 7/025; G02C 7/027; G02C 7/02; G02C 7/061;
(Continued)

(56) References Cited

U.S. PATENT DOCUMENTS 5,724,258 A 3/1998 Roffman
6,466,924 B1 * 10/2002 Tateishi ................... G06N 3/02
706/15
(Continued)

FOREIGN PATENT DOCUMENTS

DE 69716994 T2 7/2003
DE 102007062929 A1 7/2009
(Continued)

OTHER PUBLICATIONS

Apr. 18, 2025 (CN) Office Action—App. 202580063368.0.
(Continued)

*Primary Examiner* — Travis S Fissel
(74) *Attorney, Agent, or Firm* — Banner & Witcoff, Ltd.

(57) ABSTRACT

Method for determining a surface model for calculating a surface of an ophthalmic lens from a set of order parameters for the lens or from variables depending on the order parameters. The method includes providing a training data set having order parameter sets; providing a target value of a property of the lens for each of the order parameter sets; providing a surface model with parameters; and determining optimized values for the parameters using the provided target values by optimizing the values for the parameters by minimizing/maximizing a target function for the parameters. The target function for the parameters for each of the order parameter sets has a term which assumes a minimum/ maximum when the provided target value coincides with the value of the same property of a lens which is calculatable with the surface model for given values of the parameters for the corresponding order parameter set.

23 Claims, 28 Drawing Sheets

Figure 1:
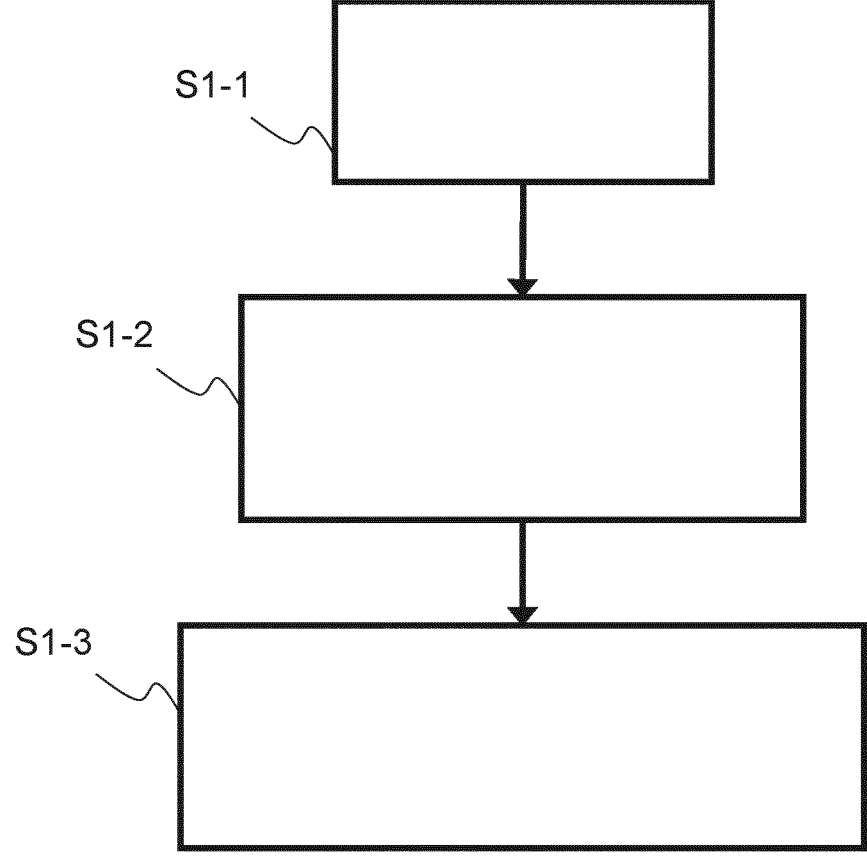

(58) Field of Classification Search
CPC ........ G02C 2202/22; G06N 3/00; G06N 3/02;
G06N 3/0464; G06N 3/08
See application file for complete search history.

(56) References Cited

U.S. PATENT DOCUMENTS

| | | |
|---|---|---|
| 8,733,931 B2 | 5/2014 | Mousset et al. |
| 10,018,854 B2 | 7/2018 | Crespo et al. |
| 10,410,118 B2 | 9/2019 | Xiong et al. |
| 2003/0090623 A1* | 5/2003 | Rubinstein ............. G02C 7/061 351/159.74 |
| 2011/0051082 A1 | 3/2011 | Becken et al. |
| 2012/0281183 A1 | 11/2012 | Mousset et al. |
| 2017/0024642 A1 | 1/2017 | Xiong et al. |
| 2017/0045755 A1 | 2/2017 | Mizuno et al. |
| 2017/0371178 A1 | 12/2017 | Crespo et al. |
| 2022/0004025 A1* | 1/2022 | Piraube ................... G06N 3/04 |

FOREIGN PATENT DOCUMENTS

| | | |
|---|---|---|
| JP | H1068913 A | 3/1998 |
| JP | 2011508271 A | 3/2011 |

OTHER PUBLICATIONS

Mar. 28, 2024 (JP) Office Action—App. 2023-508061 (w/English Translation).
Dec. 3, 2021 (PCT) International Search Report and Written Opinion—App. PCT/EP2021/071710.
Apr. 17, 2024 (DE) Examination Report—App. 102020004840.4.

\* cited by examiner

S3-1

S3-2

S3-3

S3-4

S5-1

S5-2

S5-3

S5-4

S5-5

S6-1

S6-2

S6-3

S6-4

S6-5

Correlation of the rear face curvature 1

Correlation of the rear face curvature 2

Correlation of vertex power 1

Difference of vertex power of principal section 1 (model - test data) / dpt

Correlation of vertex power 2

Correlation of the center thickness

Deviation of the vertex power in the principal section 1

Difference of the vertex power of principal section 1 (model - prior art) / dpt

Deviation of the vertex power in the principal section 2

Difference of the vertex power of principal section 2 (model - prior art) / dpt

CALCULATION OF OPHTHALMOLOGICAL LENSES

The present invention relates to a method for determining a surface model, a method for determining at least one surface of at least one ophthalmic lens with the aid of a surface model, and a corresponding production method. The invention also relates to corresponding computer program products and devices.

In the calculation of ophthalmic lenses, such as spectacle lenses, one object is to calculate the shape of the surface of an ophthalmic lens or of a lens pair, as well as their location (i.e. orientation and position), with respect to one another so that they have defined geometric properties (for example predetermined thicknesses at defined points of the lens) and optical properties that are adapted to the later wear situation (for example adaptation, in an optical and possibly also physiological regard, to the eye or pair of eyes looking through the ophthalmic lenses).

Examples of ophthalmic lenses are contact lenses and spectacle lenses, for example unifocal lenses and contact lenses, multifocal spectacle lenses and multifocal contact lenses, and spectacle lenses having a variable refractive power (for example varifocal lenses).

Given conventional spectacle lenses, the manner of the adaptation is mostly limited to the ametropia of the eyes, the index of refraction of the material used for the lenses, and the size and/or shape of the edge of the spectacle lens. The ametropia may include sphere, cylinder, and axis, possibly an addition or a near refraction, and/or a prismatic prescription.

Given what are known as individualized spectacle lenses, individual parameters—such as orientation and distance of the spectacle lenses from the viewing eye (given via centering parameters), distance or location of the eye's center of rotation with respect to the lenses and/or to one another, individual object distances at defined observation points (for example reference points) in the spectacle lens, as well as the individual position of these observation points in the glass—are added as additional parameters.

Given personalized spectacle lenses, additional parameters may be added, for example the viewing situation specifically provided for the spectacle lens, the viewing behavior (for example the interaction of head and eye deflection), biometric parameters which describe the eye (for example wavefront errors including higher orders (for example as a Zernike coefficient set), pupil sizes and/or positions given different viewing directions, eye length, curvatures and positions of the refractive surfaces of the eye, index of refraction of the media), or other parameters specific to the provided wearer.

The shape of the surfaces of an ophthalmic lens is often described as a freeform surface which, for example, can be parameterized by a set of what are known as rises. Other local representations, such as a spline representation, or non-local representations, for example a Zernike decomposition, are also possible. If one of the surfaces is a comparatively simple surface, for example a sphere, only its curvature or what is known as a basic curve may be indicated for this.

Examples of order parameters are found in the established standards for spectacle lenses (cf., for example, EU Guideline 93/42/EWG regarding medical products).

Overall, given the calculation of ophthalmic lenses from a set of order parameters, there is thus an object to calculate a set of surface parameters with which the ophthalmic lens or a lens pair may be produced.

Given conventional spectacle lenses, this may occur via direct calculation of surface parameters (for example via a superposition of a determined surface determined for one product with another surface, in order to adjust the prescription at a reference point or measurement point). Given individualized or personalized spectacle lenses, an optimization is often used for which the shape and location of the starting surfaces as well as one or more target functions to be optimized are necessary.

Such starting surfaces may either be kept constant for a plurality of order parameters, or a plurality of starting surfaces belonging to different order parameter sets may be interpolated and/or extrapolated.

Examples of optimization methods using target functions are described in, for example, EP 1 091 233, DE 10 2012 000 390, EP 2 384 479, EP 2 177 943.

Exemplary methods by means of a direct calculation are described in EP 0 654 692 A1 or U.S. Pat. No. 4,514,061 A. An example of a calculation via interpolation is described in EP 2 449 420.

A disadvantage of the conventional calculation methods for ophthalmic lenses is that, with an increasing number of order parameters, either a direct calculation (for example via superposition) is no longer possible or is linked with quality losses, or the computation time for an optimization pass becomes increasingly longer, since the target functions evaluated in the optimization become more complex.

There are, in fact, methods—for example those described in EP 0 654 692 A1 or U.S. Pat. No. 4,514,061 A (Winthrop)—which directly calculate the surfaces of the ophthalmic lenses from a set of a few parameters with low computation cost. However, these methods cannot be used to calculate the ophthalmic lenses that are typical nowadays, since with said methods it is only possible to calculate determined families of surfaces which are optimal using criteria that are no longer up to date (for example optimization of a varifocal lens using the surface properties and not using the usage position properties).

Calculations of ophthalmic lenses, especially the computationally intensive optimization of individualized or personalized spectacle lenses, are normally newly implemented every time, even if ophthalmic lenses have identical or very similar order parameters, and therefore the surfaces of the ophthalmic lenses so calculated are identical or similar. Such calculations are typically implemented in the production of ophthalmic lenses (in order to determine the surfaces to be produced, in the creation of the design of ophthalmic lenses, or in order to check if it is possible to produce an ophthalmic lens using geometric properties of the surfaces). They are also used in consultation (for example at an optician) in order to clarify the optical and geometric properties of an individualized or personalized ophthalmic lens of the future wearer of such a lens (for example position of the zones of clear seeing and thicknesses given varifocal lenses). In order to keep wait times short, in this specific application the calculations must be concluded in a short time.

In EP 2 449 420, a method is disclosed with the aid of which a fast calculation of the surfaces of spectacle lenses may be implemented by means of interpolation of already optimized surfaces in the order parameter space. However, for this method the change of the surfaces depending on the order parameters must be pre-calculated, which leads to a high storage requirement, or else must be repeated again at every calculation, which in turn leads to a longer computation time.

It is an object of the invention to reduce the computation cost necessary for the calculation of ophthalmic lenses, with a simultaneous reduction of the storage requirement. This enables a faster calculation of ophthalmic lenses that requires less computing capacity, and therefore is more advantageous.

This object is achieved via a computer-implemented method, a corresponding device, and a corresponding computer program product for producing a surface model; a computer-implemented method for determining at least one surface of at least one ophthalmic lens, a corresponding device, and a corresponding computer program product; a method for and a corresponding device for producing an ophthalmic lens with the features indicated in the respective independent claims.

According to a first aspect, a computer-implemented method is provided for determining a surface model for calculating at least one surface of at least one ophthalmic lens (for example a contact lens or a spectacle lens) from a set of order parameters for the at least one ophthalmic lens and/or from variables depending on the order parameters (such as variables derived from the order parameters, for example).

The "calculation of at least one surface of an ophthalmic lens" in the sense of the present application includes the calculation of at least one portion of a surface or of a part of a surface. Expressed in a different way, what is understood by a "calculation of at least one surface of an ophthalmic lens" is a calculation of at least one portion of the surface, or a calculation of the entire surface.

The at least one ophthalmic lens may be an individual lens. It is likewise possible to calculate one or both lenses of a pair of ophthalmic lenses. For example, at least one pair of ophthalmic lenses (lens pair) which comprises lenses designated for the right eye and left eye of a person may be calculated with the surface model. In this instance, order values for both lenses of the lens pair (such as for the left and right spectacle lens of a spectacle lens pair, as well as binocular order data, for example) may be contained in the set of order parameters (order parameter set).

The at least one surface calculated according to the surface model may be described parametrically by at least one parameter. The calculation of the surface with the aid of the surface model in this instance comprises the calculation of the at least one parameter of the surface (surface parameter) from the order parameter or from variables (auxiliary variables) which are dependent on the order parameters (such as variables which are derived from the order parameters, for example).

The surface may, for example, be described by the curvature or the primary curvatures at least at one point, for example a reference point of the ophthalmic lens, as well as by a surface normal and, if applicable, the orientation of the principal sections. It is also possible to describe the surface by means of a local representation, for example a spline representation or a polynomial representation with the corresponding coefficients, or a non-local representation such as, for example, a Zernike decomposition with the corresponding coefficients.

It is likewise possible to directly provide the surface, for example via a set of rises at a plurality of raster points. In this instance, the calculation of the surface with the aid of the surface model comprises the calculation of the rises of the surface at a plurality of raster points from the order parameters or from variables (auxiliary variables) which are dependent on the order parameters (for example are derived from the order parameters).

In one example, one of the surfaces of the ophthalmic lens and/or the arrangement of this surface relative to another surface of the ophthalmic lens is calculated from the order parameter set with the aid of the surface model. The other surface may be a predetermined surface, for example a spherical surface having a predetermined curvature, that may be dependent on the order parameters (for example, given a known basic curve system). In another example, both surfaces of the ophthalmic lens and/or their arrangement relative to one another (i.e., orientation and/or position) are calculated from the order parameter set with the aid of the surface model.

The calculation of the at least one surface from the set of order parameters for the ophthalmic lens with the aid of the surface model preferably takes place directly (i.e., without iteration) or with few iteration steps, for example with fewer than 30, 25, 15, 10, 5, or 3 iteration steps.

The ophthalmic lens whose at least one surface is calculated from a determined order parameter set with the aid of the surface model is designated, within the scope of the application, as a lens calculated from this order parameter set according to the surface model. As stated above, the lens calculated according to the surface model may be one of the lenses of a lens pair. In this instance, one or both lenses of the lens pair may be calculated according to the surface model. The ophthalmic lens may, for example, be a spectacle lens, for example an individualized and/or personalized spectacle lens. Given an individualization of a spectacle lens, for example, the orientation of the spectacle lens in front of the eye of the user is taken into account in the calculation or optimization of the spectacle lens. The orientation of the spectacle lens may, for example, be characterized by the pantoscopic tilt, the face form angle, the pupillary distance, the corneal vertex distance, and/or further parameters. Given a personalization, for example, an adaptation of the perceived design may be performed in order to satisfy a personal intended use of a pair of spectacles. The spectacle lens may, for example, be a unifocal spectacle lens, a multifocal spectacle lens, or a progressive spectacle lens.

The surface model may be a parameterized model. The surface model may comprise at least one variable parameter. The surface model may also have at least one constant parameter (such as, for example, the position(s) of the evaluation points in the lens).

The method for determining a surface model comprises the steps of:

providing a training data set comprising a plurality of order parameter sets which respectively include values of at least a portion of the parameters necessary for ordering at least one ophthalmic lens;

providing at least one target value of at least one predetermined property of the at least one ophthalmic lens for each of the order parameter sets in the training data set;

providing at least one surface model parameterized by model parameters, with which—for given values of the model parameters—at least one surface of at least one ophthalmic lens can be calculated at least from an order parameter set and/or from variables derived from an order parameter set (providing an initial surface model and possibly an initial parameterization of the surface model), obtaining the surface model for the calculation of at least one surface of at least one ophthalmic lens, comprising:

determining optimized values for the model parameters of the at least one surface model using the provided target values.

The determining of optimized values for the model parameters of the at least one surface model may comprise:

optimizing the values of the model parameters of the at least one surface model (optimizing the parameterization of the surface model), with the aim of minimizing or maximizing a target function for the model parameters of the at least one surface model, said target function depending at least on the model parameters and on the provided target values.

The target function for the model parameters for each of the order parameter sets contains at least one term which assumes a minimum or maximum when the provided target value of the at least one property of the at least one ophthalmic lens for the respective order parameter set coincides with the value of the same property of at least one lens which can be or is calculated with the surface model for given values of the model parameters of the surface model for the corresponding order parameter set.

If the at least one lens is one of the lenses of a pair of lenses, the plurality of order parameter sets may include respective values of a portion of the parameters necessary for ordering the pair of lenses. The at least one property may be a binocular property of the pair of lenses.

For example, at least one lens pair which comprises lenses determined for the right eye and left eye of a person may be calculated with the surface model. In this instance, the order parameter sets contain order parameters for a right lens and a left lens, respectively. The properties for which target values have been provided may also comprise at least one binocular property depending on the surface data of the left and right lens. The target values for the at least one binocular property may comprise values into the calculation of which enters at least one property (for example a surface property) at a first point of a first lens of a lens pair and the same property at a second point of a second lens of the same lens pair.

An initial complexity of the surface model may optionally also be provided. For example, an initial number of model parameters may be predetermined.

Optionally, the complexity of the surface model may also be optimized or set in addition to the parameterization of the surface model. The optimization of the complexity of the surface model may, for example, comprise a variation of the number of model parameters and/or a regularization.

For example, the providing of at least one surface model parameterized by model parameters comprises the providing of at least two surface models of differing complexity, wherein the complexity of a surface model comprises one or more of the following variables:

type and/or number of the order parameters used in the model;

type and/or number of the variables depending on order parameters;

number of model parameters;

type and/or strength of a regularization of the target function used in the optimization of the model parameters.

The method may further comprise:

providing a validation data set comprising a plurality of order parameter sets which respectively include values of at least a portion of the parameters necessary for ordering at least one ophthalmic lens; and providing at least one target value of at least one property of the at least one ophthalmic lens for each of the order parameter sets in the validation data set.

The obtaining of a surface model for calculating at least one surface of at least one ophthalmic lens may furthermore comprise:

calculating values of a validation target function, and/or values of the variables derived from the validation target function, for the provided surface models of differing complexity for given previously determined optimized values of the model parameters of the respective surface models, wherein the validation target function depends on the provided target values and contains at least one term for each of the order parameter sets in the validation data set, which term assumes a minimum or maximum when the provided target value of the at least one property of the at least one ophthalmic lens for the respective order parameter set coincides with the value of the same property of at least one lens which can be or is calculated with the surface model for given optimized values of the model parameters of the surface model for the corresponding order parameter set; and selecting or determining the surface model for the calculation of at least one surface of at least one ophthalmic lens from the surface models of differing complexity that are parameterized with the optimized values of the model parameters, on the basis of the calculated values of the validation target function and/or using the values of the variables derived from the validation target function The term "provide" in the sense of the present application includes "establish," "transmit," "obtain," "read out," "extract from a memory, a database, and/or a table," "receive" etc.

The term "define" in the sense of the present application also includes "establish," "calculate," "determine" etc.

Order Parameter Sets

To determine the surface model, the order parameter sets are provided that are necessary to calculate at least two additional, differing ophthalmic lenses or pairs of lenses. In the determining of the surface model, it is advantageous to use more than 10, 100, 1000, 10000, 100000, or 1000000 order parameter sets necessary for the calculation of the additional ophthalmic lenses.

The order parameter sets preferably cover a large range, preferably the entire range, in which later ophthalmic lenses may be ordered (see, for example, the limits for refraction as cited by manufacturers of ophthalmic lenses, individual frame parameters in spectacle lens orders, other parameters of the lenses such as freely selectable object distances, and other order parameters). For example, the order parameter sets may lie within the range of refraction values, for example −20 dpt to +20 dpt for sphere and −8 dpt to +8 dpt for cylinder.

An order parameter set may thereby comprise one order parameter, a plurality of order parameters, or all order parameters necessary for ordering a single ophthalmic lens or a pair of ophthalmic lenses. Examples of order parameters are also found in the established standards for spectacle lenses (see, for example, EU guideline 93/42/EWG regarding medical products).

An order parameter set may thus comprise at least one of the following order parameters:

parameters of the ophthalmic lens such as, for example, material (optionally with index of refraction of the lens), desired thickness of the lens, coating etc.;

refraction values such as, for example, sphere and/or cylinder with axis and/or addition and/or near refraction and/or prism with base;

geometric parameters of a spectacle frame;

an intended use of the ophthalmic lens, for example for reading, working at the computer, sports etc.;

physiological parameters or properties of a future wearer of the ophthalmic lens;

biometric parameters or properties of the eye or of the eyes of the future wearer, such as, for example, location of the eye's center of rotation, individual structure of the eye, pupil diameter, individual measurement of a wavefront etc.;

the preferred viewing behavior of the future wearer;

other known parameters for individual and/or personalization of ophthalmic lenses. The parameters for individualization of an ophthalmic lens may, for example, characterize the orientation of the ophthalmic lens in front of the eye of a lens wearer. The parameters for personalization of an ophthalmic lens may characterize an adaptation of the perceived design in order to satisfy a personal intended use of a pair of spectacles, for example. These parameters with regard to individual and/or personalization of an ophthalmic lens may for example, be represented in a design characteristic, the location of the reference points, progression length etc.

The variables (such as, for example, the variables derived from the order parameters) depending on the order parameters may, for example, be the index of refraction of the material, mechanical properties of the material, mechanical properties of the coating, thickness distribution of the ophthalmic lens, desired distribution of the residual astigmatism in the usage position, desired distribution of the refraction error in the usage position etc.

The order parameter sets necessary to determine the surface model may—but do not necessarily need to—relate to already provided, already calculated, or already produced ophthalmic lenses. Depending on the embodiment of the surface model, it may be advantageous that the ophthalmic lenses have already been provided, calculated, or produced. Therefore, it is also possible that the order parameter sets are located only within the permitted limits of the order parameters. The refraction may thus be in the supply range for ophthalmic lenses, but the lenses themselves may never have been ordered, calculated, or produced.

Redundant orders in an order data set may also optionally be removed before the definition in order to reduce the number of data sets (for example given very frequently ordered effects). Alternatively or additionally, for the same reason the order data set may be stratified, but nevertheless ensure a high coverage of the order parameter range with order data sets.

Properties and Target Values

At least one target value of at least one predetermined property of the at least one ophthalmic lens is also provided to determine the surface model for each of the order parameter sets in the training data set. The target values for the different order parameter sets may be different or identical, at least for a portion of the order parameter sets.

The term "target value" in the sense of the present application includes a desired or requested value of at least one property of an ophthalmic lens, for example a spectacle lens or a contact lens. The target value may comprise a plurality of values or a combination of a plurality of values. The target value may, for example, be learned from a database and/or calculated using predetermined optimization algorithms.

The at least one predetermined property of the ophthalmic lens may, for example, be an optical or geometric property of an ophthalmic lens or of a lens pair comprising the ophthalmic lens. The at least one predetermined property may be a physical property of the lens such as, for example, rise(s), curvature(s), or variables derived therefrom such as, for example, surface astigmatism, surface refractive index etc. The at least one predetermined property may also be an "indirect" property, i.e. a property which emerges in conjunction with at least one model (for example object distance model, eye model, usage position model etc.). Examples of indirect properties are residual astigmatism, refraction error etc.

For example, the property may be one of the following properties:

rises of the at least one surface and/or derivatives of the rises (for example in directions orthogonal thereto);

surface property or surface parameter of the at least one surface such as, for example, curvature in at least one viewing position, coefficients of a parametric function which describes the surface such as, for example, a spline function or a polynomial function;

properties of the at least one surface such as, for example, smoothness, continuous differentiation capability, production capability;

optical variables or properties of the at least one surface or of the ophthalmic lens such as, for example, refractive index or refraction error (preferably in the usage position), astigmatism or residual astigmatism (preferably in the usage position), vertical and/or horizontal prism (preferably in the usage position), higher-order imaging errors (preferably in the usage position) etc. The optical variables or properties may, for example, be specified in power vector form;

gradients of optical variables or properties of the at least one surface or of the at least one ophthalmic lens such as, for example, gradient of the (residual) astigmatism and/or of the refractive index or of the refraction error;

distribution of optical variables or properties and/or their gradients of the at least one surface or of the ophthalmic lens, such as, for example, distribution of the refraction error, of the vector components, and/or of the magnitude and/or of the axis of the astigmatism or residual astigmatism in the usage position, of the prism, of the prism base, of the vector components of the prism, or distribution of variables derived therefrom. What is understood by "distribution" is both the optical property or its gradient in the sense of a function of the spatial position (for example (x,y)-position) on the ophthalmic lens, and the frequency distribution of these variables in the sense of a probability distribution;

width of the zones of good vision (for example the zones in which the residual astigmatism and/or the refraction error are smaller than 1 dpt, preferably smaller than 0.75 dpt or 0.5 dpt);

geometric parameters or properties (not contained in the order parameters) of the ophthalmic lens such as, for example, center thickness of the lens, edge thickness of the lens, thickness of the coating, diameter of the lens, mass of the lens etc.;

material parameters or material properties (not contained in the order parameters) of the ophthalmic lens;

geometric parameters (not contained in the order parameters) of a spectacles frame;

production capability of the lens (for example, absence of undercuts of the surfaces);

binocular properties or properties of a lens pair comprising the ophthalmic lens. The binocular property may be a property whose calculation involves at least one property (for example a surface property, a geometric property, an optical property, a property of the visual perception etc.) at a first point of a first lens of a lens pair (such as, for example, a pair of spectacle lenses)

and the same property at a second point of a second lens of the same lens pair. The at least one binocular property of the lens pair may, for example, be the deviation or the difference of at least one optical variable or property between the first and second lens of a lens pair. Examples of binocular properties of a lens pair are the deviation or the difference of the horizontal and/or vertical prism (minus the prescribed prism difference) at corresponding viewing locations (such as, for example, at least at one reference point such as, for example, at the prism reference point) between the right lens and left lens of a lens pair, the difference in the magnification at the left and right lens, the base curve difference between left and right lens, the location of the design points or their difference, properties of the visual perception of the future wearer of the ophthalmic lenses calculated with the surface model etc. The parameters or properties of the lens pair may also comprise the deviation of at least one geometric parameter between the first and second lens of a lens pair such as, for example, the deviation of the center thickness, edge thickness, thickness of the coating, curvature of the front surface etc.

a sense of discomfort, with respect to quality of vision and/or posture, of a wearer of the ophthalmic lenses calculated with the surface model;

properties of the visual perception of the future wearer of the ophthalmic lenses calculated with the surface model.

It is also possible to consider other relevant properties.

The target values may be values (such as nominal values, for example) of the at least one ophthalmic property of lenses already calculated or to be calculated according to a known method (for example by minimizing or maximizing a known target function in an iterative optimization method), or to be produced, for the different sets of order parameters. It is likewise possible to obtain the target values using measured values of already produced ophthalmic lenses. The order parameters of the lenses already produced or to be produced are preferably already at least partially known.

For example, a measured value of the at least one property of an already produced ophthalmic lens, or a value which is or can be determined from one or more measured values of already produced ophthalmic lenses, may be set as a target value of the at least one property of the at least one ophthalmic lens. It is likewise possible to set a nominal value of an ophthalmic lens to be produced as a target value.

For example, a target value for the mean surface refractive index of a surface of the ophthalmic lens may be determined depending on the position on the lens, given a known index of refraction from rise measurements of the glass surface (via the mean curvature of the surface). A target value for the astigmatism of a spectacle lens in the usage position (likewise dependent on the position) may be determined from the rise measurements, the pantoscopic tilt, the face form angle, glass length and glass height (order values), and the position of the eye's center of rotation (order values or model assumptions).

In determining the surface model, in addition to the order parameter sets for a plurality of ophthalmic lenses (basic lenses), one or more surfaces of these lenses belonging to the order parameter sets may be used. The ophthalmic lenses used for determining the surface model are also referred to as basic lenses within the scope of the present application. The basic lenses may be lenses that have been calculated and optimized, and optionally produced, according to a known method.

Additionally or alternatively, the target functions and/or their derivatives with respect to the surfaces may also be used that depend on these order parameter sets and are necessary to calculate ophthalmic lenses according to the prior art, or to calculate the basic lenses. Said derivatives are to be understood as a change of the target function given a change of the rises, for example. The target values may thus correspond to the nominal values which enter into these target functions. Target functions and/or their derivatives with respect to the surfaces may thereby preferably be present such that they may be evaluated for arbitrary surfaces. The target functions and their derivatives are thereby typically evaluated depending on a suitable parameterization of the surfaces of the ophthalmic lenses.

If the surfaces of a plurality of basic lenses are used to determine the surface model, it may be advantageous if these surfaces have already been calculated. It may likewise be advantageous if the basic lenses have also been produced, since their calculation already has a purpose and is reused to determine the surface model without additional computing capacities being consumed.

The method described here may also be implemented without additional measures with measured surfaces (and distances of the surfaces relative to one another) of ophthalmic lenses, instead of with calculated surfaces. Other properties—for example the index of refraction—may additionally also be measured.

The above statements relate to the properties and target values with regard to the training data set. Obviously, properties and target values may also be identically or similarly determined or calculated for other order parameter sets (for example validation data set and test data set). The same properties with corresponding target values do not thereby necessarily need to be used for training, validation, and test data set. However, it may often be simpler to use the target values of the same properties in relation to various data sets.

Surface Model

The surface model may be an arbitrary model such as, for example, a model based on machine learning. Algorithms of machine learning are described in, for example, Jeremy Watt, Reza Borhani, Aggelos Katsaggelos: Machine Learning Refined: Foundations, Algorithms, and Applications, Cambridge University Press, 2020.

The surface model may be described by suitably determined model parameters, wherein the model parameters, together with at least a portion of or, in the best case, all order parameters and/or variables derived therefrom, are used to calculate the surface or the surfaces of the ophthalmic lens.

If one or more order parameters may reasonably be represented as one or more real numbers, it is advantageous if the surface model is constructed such that the surfaces generated by the surface model are a continuous or even continuously derivable function of the order parameters, in order to ensure a continuity of the design of the ophthalmic lenses with respect to these order parameters.

A surface model determined by model parameters may be executed as a regression model or include a regression model. The regression model receives as input variables at least a portion of, or preferably all, order parameters and/or variables derived therefrom and calculates therefrom one or more surfaces of an ophthalmic lens or a pair of ophthalmic lenses.

The surface model or portions thereof may additionally or alternatively be designed for construction as a regression model and as a classification model, or include a classification model. For example, if only determined glass diameters in the blanks are available within the scope of the production of spectacle lenses, and should the diameter of the glass blank be selected, this may occur by means of a classification model. Such a classification model may, for example, calculate the probability of the suitability of the available glass blank diameters for the ophthalmic lens to be produced, such that ultimately the glass blank may be chosen that has the highest probability and thus is best suited for the ophthalmic lens to be produced.

A classification model may analogously also be used for the calculation of the optimal basic curve and/or of the optimal diameter of the ophthalmic lenses (for example, spectacle lenses) in the production of ophthalmic lenses (for example, spectacle lenses), in that a probability for the suitability of the available base curves is calculated, and the base curve with the highest probability is chosen for production or calculation of the ophthalmic lens (for example, the spectacle lens).

In order to be able to flexibly represent different designs of modern ophthalmic lenses, it is advantageous if the surface model possesses a sufficiently high number of model parameters, for example more than 10, 30, 50, 100, 500, or 1000, 10000, 100000, or even more model parameters.

If the surface model is, for example, designed as a regression model, or if it includes a regression model, the determining of the surface model may consist of adjusting the model parameters of the surface model, starting from the order parameter sets (for example order parameter sets of the basic lenses), so that arbitrary ophthalmic lenses whose surface or surfaces can be calculated from their order parameter set with the aid of the surface model differ, using predetermined criteria, only insignificantly from ophthalmic lenses which may be or were already calculated from the same order parameter set by means of predetermined methods according to the prior art.

The regression model used in the surface model or as a surface model may be a linear regression model, which typically facilitates the calculations necessary to determine the surface model, since the model parameters may be determined from a linear equation system.

However, it is also possible, without additional measures, to use a non-linear regression model instead of a linear regression model. Such a model is more flexible and may represent more complex correlations between order parameters and the surface or surfaces of the ophthalmic lenses. However, at the same time it is more difficult to suitably determine the model parameters since, for this purpose, non-linear optimization algorithms are typical which do not necessarily converge at a global optimum of the model parameters. For example, neural networks, among which are also deep neural networks, may be used as non-linear regression models; however, other non-linear regression models known from the field of machine learning may also be used. These regression models, for example the neural network, may be trained using the provided order parameter sets in the training data set with the associated target values.

The surface model may also be a combination of a linear and/or non-linear regression model, a classification model, and/or a neural network. Via the combination, a reduction of the complexity of the surface model as well as savings in the computation time and/or consumption of resources is conceivable. Examples of combinations are:

Example: Classification model before regression model and/or neural network: Using the order data, the model with the least complexity that still generates sufficiently good surfaces is selected from the set of regression models with differing complexity. An advantage of this procedure is a possible improvement of the computation time and/or utilization of scarce resources;

Example: Regression model before classification model before regression model and/or neural network: Using the order data, the geometry of the lens is approximately determined with the aid of a regression model of low complexity. The subsequent classification model determines the glass blank from the order data and the approximate geometry. The subsequent regression model determines the final lens from order data and glass blank. An advantage of this procedure is a reduction of the complexity of the regression model to determine the lens.

It is likewise advantageous to control or optimize the complexity of the surface model so that it can calculate surfaces of ophthalmic lenses whose order parameter sets are not included in the training data set. For example, this may take place with the aid of a regularization, and/or via selection of order parameters, and/or calculation of a sufficiently large number of different types of variables (auxiliary variables) which are derived from the order parameters, and/or the a suitable selection of the number of model parameters and/or of the type of the model.

For reasons of numerical stability, it is likewise reasonable to transform the order parameters and/or auxiliary variables derived therefrom or dependent thereon before passing them to the surface model, so that they have a mean value of zero and, for example, a standard deviation of one across the distribution of the order parameters of the ophthalmic lenses used in determining the model parameters.

Determining the Model Parameters of the Surface Model and Adjusting its Complexity Defining or Determining the Model Parameters Initially, at least one surface model parameterized by model parameters is provided or predetermined with which—for given values of the model parameters—at least one surface of at least one ophthalmic lens may be calculated at least from one order parameter set and/or from variables depending on an order parameter set.

An initial parameterization and an initial complexity of the surface model may thereby be provided or determined. The provision of an initial parameterization of the surface model may include the provision of initial values for the model parameters of the surface model. The provision of an initial complexity of the surface model may include the determining or predetermining of an initial number of model parameters of the surface model. The final model parameters, and possibly complexity, are determined or determined by means of a suitable optimization method. The final model parameters thus form an optimal set of model parameters.

The model parameters of the surface model are preferably determined so that they represent an optimal set of model parameters which minimizes or maximizes a predetermined target function for the model parameters.

An optimal set of model parameters may be found with established mathematical optimization algorithms (for example a simple gradient descent, conjugated gradient descent, stochastic gradient descent, or similar algorithms). If a neural network is used as a regression model, a back-propagation algorithm—which is per se only one gradient-based algorithm adapted to this type of model—may be used to minimize the target function.

The target function for the model parameters for each of the order parameter sets may include at least one term which assumes a minimum or maximum when the provided target value of the at least one property of the at least one ophthalmic lens for the respective order parameter set coincides with the value of the same property of at least one lens that can be or is calculated with the surface model for the corresponding order parameter set for given values of the model parameters of the surface model.

The target function may include a single term, a sum of a plurality of terms, or a weighted sum of a plurality of terms. For example, different target functions may be used depending on (i) whether surfaces already present (for example surfaces calculated according to a conventional method) exist with respect to the order parameter sets and these surfaces should be used in the target function, or (ii) whether the surfaces corresponding to the order parameter sets would first need to be calculated, or (iii) whether the target function should not be determined with the aid of surfaces.

Furthermore, it is advantageous if the gradient of the target function can be calculated quickly with regard to the parameters in the parameterization of the surface output by the surface model, for example as an analytical function.

The optimization of the parameterization, and if applicable of the complexity of the surface model, may take place such that the deviations of the values of at least one property of ophthalmic lenses whose at least one surface is calculated from the set of order parameters with the aid of the surface model, and the corresponding (possibly order parameter-dependent) target values of this property, are minimized.

The deviation of at least one value of the at least one predetermined property of a lens, which is or can be calculated according to the surface model from a determined order parameter set, from the at least one target value of this property for the same order parameter set may be quantified in different ways. The difference, or a convex or concave function of the difference (for example a square, a magnitude, or its negative), between the at least one value of the at least one predetermined property of the lens that is or can be calculated from a determined order parameter set, according to the surface model, and the at least one target value for this property for the same order parameter set may be used as a measure of this deviation.

The at least one term of the target function for the model parameters may accordingly comprise the difference, or a convex or concave function of the difference, between the at least one value of the at least one predetermined property of the lens whose at least one surface can be calculated for an order parameter set, according to the surface model, and the at least one target value for this property for the same order parameter set. A convex function may in particular be used in minimizing the target function. Given maximization of the target function, a concave function may be used.

It is likewise possible to use other functions of the at least one value of the at least one predetermined property of a lens that is or can be calculated from a determined order parameter set, according to the surface model, and of the at least one target value of this property for the same order parameter set, in order to describe or quantify the deviations between these values. Such a function is, for example, the ratio of the at least one value of the at least one predetermined property of the lens that is or can be calculated from a determined order parameter set, according to the surface model, and the at least one target value for this property for the same order parameter set. Other functions, for example a logarithmic function of the ratio, are likewise possible.

It is also possible to use target functions for the at least one optical property which are used in a conventional optimization or calculation at least of ophthalmic lenses. One or more terms of the target function for the model parameters may accordingly form a target function for the optimization or calculation of at least one ophthalmic lens for given order parameter sets, or be understood as such, wherein the target function is evaluated for the different order parameter sets. The target function may depend, in a known manner, on the real value of the at least one optical property (evaluated for an ophthalmic lens whose at least one surface was or can be calculated from a determined order parameter set, and/or variables derived therefrom, according to the surface model) and the corresponding target value. It is likewise possible to use different target functions for different order parameter sets. In this instance, it is not necessary to use already calculated and/or produced surfaces to determine the surface model. As an example, such a target function may be the running sum over a plurality of viewing locations, or the mean value—calculated over a plurality of viewing locations—of the squares of the deviations of the refraction error and of the astigmatism of the respective target values calculated directly from the order parameter sets, which is in turn summed or averaged over the order parameter sets.

The target function for the model parameters may contain a plurality of terms which, using different properties (for example optical and/or geometric properties, direct and/or indirect properties), quantify or describe the differences between the surfaces of the ophthalmic lenses calculated with the surface model and the corresponding target values. The additional properties (for example, the additional optical and/or geometric properties, direct and/or indirect properties) may thereby depend on the order parameters. Examples of properties are vector components or the magnitude of the residual astigmatism in the usage position, refraction errors in the usage position, deviation of the minimum or maximum glass thickness from the corresponding order value of the glass thickness etc.

The target function may additionally also include terms which quantify or describe the difference between the binocular properties of two pairs of ophthalmic lenses (one pair that was calculated with the aid of the surface model, and one pair which was calculated with methods according to the prior art).

The target function may also include at least one term which contains the design differences between ophthalmic lenses with different order parameters. Such an auxiliary term thus no longer relates only to a single ophthalmic lens, but rather to the differences between two or more ophthalmic lenses that are adjacent in the order range, and represents advantageous properties of a product containing a plurality of ophthalmic lenses.

In this way, for example, the similarity (but not necessarily the consistency) of the perceived design of varifocal lenses across different refractions may be formulated as a target function, so that the desired design must be specified only for a single effect that, for example, occurs especially often, and given other effects the designs result therefrom without needing to be specified separately. The advantage of such terms which include the differences between two or more ophthalmic lenses is that it is often difficult to specify a surface design that is constant over the order parameter range, since it cannot be constant due to other, more fundamental principles (for example the Minkwitz theorem).

The target function may comprise a weighted or unweighted sum of the terms arrayed for each of the order parameter sets across all order parameter sets in the training data set. Instead of a sum, it is possible to calculate the mean value or the median value. It is likewise possible to use more complex functions instead of a sum, for example non-linear functions.

As described above, different optimization algorithms (for example a simple gradient descent, conjugated gradient descent, stochastic gradient descent, or similar algorithms) may be used to determine an optimal set of model parameters. For example, the optimization of the values for the model parameters may include a regularization of the target function used in the optimization of the model parameters.

If an optimization method which requires gradients of the target function (for example given a back-propagation algorithm in neural networks as a surface model, or—for example—gradient descent) is used to optimize the parameters of the surface model, these may be calculated analytically, numerically, or with the aid of combined analytical and numerical methods. In particular, given a back-propagation algorithm, in the back-propagation step the gradients of the target function—instead of the typically used residuals—are propagated back through the network (the typically used residuals are the gradients of a typically used quadratic target function).

The above statements relate to target functions for the determination of the model parameters. Obviously, other target functions, for example a validation target function or a target function for testing the surface model (test target function), may also be established or predetermined in the same way.

The target function may be normalized. For example, the running sum across properties of the ophthalmic lens and ophthalmic lenses (lens pairs) may be divided by the number of ophthalmic lenses (lens pairs) respectively relative to the number of lenses (lens pairs) in the training, validation, or test data set, depending on whether the target function is used to determine the model parameters, to validate the model, or for testing.

Adjusting the Complexity of the Surface Model

As was already mentioned above, at least two surface models of different complexity may initially be provided in order to determine an optimal complexity of the model. The complexity of a surface model may comprise one or more of the following variables:

type and/or number of the order parameters used in the model;

type and/or number of the variables derived from order parameters;

number of model parameters;

type and/or strength of a regularization of the target function used in the optimization of the model parameters.

The adjustment or optimization of the complexity of the surface model may also comprise providing:

a validation data set comprising a plurality of order parameter sets which respectively include values of at least a portion of the parameters necessary for ordering at least one ophthalmic lens;

a target value of at least one property of the at least one ophthalmic lens for each of the order parameter sets in the validation data set.

Furthermore, the obtaining of a surface model for calculating the at least one surface of at least one ophthalmic lens may comprise:

calculating values of a validation target function, and/or values of the variables derived from the validation target function, for the provided surface models of differing complexity for given previously determined optimized values of the model parameters of the respective surface models; and selecting or determining the surface model for the calculation of at least one surface of at least one ophthalmic lens from the surface models of differing complexity that are parameterized with the optimized values of the model parameters, on the basis of the calculated values of the validation target function and/or using the values of the variables derived from the validation target function.

As was already mentioned above, the validation target function depends on the provided target values. The validation target function contains, for each of the order parameter sets in the validation data set, at least one term which assumes a minimum or maximum when the provided target value of the at least one property of the at least one ophthalmic lens for the respective order parameter set coincides with the value of the same property of at least one lens that can be or is calculated with the surface model for given optimized values of the model parameter of the surface model for the corresponding order parameter set.

The validation target function may be constructed identically or similarly to the target function for the model parameters. However, it is possible to use different target functions.

For example, if no regularization parameter is used in the optimization of the model parameters, the target function(s) for the optimization of the model parameters and the validation target function(s) may include the same terms depending on the respective target values (i.e., respectively with respect to the training data set or the validation data set). If it is regularized, the terms of the target function for the optimization of the model parameters which include the regularization parameter or parameters may be omitted for the calculation of the validation target function. The same can also be achieved in that the regularization parameter or parameters are set so that the corresponding terms do not contribute to the validation target function (for example by setting the regularization parameter to 0). Naturally, for all of that the corresponding target values are to be replaced with those that are based on the validation data set and not on the training data set. Furthermore, however, additional or exclusively different properties of the ophthalmic lenses may also be utilized in the validation (in comparison to the optimization of the model parameters). For example, in the optimization the squares of the differences of the rises may be minimized (i.e., the corresponding properties would be the rises for given evaluation points on the ophthalmic lens), and in the validation the squares of the difference of the effect of the ophthalmic lens and the corresponding target values (here, the property would be the effect, for example as a power vector, sphere/cylinder/axis, or one or more components of the effect) would be minimized.

Training Using Already Calculated or Known Surfaces

If already calculated surfaces of ophthalmic lenses are already at least partially available (for example surfaces or lenses that have been calculated according to a conventional optimization method), the model parameters may be chosen so that the surfaces output by the surface model coincide optimally well with the already calculated surfaces (target surfaces). Possible criteria for this may be determined in the target function for the model parameters. In the simplest case, the target function contains a term that is a sum of a convex function (for example of the square) of the differences of the rises of the surfaces, said rises being calculated or calculable from the surface model with a given model parameter set, and the target surface. The sum thereby runs pointwise across all pairs of rises of target surfaces in the surfaces that are or can be calculated with the surface model, as well as across the basic lenses or the order parameter sets. The already calculated surfaces of the basic lenses, together with the associated order parameters and/or variables derived therefrom, may thereby be considered as a training data set.

A sum weighted differently across the rises of an ophthalmic lens may also be used. For example, the weightings may be greater at points on the ophthalmic lens which are to be assessed as especially critical than at other points. For example the weightings may be greater in the region of the ophthalmic lens which is viewed through more often, in order to ensure a high optical quality (for example, given spectacle lenses, the region of the uncut spectacle lens that is located within the frame after grinding or, given varifocal lenses, for example, the region in which the residual astigmatism is below a determined threshold, for example 0.5 dpt).

As an alternative to differences of the rises, their ratios or the logarithm of their ratios may also be used.

Other terms in the target function may also additionally be used for the model parameters. For example, it is possible that an ophthalmic lens calculated from the surface model has a diameter that differs from the nominal diameter. In this event, the target function for the model parameters of the surface model may also include terms that penalize a deviation of the diameter calculated by the surface model or implicitly resulting from the calculation results (for example because a curvature is too high) (for example, the target function rises very strongly if the calculated diameter is smaller than the nominal diameter).

If the already calculated surfaces of the basic lenses and the surfaces calculated by the surface model are given in different parameterizations (for example the rises are specified at different point rasters), it is advantageous to convert the already calculated surfaces of the basic lenses to the parameterization output by the surface model, for example via interpolation. However, the adjustment of the parameterization of the surfaces may also take place in the reverse direction, or a completely different parameterization may be chosen (for example representation by Zernike polynomials).

The target function for the model parameters may additionally or alternatively also include other terms which quantify the differences between the surfaces of the ophthalmic lenses calculated with the surface model and of the basic lenses using optical and/or geometric properties. The optical or geometric properties may thereby also depend on the order parameters (for example vector components or the magnitude of the residual astigmatism in the usage position, refraction errors in the usage position, or deviation of the minimum or maximum glass thickness for the corresponding order value of the glass thickness).

These terms typically consist of sums or weighted sums of the pointwise differences of the optical variables of the lenses calculated with the surface model and of the basic lenses, which are in turn summed across all basic lenses. The points across which summing takes place may be predetermined by a raster of evaluation points of the ophthalmic lenses, or by a raster of viewing directions. Instead of a (weighted) sum, other functions may be used, for example non-linear functions.

As described above, the target function may additionally also contain terms which quantify the difference between the binocular properties of two pairs of ophthalmic lenses (of a pair that was calculated with the aid of the surface model and a pair which was calculated according to a conventional optimization method).

Global Optimization Using Target Functions

In a second example, target functions for the model parameters are used that do not depend on the surfaces of basic lenses. For example, this may be so if these surfaces have not yet been sufficiently calculated to determine the model parameters, or in the event that correspondingly calculated surfaces do not yet exist with respect to the order parameter sets of the basic lenses.

In such target functions, the difference between predetermined properties of the surfaces calculated with the surface model and desired target values (possibly depending on the order parameters) of these properties may be calculated. Possible properties are the aforementioned optical properties, for example optical properties (for example distribution of the refraction error; of the vector components; and/or of the magnitude and/or of the axis of the astigmatism or residual astigmatism in the usage position; of the prism, the prism base, the vector components of the prism; or distribution of variables derived therefrom), geometric properties, binocular properties, or properties of the visual perception of the future wearer of the ophthalmic lenses calculated with the surface model.

The target function for the model parameters may include terms that represent a weighted deviation of the properties of the ophthalmic lens, that is or can be calculated with the surface model, from its desired curve. For example, the fulfillment of the effect requested in the standards (for example, high weighting at the reference points given spectacle lenses) may be controlled via the weighting. Terms which possess a minimum at the desired center thickness or thickness distribution at the edge may also be included in the target function for the model parameters. Desired mechanical properties, for example actual or simulated breaking strength, may also be represented in a term of the target function.

The target function may be one of the previously described target functions. In particular, all examples of target functions for the model parameters from the previous section that are not dependent on the surfaces of the basic lenses may be used with suitably selected target values, if applicable dependent on the order parameters, via replacement of the corresponding property of the basic lenses.

The target function for the model parameters may likewise contain terms which are already used as a target function in the optimization of ophthalmic lenses with the aid of typical optimization methods. The target function of the model parameters then includes terms which sum the target functions of optimization methods across the additional ophthalmic lenses or calculate their mean value.

The determining of the model parameters via optimization of a target function for the model parameters that is not dependent on the surfaces of basic lenses thus corresponds to the simultaneous optimization of a plurality of ophthalmic lenses that may be obtained from the order parameter sets via calculation and/or optimization. Instead of directly varying the parameterizations of the surfaces of every single lens (for example the rises or spline coefficients), as is typical, the model parameters of the surface model that control the curve of the surfaces are thereby varied in order to minimize the sum of the individual target functions for the optimization of every ophthalmic lens that can be calculated or optimized from the order parameter sets for use in determining the model parameters.

Obviously, new, as of yet unknown target functions that represent advantageous properties of the ophthalmic lenses may also be used for individual ophthalmic lenses.

Additionally, i.e. in addition to the terms with target functions for individual ophthalmic lenses, the target function for the model parameters of the surface model may also comprise terms that comprise design differences between ophthalmic lenses with different order parameters. The advantages of such terms have already been discussed above.

If the surfaces calculated from the surface model are a continuous or even continuously derivable function of the order parameters and/or of variables derived therefrom, it is thus to be expected that, given a suitably set complexity of the surface model, there are only slight differences between the surfaces calculated from the surface model and the surfaces which were calculated via optimization of the same target functions by means of conventional optimization methods.

Determining the Complexity of the Surface Model Using the Quality of the Calculated Surfaces In order to suitably set the complexity of the surface model so that correct ophthalmic lenses may be calculated with the surface model even from order parameter sets that were not present in the training data set, what is known as regularization, in which additional terms weighted with one or more different factors are added to the target function of the parameters of the surface model, may also be used in addition to or instead of the direct variation of the number of model parameters of the surface model (or also of the order parameters and/or the variables derived therefrom). These terms are typically quadratic terms in the model parameters. However, other powers may also be used (for example, the absolute value of the model parameters may be used), or other functions of the model parameters may also be used instead of the model parameters themselves (for example differences of the spline coefficients of adjacent splines of a representation of the surface of the ophthalmic lens).

In order to check the quality of the surface model after adjusting the model parameters, it is suggested to train the model parameters of the surface model not with the entirety of the available data sets (i.e. at least the data sets containing order parameters, if applicable variables derived therefrom and if applicable associated calculated surfaces), but rather to use a portion of the data sets for validation or final testing of the model. The validation of the adjusted model complexity and final testing of the surface model may occur using the same target function for model parameters which was used to adjust the model parameters of the surface model, but preferably without the terms stemming from the regularization. For validating or testing the surface function, it is also possible to use target functions which differ from the target function for the definition of the model parameters.

For example, a check may be performed as to whether sufficiently different sets of order parameters that are not present in the training data set lead to a slight deviation of the surfaces calculated from the surface model from the target surfaces. This may typically be achieved in that the order data sets, together with surfaces of the basic lenses, are subdivided into a training data set and a validation and/or test data set. As described above, the complexity of the surface model may be chosen using the validation data set.

The method for determining a surface model may therefore comprise the following steps:

providing a validation data set comprising a plurality of order parameter sets, providing at least one target value of the at least one predetermined property of the ophthalmic lens for each of the order parameter sets in the validation data set; and validating the obtained surface model for calculating at least one surface of at least one ophthalmic lens on the basis of the validation data set.

Alternatively or additionally, the method for determining a surface model may comprise the following steps:

providing a test data set comprising a plurality of order data sets, providing at least one target value of the at least one predetermined property of the ophthalmic lens for each of the order parameter sets in the test data set; and testing the obtained surface model for calculation of at least one surface of at least one ophthalmic lens on the basis of the test data set.

Different portions of the same data set may be used for validation and for testing. The purpose of the validation may be the determination of a suitable model architecture (also referred to here as model complexity) or of a suitable value of the regularization parameter(s). The purpose of testing may be the checking of the trained and selected model to avoid overfitting.

The function evaluated in the validation and testing may the same, for example the previously described validation function (also referred to as a test target function). As described above, the validation target function normally contains no additional terms which contain regularization parameters.

In testing, the validation target function may be evaluated on the test data set given fixed model parameters of the surface model, and be compared with the values of the validation target function evaluated on the validation data set and/or of the target function for the model parameters (but without regularization terms). The test is successful if the value of the validation target function evaluated on the validation data set and the value of the validation target function evaluated on the test data set are similarly large. How strongly they actually differ from one another depends on the data (among other things, the number, which has a strong influence if no target functions normalized to the number of the data are used) in the respective validation data set or test data set, and on the underlying model.

Values of validation and test target functions that are not normalized to the number of the data (for example sum of the quadratic deviations of the rises from lenses calculated with conventional methods and the lenses calculated with the surface model at determined evaluation points on the lenses) may only be compared with one another when the test data set and validation data set contain an identical amount of data. If these functions are divided up by the number of data, what are obtained are normalized target functions that may be compared even when the test data set and validation data set contain different amounts of data points.

Insofar as normalized target functions are used, it is advantageous if the values of the target functions to be compared (i.e. value of the validation target function in evaluating with the test data set and the validation data set) do not differ too strongly from one another (for example, the absolute value of the difference of two values of the target function should be less than a predetermined threshold). The value of such a threshold depends strongly on the type of target function that is used, and should be a small fraction (for example 0.3 to 0.01 times) the variation of the validation target function given evaluation with different models or different values of the regularization parameter(s) (for example maximum value–minimum value). Given use of non-normalized target functions, these may divided beforehand by the number of ophthalmic lenses (lens pairs) in the respective data sets and be normalized in this way.

Calculating Variables which Depend on the Order Parameters

As was already mentioned above, variables (auxiliary variables) which depend on the order parameters, for example size, which have been derived from said order parameters may be used as input variables of the surface model.

For example, if the surface model contains a regression model, or if the surface model consists of a regression model, it may be advantageous that the input variables of the regression model from which the surfaces are calculated comprise one or more variables calculated from the order parameters (auxiliary variables) in addition to or instead of the order parameters.

Examples of auxiliary variables are:

given varifocal lenses, the desired distribution of the residual astigmatism and/or the refraction error depending on the viewing direction of the eye, preferably in the usage position;

given varifocal lenses, the desired distribution of the residual astigmatism normalized with the addition, and or the refraction error normalized with the addition, depending on the viewing angle of the eye preferably optimally in the usage position;

the desired thickness distribution at one or more points (for example at the edge) of the ophthalmic lens which, for example, may also be dependent on material and or layer or coating of the ophthalmic lens, or the optical and/or mechanical properties of the material and/or of the layer or coating;

optical and/or mechanical properties of the material of the ophthalmic lens (for example index of refraction, modulus of elasticity, thermal expansion coefficient);

optical and/or mechanical properties of the coating of the ophthalmic lens (for example thickness distribution, modulus of elasticity, thermal expansion coefficient).

Those parameters are thereby preferably to be chosen that have a large influence on the surfaces of the ophthalmic lenses or from which a large influence on the surfaces is expected.

Neural Networks as Surface Model

If the surface model contains a neural network or consists of such a neural network, the input layer of the neural network is populated with the order parameters and/or auxiliary variables calculated therefrom.

The weightings of the neural network (i.e., the strength of the links of the neurons) thereby represent at least a portion of the model parameters.

The output layer may represent the entire calculated surface or portions of the calculated surface of the ophthalmic lens (for example as rises in a determined raster or grid with desired and, if applicable, still-to-be-set resolution).

In addition to input and output layer, the neural network may also contain one or more hidden layers.

The manner of how the neural network is constructed, for example number of layers, number of the neurons in the different layers, the type of linking of the layers among one another etc., is implicitly determined by model parameters (for example their number).

In particular, it may be advantageous to populate the input layer with, in addition to or instead of the order parameters, one or more variables (auxiliary variables) calculated from the order parameters (cf. the section "Calculating variables derived from order parameters" for examples of auxiliary variables which may be used as input variables of a surface model).

It may likewise be advantageous to design the neural network so that one or more of these auxiliary variables are represented at least approximately in the network or appear during the training of the network. The model parameters that are not used as weightings of the neural network may also influence the calculation of the auxiliary variables.

It may likewise be advantageous to limit the size of the neural network in that the output layer represents only a relatively rough rasterization of the surface of the ophthalmic lens (for example a raster of only 10×10 or 20×20 rises). In order to calculate therefrom a representation of surfaces of the ophthalmic lenses that is suitable for production, it is suggested to interpolate the rises output from the neural network to a higher-resolution raster (for example with the aid of linear or bicubic interpolation to a raster of, for example, 100×100 points) and, if applicable, to post-optimize with a few steps of an optimization method according to the prior art. This post-optimization normally requires only a few iterations for convergence, insofar as the neural network has been trained with the results of an optimization method with the same target function.

The determined or defined surface model with the optimized model parameters and, if applicable, the optimized complexity may be suitably stored and subsequently made available for calculation of ophthalmic lenses from an order parameter set. For example, the surface model or a portion of the surface model (such as the model parameters) may be stored in a suitable storage, for example in a database. At least a portion of the order parameter sets required to determine the surface model and or the target values associated therewith may likewise be stored in a storage. As mentioned above, the target values may, for example, be surface values or variables derived therefrom of ophthalmic lenses already calculated at least in part according to established methods (basic lenses). The target values may likewise be nominal values that enter into a target function for optimizing ophthalmic lens (for example a target function according to the prior art).

The surface model determined as described above may be modified further. The method may consequently comprise a modification of the surface model. Examples of modifications are the appending of additional layers in a neural network or embedding the surface model in an additional function that, for example, interpolates or transforms rises of the surfaces (for example transformation of a neural network into a support vector machine, a decision tree, or any other regression model).

The surface model calculated according to the method in accordance with the aforementioned aspect of the invention as well as the embodiment variants, and the methods which use this surface model, preferably have at least one of the following properties or advantages:

The evaluation of the surface model for an order parameter set has a lower computational cost in comparison to an optimization according to a method according to the prior art.

Normally, less than 90%, preferably less than 50%, 20%, 10%, 5%, 2%, or 1% of the computing power or computing time for calculating the surfaces is used for iterative modification of the surfaces of the ophthalmic lenses. This may be advantageous relative to typical iterative algorithms, since the computation cost at each iteration remains the same, but the modifications of the surfaces decrease with each iteration.

The surface model does not necessarily require the provision of an initial surface (starting surface) as an input which enters into the calculation as an input variable and is modified during the optimization method;

It is not necessary to calculate and store in advance modifications of the surfaces depending on the order parameters;

hybrid calculations of the surfaces with a subsequent correction (for example a post-optimization) are possible. Such hybrid calculations may have as a final effect a shorter optimization time due to a better initial surface;

It is possible to continuously improve the surface model.

Via the use of a surface model that is determined according to the method in accordance with the aforementioned aspect and the embodiment variants, it is thus possible to quickly and efficiently calculate surfaces of ophthalmic lenses for arbitrary order parameters of a customer, and to produce and/or visualize said surfaces.

The method according to the aforementioned aspect furthermore also has advantages in the development of series of ophthalmic lenses (both with regard to individual ophthalmic lenses and to pairs of ophthalmic lenses), since the surface model may be used unmodified insofar as the order parameters (for example index of refraction) differing between two different series, or variables depending therein (for example basic curve systems), were present in the training data set and have been varied.

Another application of the method according to the aforementioned aspect is the interpolation between different series of ophthalmic lenses (for example between different products such as, for example, series of varifocal lenses that are provided for different intended uses, or, for example, between varifocal lenses and unifocal lenses). For this purpose, the order data set only needs to be expanded by one variable that corresponds to a series of ophthalmic lenses. Given N series, it is suggested to use a tuple $(s_1, s_2, \ldots, s_N)$ made up of N numbers between 0 and 1. A series of ophthalmic lenses i is thereby represented by the tuple $(\delta_{1,i}, \delta_{2,i}, \ldots, \delta^{N,i})$, wherein $\delta_{i,j}$ is the Kronecker delta symbol. An interpolation between different series of ophthalmic lenses may then be enabled in that the values $s_j$ are chosen between 0 and 1, wherein the sum of $s_j$ is 1. Such a tuple is then used, together with a current order data set, to calculate the at least one surface of ophthalmic lenses with the aid of a correspondingly trained surface model.

Further Aspects

A second aspect of the invention relates to a computer-implemented method and a corresponding device for determining at least one of the surfaces of one or more ophthalmic lenses by means of a previously determined surface model from the order parameters and/or from variables derived therefrom. The term "define" in the sense of the invention includes a determination or calculation of at least one surface of one or more ophthalmic lenses.

The Method Comprises:

providing an order parameter set for the at least one ophthalmic lens;

providing a function for calculating at least one surface of at least one ophthalmic lens from a set of order parameters for the at least one ophthalmic lens and/or from variables depending on the order parameters, wherein the function is a surface model or a function which approximately implements a mapping of an order parameter set to at least one surface of the at least one ophthalmic lens, which mapping can be implemented with a surface model; and determining surface data of the at least one surface of the at least one ophthalmic lens, with the aid of the provided function, from the provided order parameter set (directly, not iteratively).

The surface model may be the previously described surface model, i.e. a surface model that has been determined or ascertained according to the previously described method. The surface data of the at least one surface are preferably determined from the provided order parameter set directly (i.e. not iteratively) or with few iteration steps, for example with fewer than 30, 25, 15, 10, 5, or 3 iteration steps. As stated above, this leads to a significant reduction of the computation time that is necessary to calculate a surface or a lens for an arbitrary order parameter set. It is also not necessary to calculate and store changes of the surfaces depending on the order parameters in advance, which reduces the storage space requirements. It is also possible to update and improve the surface model continuously in a simple manner.

The surface model may be used directly to calculate the at least one lens surface.

Alternatively, a function of the surface model may be used, for example a function which approximately implements the calculation with a surface model determined according to the invention. Such a function may be generated within the scope of a simplification of the surface model, for example in that neurons of a neural network that have similar activation patterns are combined, or within the scope of a different transformation of the surface model that is used.

Furthermore, the aforementioned preferred embodiment variants or the aforementioned advantages reasonably also apply with regard to this method for this device.

The method optionally further comprises a determination of other variables relevant to the production of the surfaces (for example present diameter and type of blank from which the lenses should be produced), so that the surfaces calculated in such a manner either no longer need further optimization or need to be corrected only with a comparably small computing effort.

The method for determining at least one surface of at least one ophthalmic lens may also comprise an implementation of a correction of the at least one surface calculated with the surface model, wherein the correction comprises an optimization of the surface calculated with the surface model; and/or a superposition with a superposition surface; and/or a correction of production-dependent deviations of the surfaces or of the optical properties of the ophthalmic lens; and/or an expansion of the surface to the diameter of the ophthalmic lens that is required for production. An example of a method for expansion of surfaces is described in EP 2087396.

The method for determining at least one surface of at least one ophthalmic lens may also comprise a storage of surface data of the at least one surface calculated with the surface model and, if applicable, corrected and/or expanded. The surface data may optionally be stored together with at least one portion of the order parameter set used for determining the surface data. For example, the surface data may be stored on a suitable data medium or in a storage device. The storage device may likewise be a computer cloud or data cloud.

The method for determining at least one surface of at least one ophthalmic lens may likewise comprise transmission of surface data of the at least one surface calculated with the surface model and, if applicable, corrected and/or expanded to an external unit, for example to a manufacturer of ophthalmic lenses, a production unit, a production device etc. The surface data may optionally be transmitted together with at least one portion of the order parameter set used to determine the surface data.

The method for determining at least one surface of at least one ophthalmic lens may also comprise a checking of the at least one surface calculated with the surface model for fulfillment of desired or requested properties, and storage of the information about fulfillment or non-fulfillment of the requested properties together with at least one portion of the order parameter set used to determine the surface data, and/or with the at least one surface calculated with the surface model and, if applicable, corrected and/or expanded, and/or with at least one value of the desired or requested properties that can be provided as a target value of properties in a definition of the surface model according to the first aspect of the invention.

Furthermore, the method for determining at least one surface of at least one ophthalmic lens may comprise an adaptation of the model parameters of the surface model after the determination and/or storage of every surface, or after a predetermined number of surfaces calculated with the surface model and, if applicable, corrected.

Correction of the Surfaces Calculated with the Surface Model and Checking of Design Conformity The at least one surface of the ophthalmic lens calculated with the surface model may be further corrected, for example if the ophthalmic lens calculated with the surface model does not fulfill at least one desired or requested optical and/or geometric property. For this purpose, the ophthalmic lens calculated with the surface model may be checked for compliance with the desired or requested properties, for example using exceeding or falling below suitably selected thresholds.

Given varifocal lenses, for example, one or more of the following properties may be checked:

the residual astigmatism (optimally in the usage position) along the primary sight line;

fulfilling the standard optical effect or the permissible deviation of the optical effect (for example sphere and/or cylinder and/or prism) at the reference points;

desired or permissible vertical and/or horizontal prism at least at one prism reference point;

desired or permissible deviation of the vertical and/or horizontal prism at least at one prism reference point between the left lens and right lens;

maximum permissible gradients of the residual astigmatism and/or of the refraction error (respectively optimally in the usage position);

distribution of the residual astigmatism and/or of the refraction error (respectively optimally in the usage position);

desired width of the zones of good vision;

sufficient smoothness of the surfaces;

production capability of the surfaces (for example absence of undercuts);

absence of undercuts of the surfaces, in order to ensure production capability;

sufficient thicknesses in order to achieve breaking strength (quantified using, for example, static load tests or dynamic load tests).

It is possible to also check other or additional properties. However, it may be advantageous to already decide, before the calculation with the surface model, whether a correction of the surfaces calculated with the surface model is necessary. For example, this may be decided using the proportion of the surfaces which do not satisfy the requested properties (for example if this proportion exceeds a determined threshold).

It may likewise be advantageous to continuously check each ophthalmic lens generated with the surface model for the fulfillment of desired or requested properties, in order to individually decide for each lens whether a correction is necessary. Such a check is preferably only to be applied if the computing capacity applied for checking, averaged over the ophthalmic lenses to be calculated, is less than the saved computing capacity of the correction calculations (for example post-optimization or post-calculation).

A correction of the ophthalmic lenses calculated with the surface model, starting from these surfaces, may consequently take place independently of whether the fulfillment of the requested properties of the ophthalmic lens is checked or not.

For example, the correction may take place with methods according to the prior art. For example, it is possible to calculate the surfaces of the ophthalmic lens in a post-optimization which comprises few optimization steps of an established optimization method for ophthalmic lenses. The surfaces output by the surface model may be used as a starting point (what is known as a starting surface) of the post-optimization.

It is likewise possible to generate the surfaces of the ophthalmic lens in a post-calculation via superposition of the surfaces calculated by the model with one or more superposition surfaces. For example, simple spheroidal-toroidal superposition surfaces, or more complex superposition surfaces such as described in, for example, US 2018/0088353 A1 or EP 1 240 541 B1 may be used as superposition surfaces.

Alternatively, a calculation may also take place with a second surface model. The second surface model may contain a regression model, for example.

It may likewise be advantageous to perform further corrections of the surfaces calculated with the surface model and possibly already corrected. For example, if it is known which systematic deviations of the surfaces or of the optical properties of the ophthalmic lens arise in production, they may likewise be corrected with the aid of a established method, for example with the aid of the method described in WO 2014/076155 A1.

Additionally, the surface or surfaces of the ophthalmic lens may again be checked for fulfillment of the desired or requested properties after the correction. If the ophthalmic lens does not fulfill the desired or requested properties, the production of the lens may be stopped in order to manually check the order. This ensures that the production or even delivery of unsuitable lenses is prevented. In particular, failed post-optimizations may thus be discovered.

It is likewise advantageous to store the information about fulfillment or non-fulfillment of the requested properties together with the order parameters for a later evaluation, for example in a database.

If an ophthalmic lens was ultimately post-optimized after its calculation via the surface model, its surface or its surfaces may be stored as a new data set in a database, together with the order parameters and, if applicable, other variables derived therefrom. This data set may be utilized in order to improve the surface model in that the surface model is re-determined or redefined under consideration of the newly accrued data. The database for the method according to the invention therefore grows steadily. The redefinition of the surface model may also take place with only a portion of the data sets stored in the database. The quality of the surfaces calculated with the surface model may thus be improved with every post-optimized lens.

A correction of the surface or surfaces calculated with the surface model may be omitted if, for example, the deviation of the order parameter set of the ophthalmic lens to be calculated, and/or of variables derived therefrom, from the order parameter set necessary to determine the surface model, which order parameter set is most similar to the order parameter set of the lens to be calculated, is less than a predefined threshold. The deviation may be measured using a suitably determined distance measure which may be chosen so that the sensitivity of the surface or of the surfaces is taken into account by the order parameters. For example, the deviation may be described or quantified using the squares of the rise differences or the differences of the desired properties of two ophthalmic lenses with different order parameters.

Continuous Improvement of the Surface Model

It is possible to check and/or modify the model parameters of the surface model continuously or at regular intervals. If ophthalmic lenses must be post-optimized or newly optimized, the data of the surfaces of the ophthalmic lenses that are required for this are added and may be used, together with the associated order parameters, for the adaptation of the model parameters. For adaptation, optimization algorithms may preferably be used that use only a portion of the data, for example stochastic gradient descent or limited memory BFGS. However, optimization algorithms that require the complete data set may likewise be used.

A check and/or adaptation of the model parameters of the surface model may, for example, take place after every recalculated or re-optimized ophthalmic lens or after a predetermined number of recalculated or re-optimized ophthalmic lenses. In the simplest scenario, this number may be constant.

Another possibility is to only perform an adaptation when a fixed proportion (for example 10%) of the data already used for determining the model parameters has been re-optimized or post-optimized. It may also be suggested to perform the adaptation of the model parameters of the surface model, if computing time is available (for example if few ophthalmic lenses need to be calculated).

If the model parameters of the surface model should be adapted, in that exclusively new data sets from the post-optimization are used, then it is also possible to select the learning rate (i.e. the strength of the adaptation of the model parameters in an adaptation step) in the adaptation of the model parameters to be proportional to the proportion of the number of new data sets in the number of data sets used overall for training. The learning rate is reduced in this way in each adaptation and ensures the convergence of the model parameters.

Hybrid Calculation and Optimal Selection of the Complexity of the Surface Model

According to one example, a hybrid method for determining the at least one of the surfaces of one or more ophthalmic lenses may be provided, comprises a determining of the at least one of the surfaces by means of a predefined surface model from the order parameters and/or from variables derived therefrom, and a subsequent correction or post-calculation of the at least one surface determined with the surface model. The correction may be one of the corrections described above.

It may be advantageous to adjust the complexity of the surface model so that, on average, the computing cost for the calculation of the surfaces of the ophthalmic lenses with the surface model, together with the computing cost for a post-calculation or a correction, is minimized.

$Z(F\_m(a\_m))$ is the quality of the surfaces $F\_m(a\_m)$ calculated with the surface model, said quality being measured with the aid of the target function Z. $Z(F\_n(a\_n; F\_m(a\_m)))$ is accordingly the quality of the surfaces $F\_n (a\_n; F\_m(a\_m))$ calculated, starting from the surfaces $F\_m (a\_m)$, via post-calculation with the computing cost $a\_n$. In order to minimize the computing cost, the complexity of the surface model may be chosen so that the improvement of the target function via calculation by means of surface model is, per additional computing cost $a\_m$, exactly as great or greater than the initial improvement of the target function via post-calculation starting from the surfaces calculated with the surface model given vanishing computing cost $a\_n=0$. The evaluation of the surface model must thus have the smallest computing cost $a\_m$ for which $$dZ(F\_m(a\_m))/da\_m(a\_m)>=dZ(F\_n(a\_n; F\_m (a\_m=0)))/da\_n$$

applies.

In this context, it is to be noted that the derivatives on both sides have a negative algebraic sign, since the target function becomes smaller with increasing computing cost.

It is possible to limit the range of the order parameters in which the surface model is used to the range of frequent orders, in order to keep the complexity of the model small and in this way to minimize the computing cost averaged across all ordered ophthalmic lenses. For example, this may be reasonable if specific sets of order parameters occur rarely and others occur very often. For example, the surface model may be used only for lenses with standard individual parameters and standard designs in the main order range (for example sphere between −4 dpt and +4 dpt; absolute value of the cylinder below 2 dpt; addition between 1.5 dpt and 2.5 dpt). The methods according to the prior art may then be used in the remaining range of the order parameters.

The complexity of the surface model may, for example, also be limited such that only order parameters with the greatest influence on the surface or surfaces of the ophthalmic lens are processed. The influence of the further order parameters on the surfaces may be corrected after the fact with a post-calculation or post-optimization. In one possible instance, given the calculation of spectacle lenses, the order parameters represented in the surface model or used to determine the surface model are reduced to prescription values and centering parameters, together with pantoscopic tilt, face form angle, and corneal vertex distance for the ophthalmic lens. The calculation of the surface or surfaces of the ophthalmic lens thereby remains more efficient than the previously practiced optimization based on a standard starting surface.

In the most extreme case, solely the refraction—in the absolute most extreme case only the spherical equivalent and, if applicable, the addition—may be used for calculation with the surface model.

It is likewise suggested to determine the range in which the surface model is used for calculation using the fulfillment or non-fulfillment of the properties requested for the ophthalmic lens. For this purpose, information about the fulfillment or non-fulfillment of these properties may be stored depending on the order parameters. The range in which the surface model is used may be determined with the aid of established classification algorithms such as, for example, with logistical regression or with support vector machines.

The range of the order parameters in which the surface model is used for calculation of the surfaces may likewise be continuously expanded: for example, if sufficient surfaces ultimately calculated with the aid of methods according to the prior art are available outside of the range of the order parameter in which the surface model is used for calculation, the model parameters of the surface model may be re-trained. The expanded range may also subsequently be recalculated as proposed above.

In the most general case, a plurality of surface models of differing in terms of complexity and/or embodiment may be used, depending on the order parameters.

Especially given individualized or personalized ophthalmic lenses, it may occur that a portion of the order parameters more frequently than the average assumes standard values in the distribution of the order parameters. Given partially individualized ophthalmic lenses, some order parameters may be set to a standard value and may not be changed upon order. Here, for the instances in which a portion of the order parameters has standard values, it is suggested to use a surface model reduced in terms of complexity which enables a simpler and therefore faster calculation, because the deviation from the standard values of the portion of the order parameters does not need to be represented by the surface model. The remaining orders may be calculated with the surface models of a higher complexity or identically with methods according to the prior art.

The division of in which ranges of the order parameters which surface model is used may be determined experimentally. The goal of an optimal division may be the rapid and resource-saving calculation of the ophthalmic lenses.

According to a third aspect of the invention, a computer program product is proposed which, when loaded into the memory of a computer and executed on said computer, has the effect that the computer implements a method according to one of the above aspects. The computer may also be a computer system.

The method according to any of the above aspects may be implemented by means of a correspondingly designed device.

A fourth aspect of the invention relates to a device for determining a surface model for calculating at least one surface of at least one ophthalmic lens (for example a contact lens or a spectacle lens) from at least one set of order parameters for the ophthalmic lens and/or from variables depending on the order parameters. The device comprises a computing device which is designed to implement the method according to the first aspect of the invention.

The device for determining a surface model comprises in particular:

a device for providing a training data set comprising a plurality of order parameter sets which respectively contain values of at least one portion of the parameters necessary to order at least one ophthalmic lens;

a device for providing at least one target value of at least one predetermined property of the at least one ophthalmic lens for each of the order parameter sets in the training data set;

a device for providing at least one surface model parameterized by model parameters, with which—for given values of the model parameters—at least one surface of at least one ophthalmic lens may be calculated at least from an order parameter set and/or from variables depending on an order parameter set; and a computing device which is designed to obtain or determine the surface model for calculation of at least one surface of at least one ophthalmic lens, wherein the obtaining or determining of the surface model comprises:

determining optimized values for the model parameters of the at least one surface model using the provided target values.

The determination of optimized values for the model parameters of the at least one surface model comprises, for example:

optimizing the values of the model parameters of the at least one surface model with the goal of minimizing or maximizing a target function, depending on the model parameters and on the provided target values, for the model parameters of the at least one surface model, wherein the target function for the model parameters for each of the order parameter sets contains at least one term which assumes a minimum or maximum when the provided target value of the at least one property of the at least one ophthalmic lens for the respective order parameter set coincides with the value of the same property of at least one lens that can be or is calculated with the surface model for given values of the model parameters of the surface model for the corresponding order parameter set.

A fifth aspect of the invention relates to a device for determining at least one of the surfaces of one or more ophthalmic lenses by means of a previously determined surface model, from the order parameters and/or from the variables depending on the order parameters. The device is designed to implement the method for determining at least one of the surfaces of at least one ophthalmic lens according to any of the above aspects. The device for determining at least one surface of an ophthalmic lens in particular comprises:

a device for providing an order parameter set for the at least one ophthalmic lens;

a device for providing a surface model for calculating at least one surface of at least one ophthalmic lens from a set of order parameters for the at least one ophthalmic lens and/or from variables depending on the order parameters; and a computing device which is designed to implement a determination of surface data of the at least one surface of the at least one ophthalmic lens with the aid of the surface model, from the provided order parameter set.

The surface model may be a surface model that was determined or ascertained according to the method in accordance with any of the previously described aspects.

The aforementioned preferred embodiment variants or the aforementioned advantages also reasonably apply with regard to the above devices.

A sixth aspect of the invention relates to a data set comprising surface data of at least one surface of at least one ophthalmic lens, wherein the at least one surface has been determined according to the method for determining at least one of the surfaces of at least one ophthalmic lens according to any of the above aspects. The data set may be or may have been stored permanently or non-permanently on a suitable data medium or in a storage device, for example a database, a computer cloud or data cloud etc.

The method described above for determining at least one of the surfaces of one or more ophthalmic lenses by means of a surface model, and the corresponding device, may be used in the production of ophthalmic lenses, for example in order to determine the surfaces to be produced, in the process of designing ophthalmic lenses, or in order to check the production capability of an ophthalmic lens using geometric properties of the surfaces. Expressed in a different way: The method for determining at least one of the surfaces of one or more ophthalmic lenses may be a component of a production or manufacturing method for ophthalmic lenses.

It is also possible to use the method for determining at least one of the surfaces of one or more ophthalmic lenses by means of a surface model in a consultation (for example with an optician), for example in order to clarify to the future wearer of such a lens the optical and geometric properties of an individualized or personalized ophthalmic lens (for example, position of the zones of clear seeing and thickness given varifocal lenses). Further aspects of the invention thus relate to a method and a corresponding device for producing an ophthalmic lens.

The method for producing an ophthalmic lens may comprise in particular:

determining at least one surface of at least one ophthalmic lens according to the method in accordance with any of the previously described aspects;

producing the ophthalmic lens with the at least one surface.

The device for producing an ophthalmic lens comprises in particular:

a device for determining at least one surface of at least one ophthalmic lens in accordance with any of the previously described aspects;

a production device for producing the ophthalmic lens with the at least one surface.

The aforementioned preferred embodiment variants or the aforementioned advantages also reasonably apply with regard to this method or this device.

The aforementioned devices for providing, determining, determining, or calculating data (for example variables derived from order parameters, model parameters, target values, surface data, weightings etc.) and/or for evaluating functions, for example target functions, may be realized via suitably configured or programmed data processing devices (in particular specialized hardware modules, computers, or computer systems, for example computer clouds or data clouds) with corresponding computing units, electronic interfaces, storage, and data transmission units. The devices may also comprise at least one interactive graphical user interface (GUI) which enables a user to view and/or input and/or modify data.

The aforementioned devices may also have suitable interfaces that enable a transmission or input or readout of data (for example order parameter sets, model parameters, target values, surface data etc.). The devices may likewise comprise at least one storage unit, for example in the form of a database, which stores the data that are used, for example order parameter sets, target values, surface data, weightings etc.

For example, the production device may comprise at least one CNC machine for direct processing of a blank according to the determined optimization specifications. Alternatively, the ophthalmic lens may be produced by means of a casting method. The finished processed ophthalmic lens preferably has a simple spherical or rotationally symmetrical, aspherical surface, and a surface determined according to any aspect of the method according to the invention with the aid of the surface model. The simple spherical or rotationally symmetrical aspherical surface is preferably the front face (i.e., the objective-side surface) of the ophthalmic lens. However, it is self-evidently possible to arrange the surface calculated with the surface model as a front face of the ophthalmic lens. Both surfaces of the ophthalmic lens and/or their arrangement relative to one another may also be determined with the aid of the surface model.

Furthermore, the invention offers a use of an ophthalmic lens produced according to the production method in accordance with the invention in a predetermined average or ideal usage position of the spectacle lens in front of the eyes of a determined wearer, for correction of an ametropia of the wearer.

Figure 2:
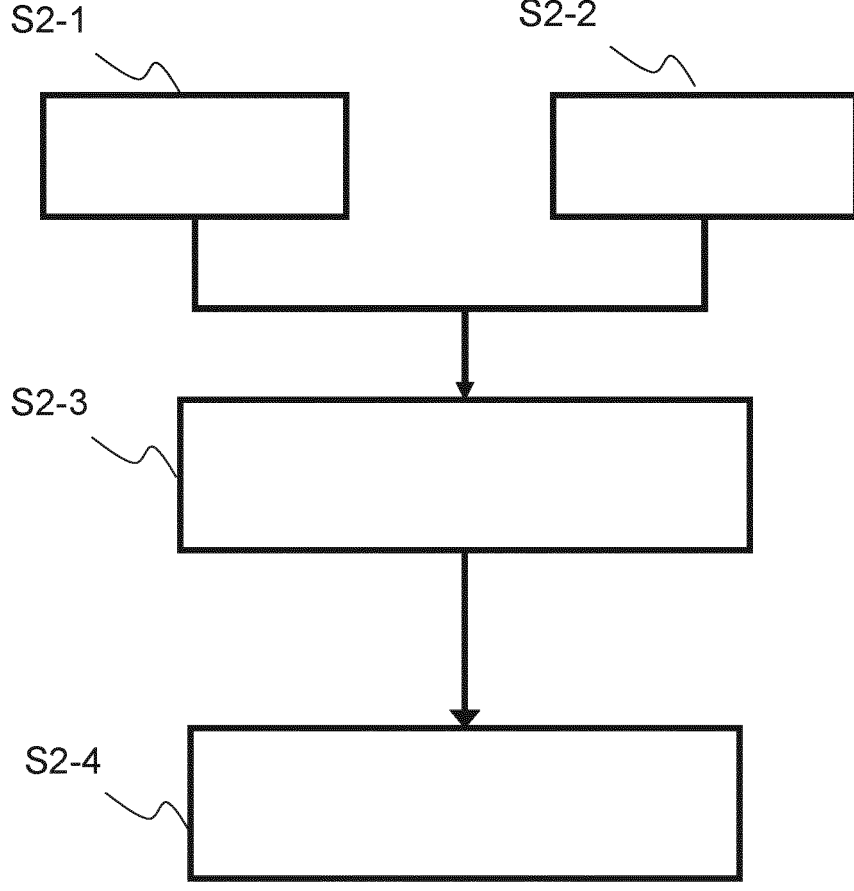
Figure 3:
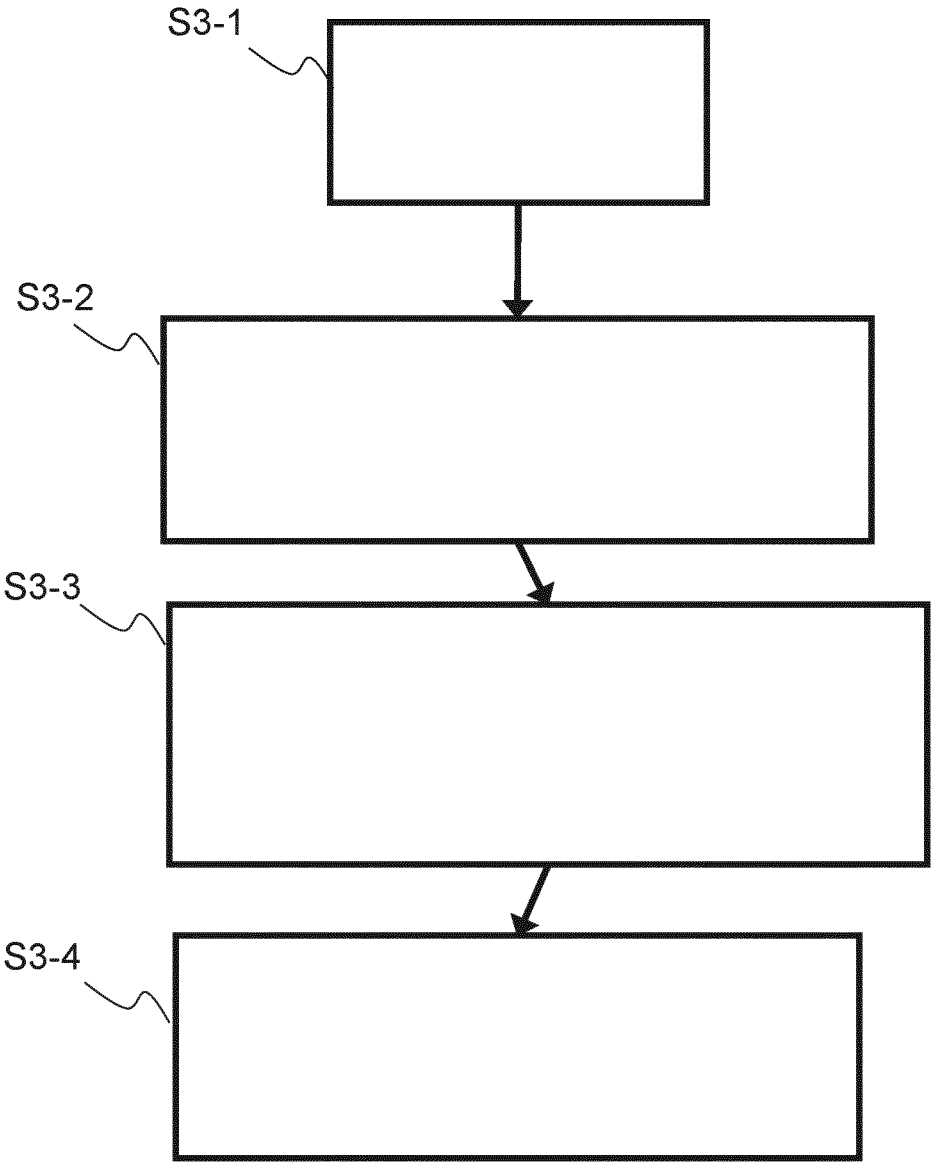
Figure 4:
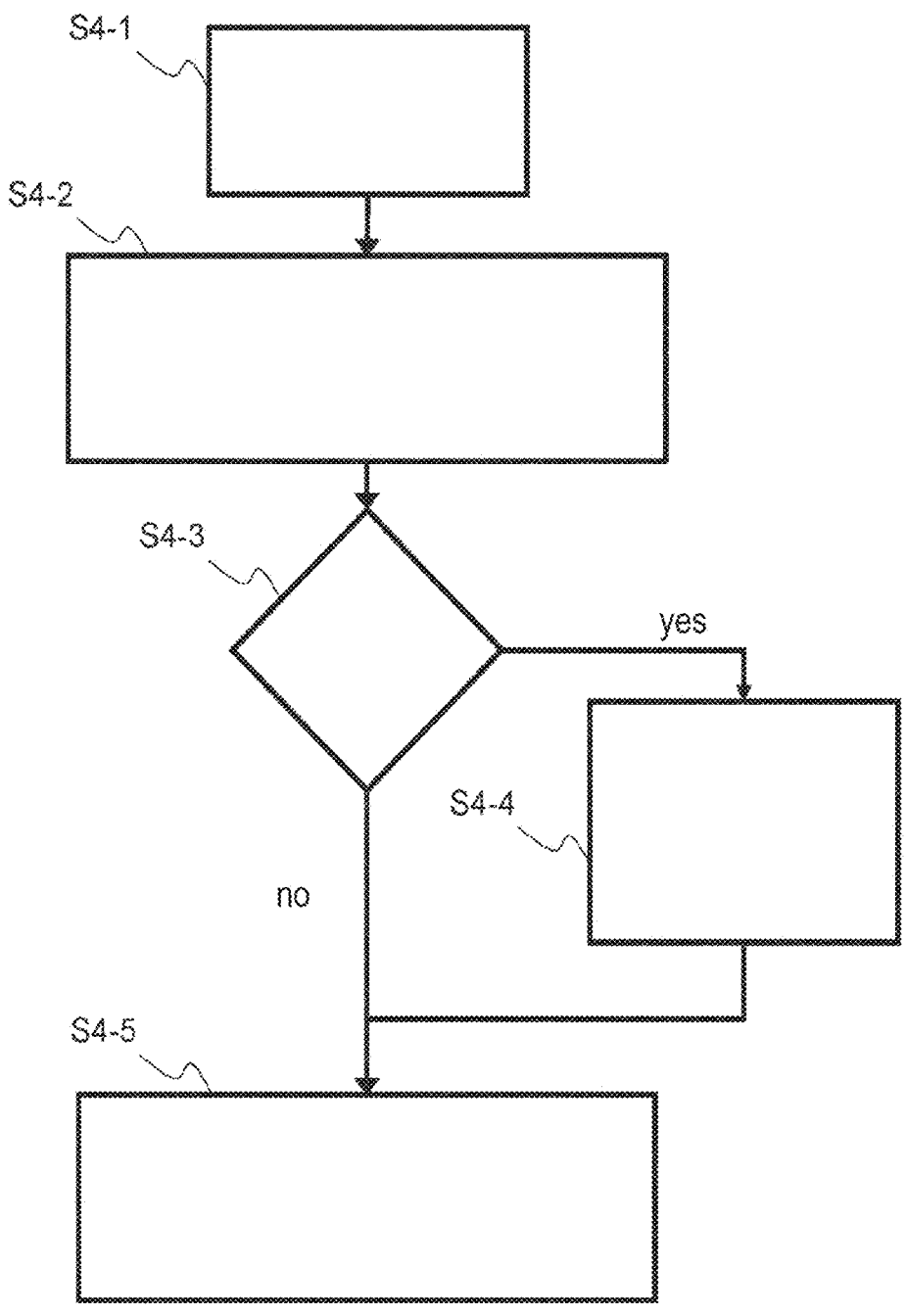
Figure 5:
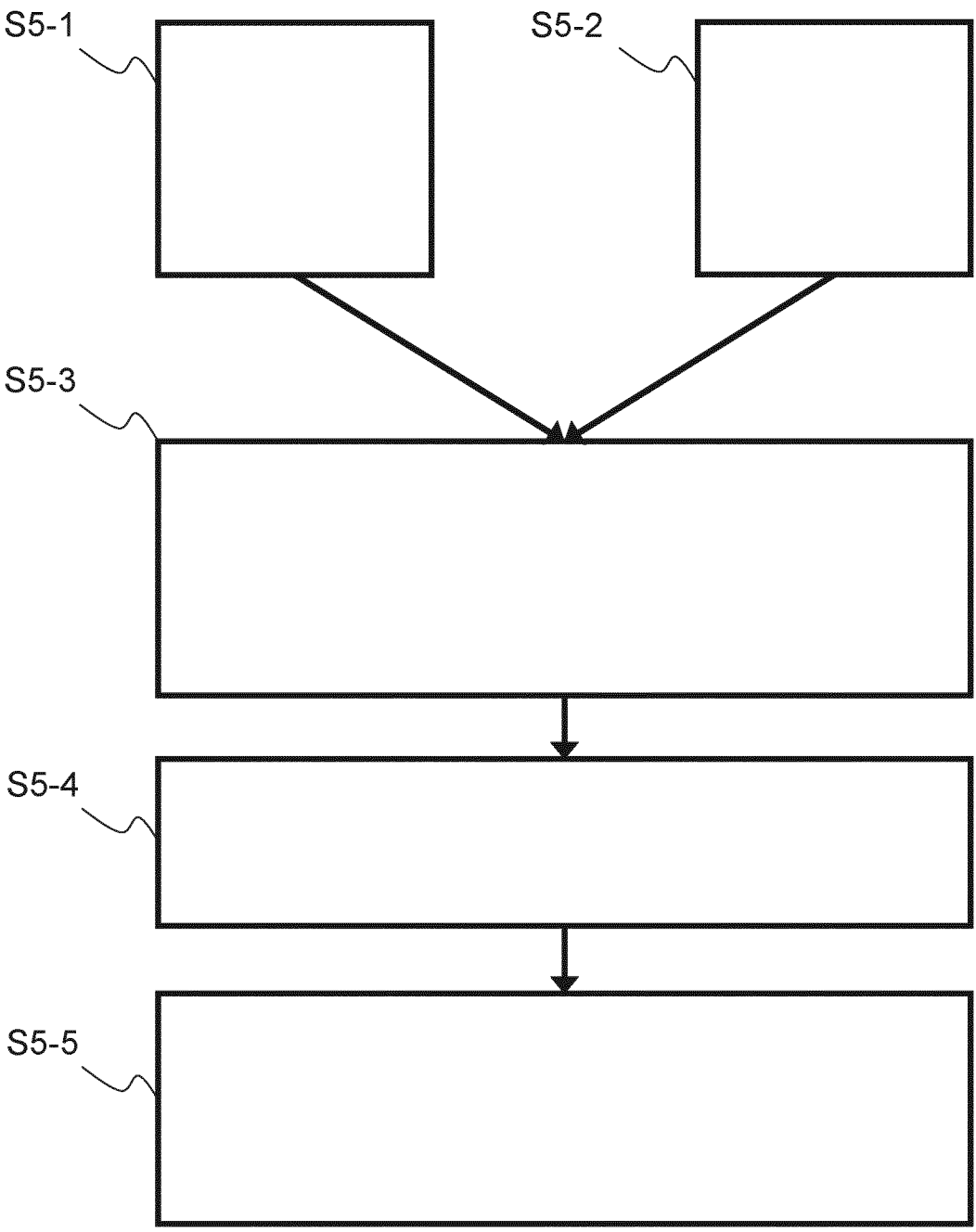
Figure 6:
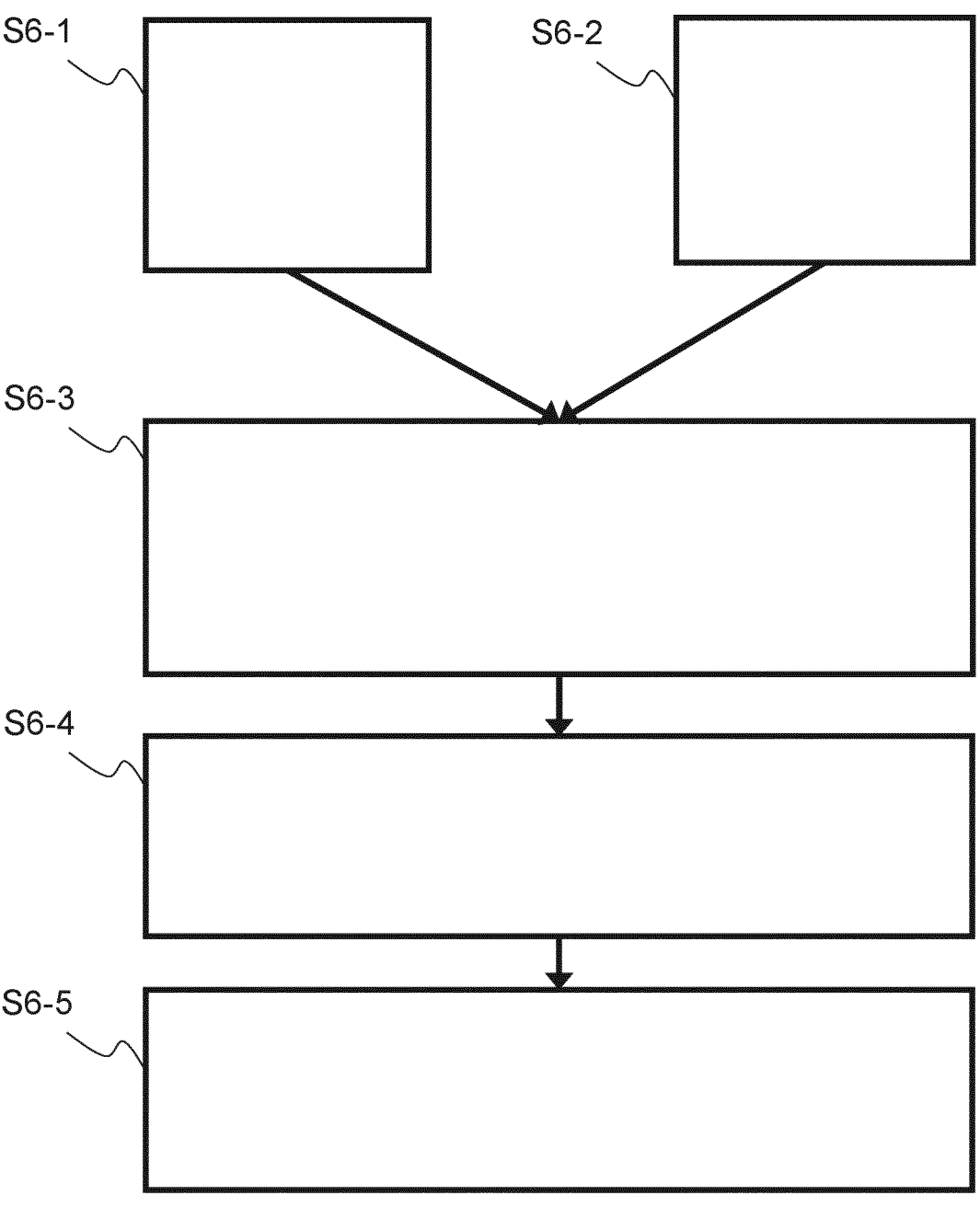
Figure 7:
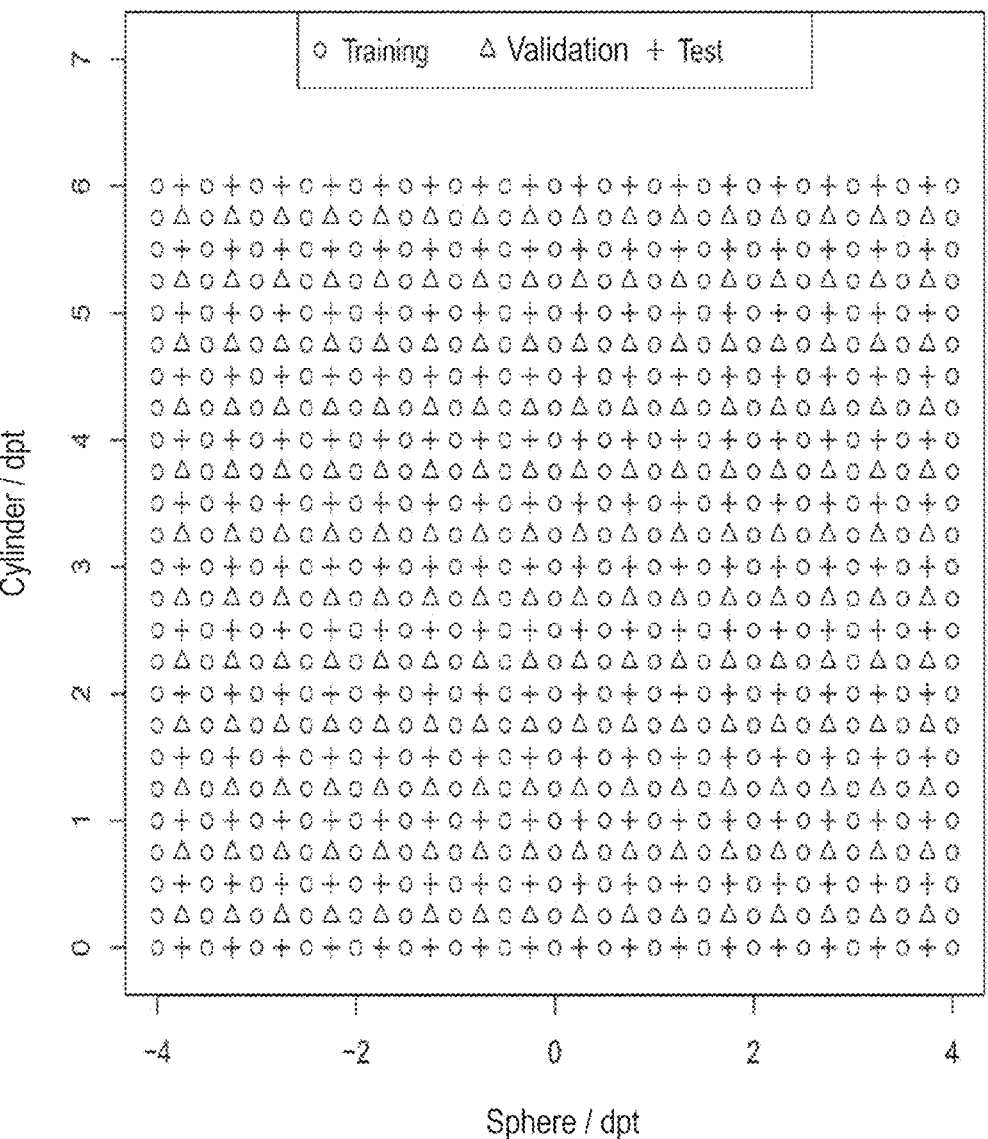
Figure 8A:
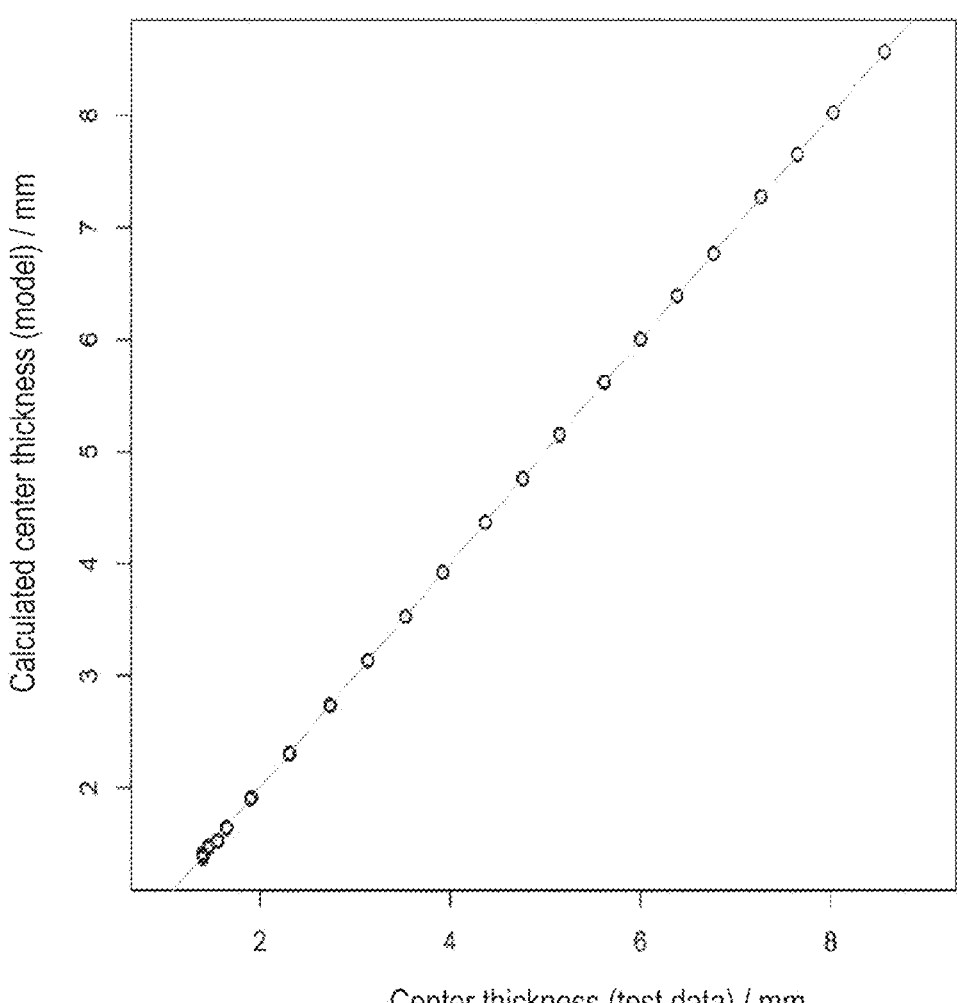
Figure 8B:
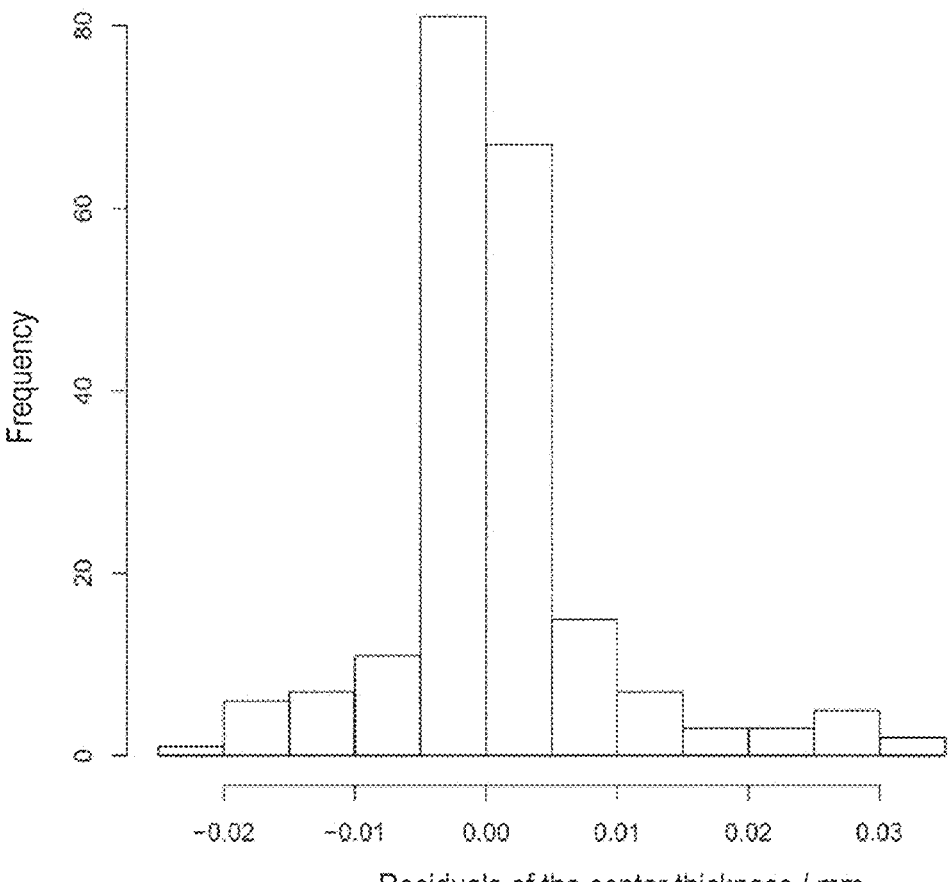
Figure 8C:
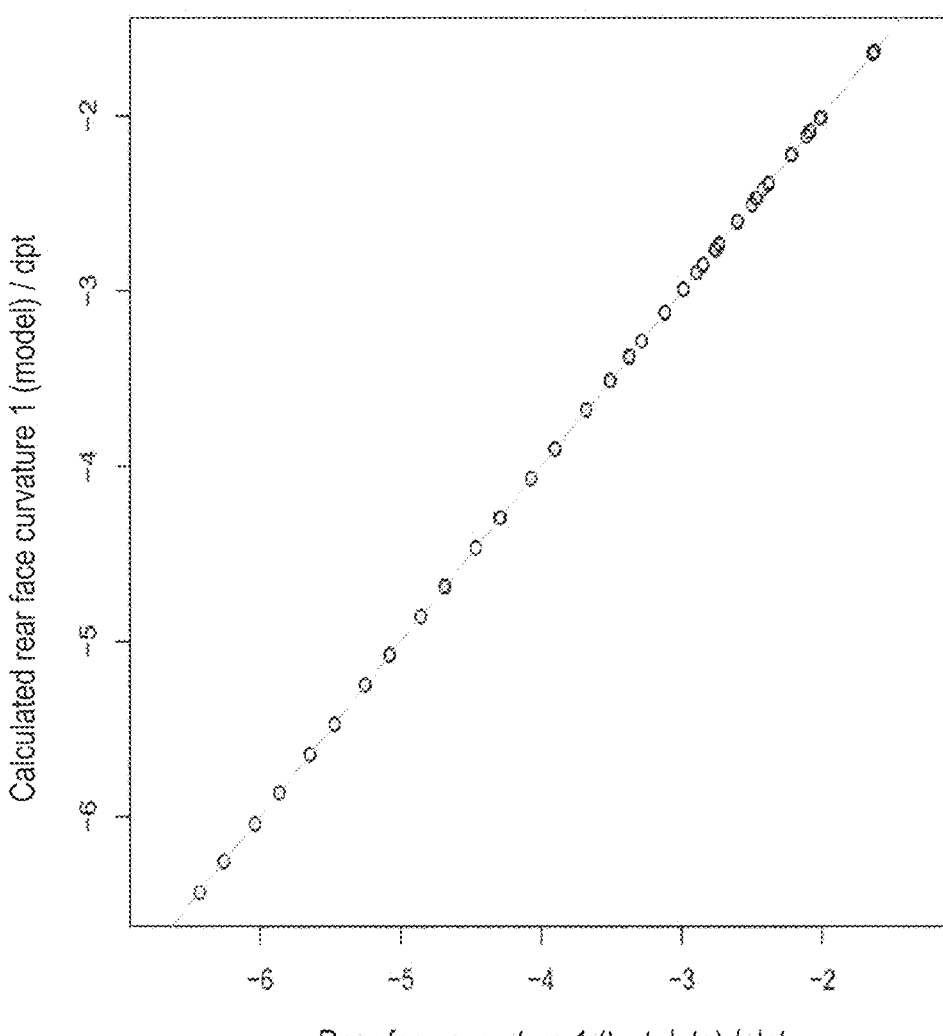
Figure 8D:
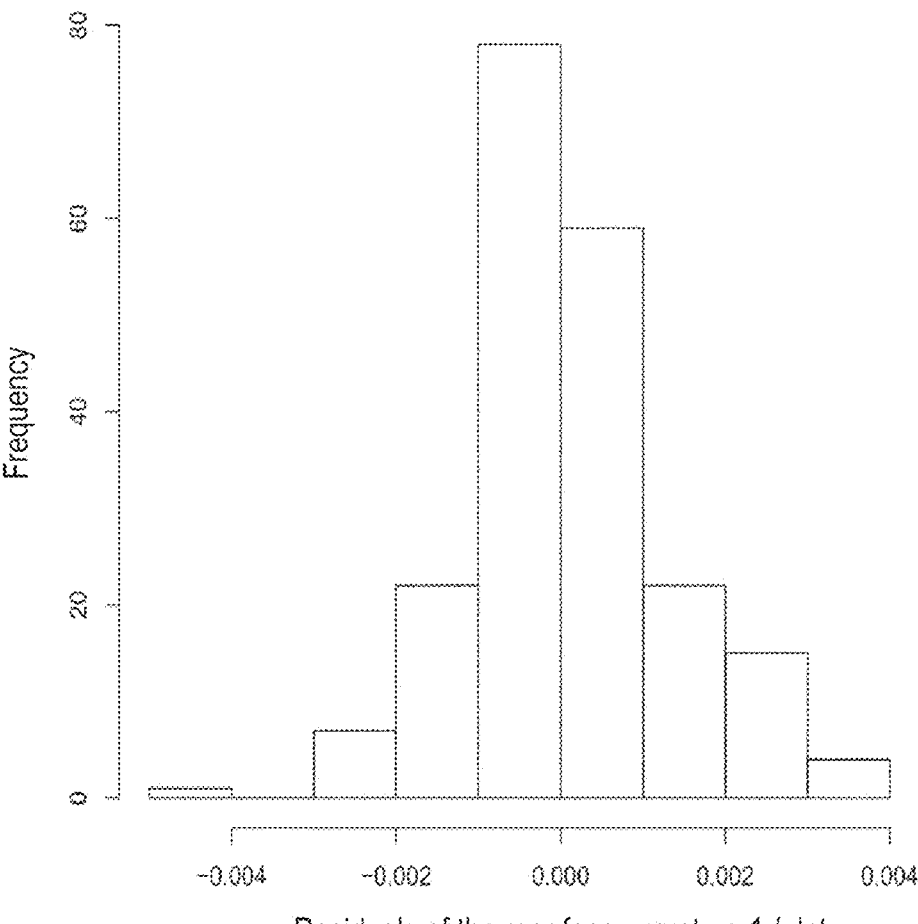
Figure 8E:
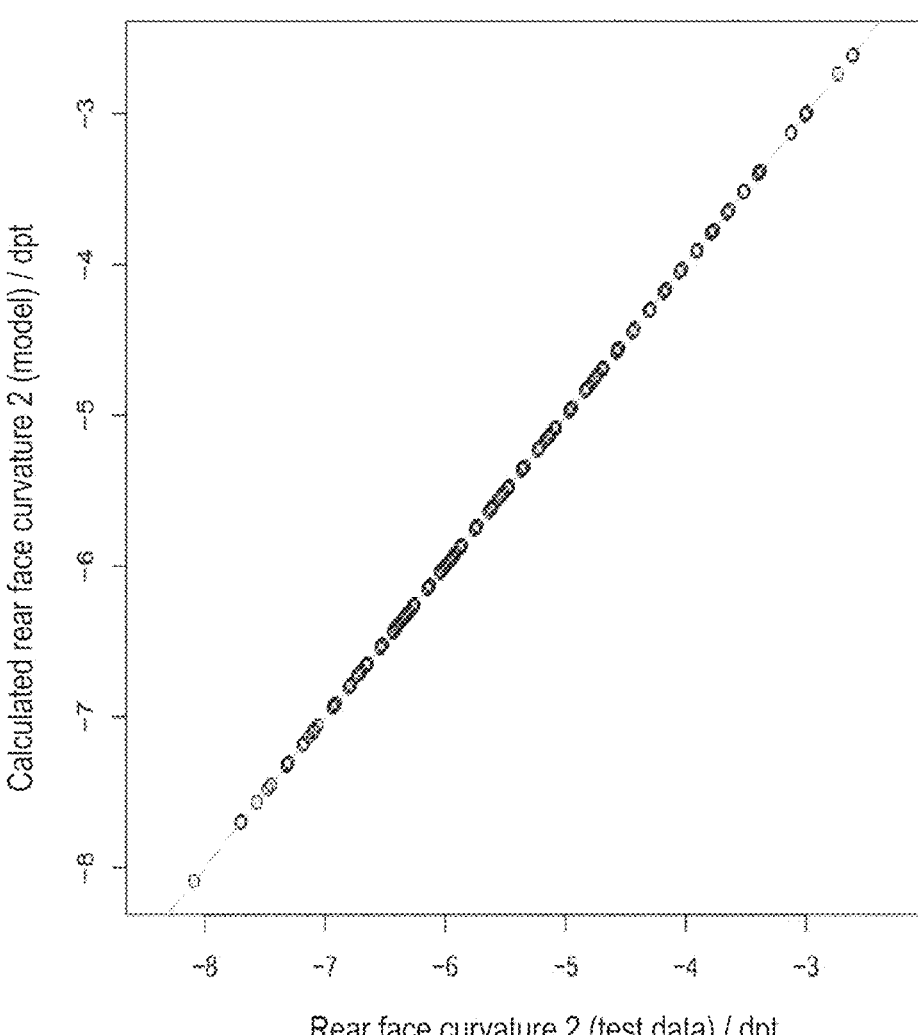
Figure 8F:
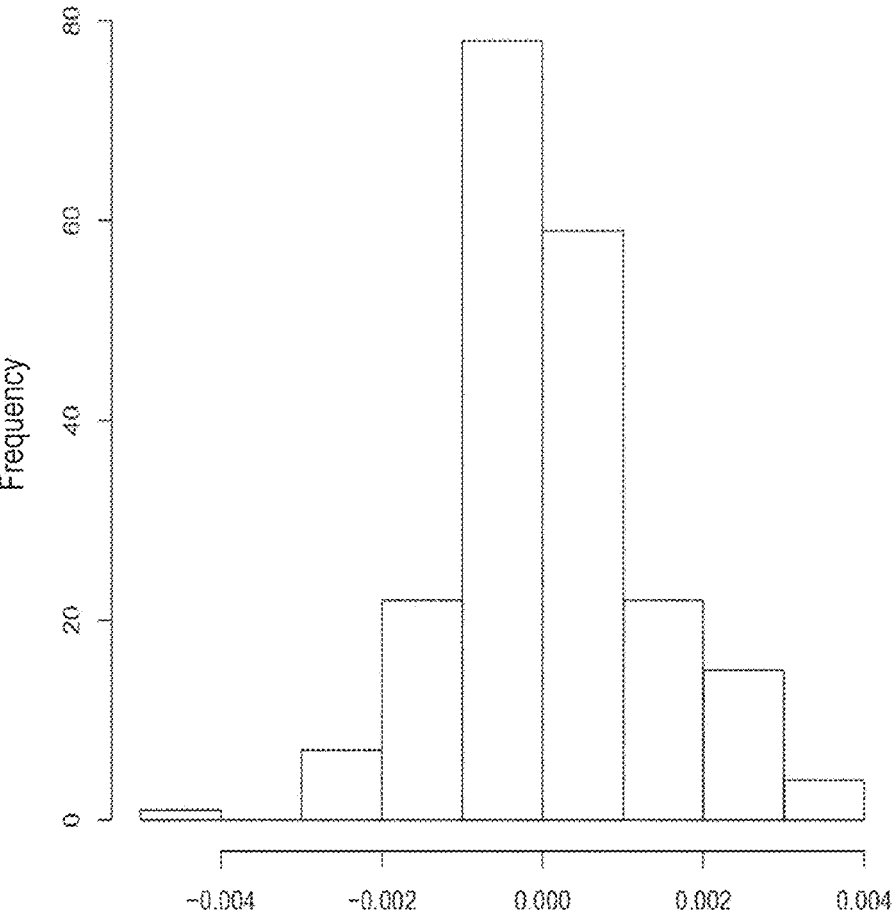
Figure 8G:
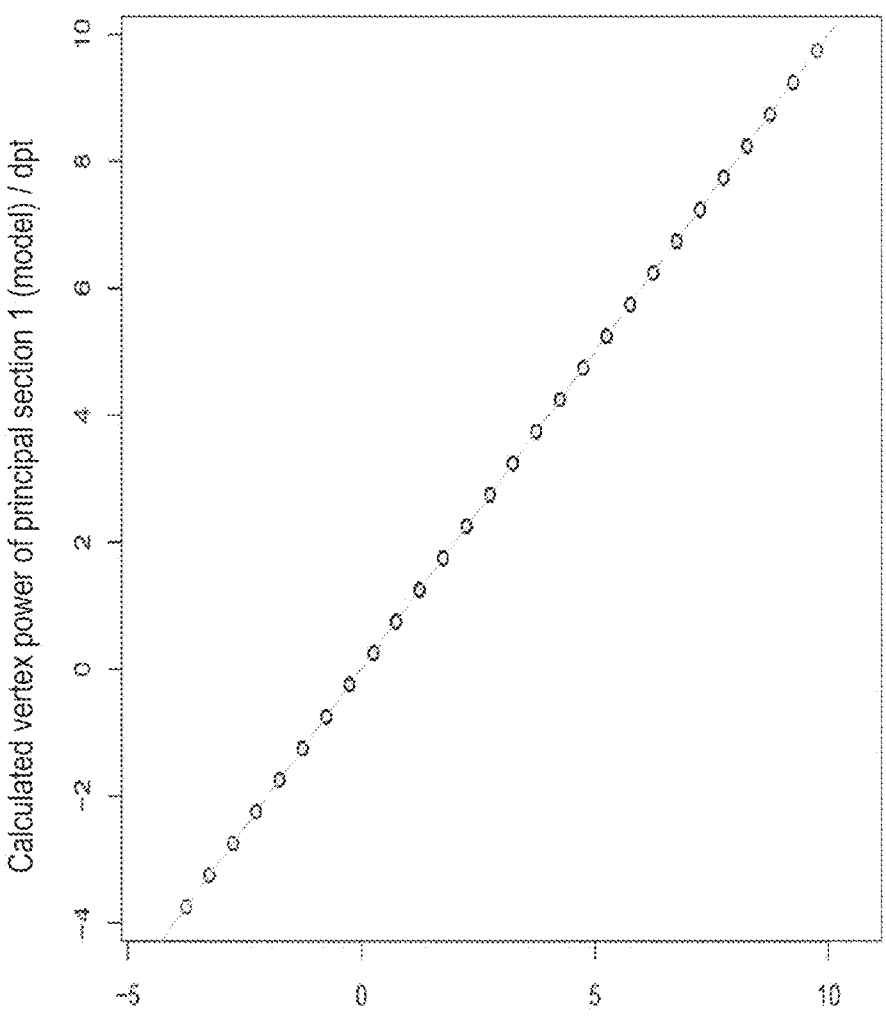
Figure 8H:
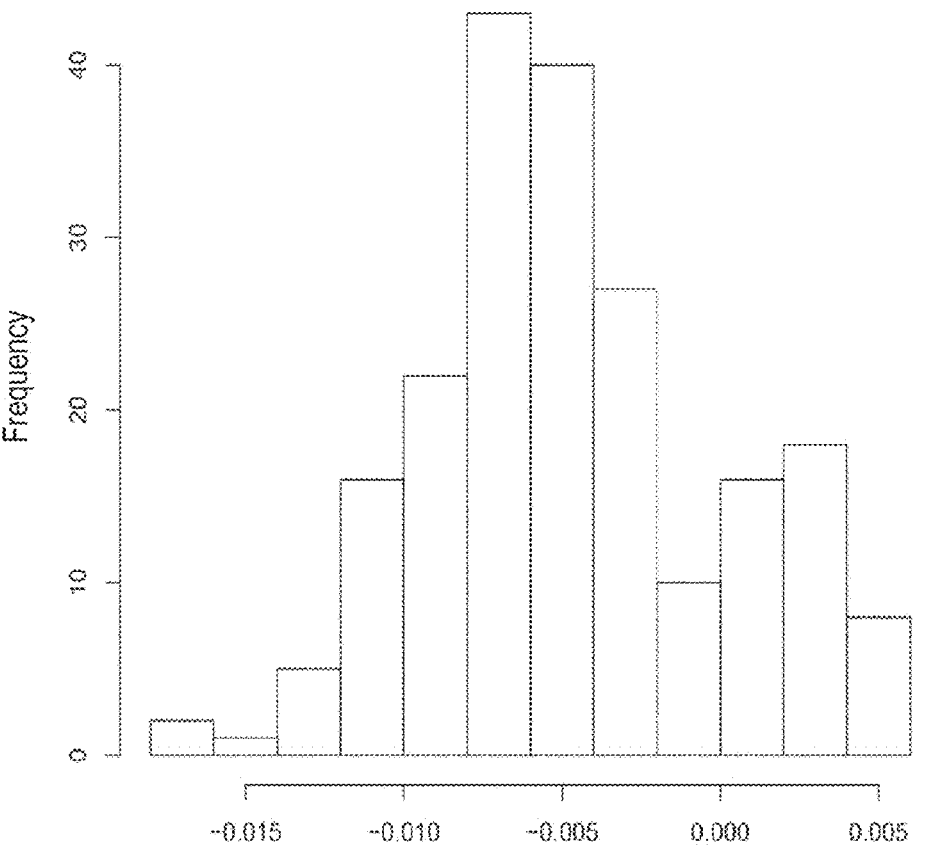
Figure 8I:
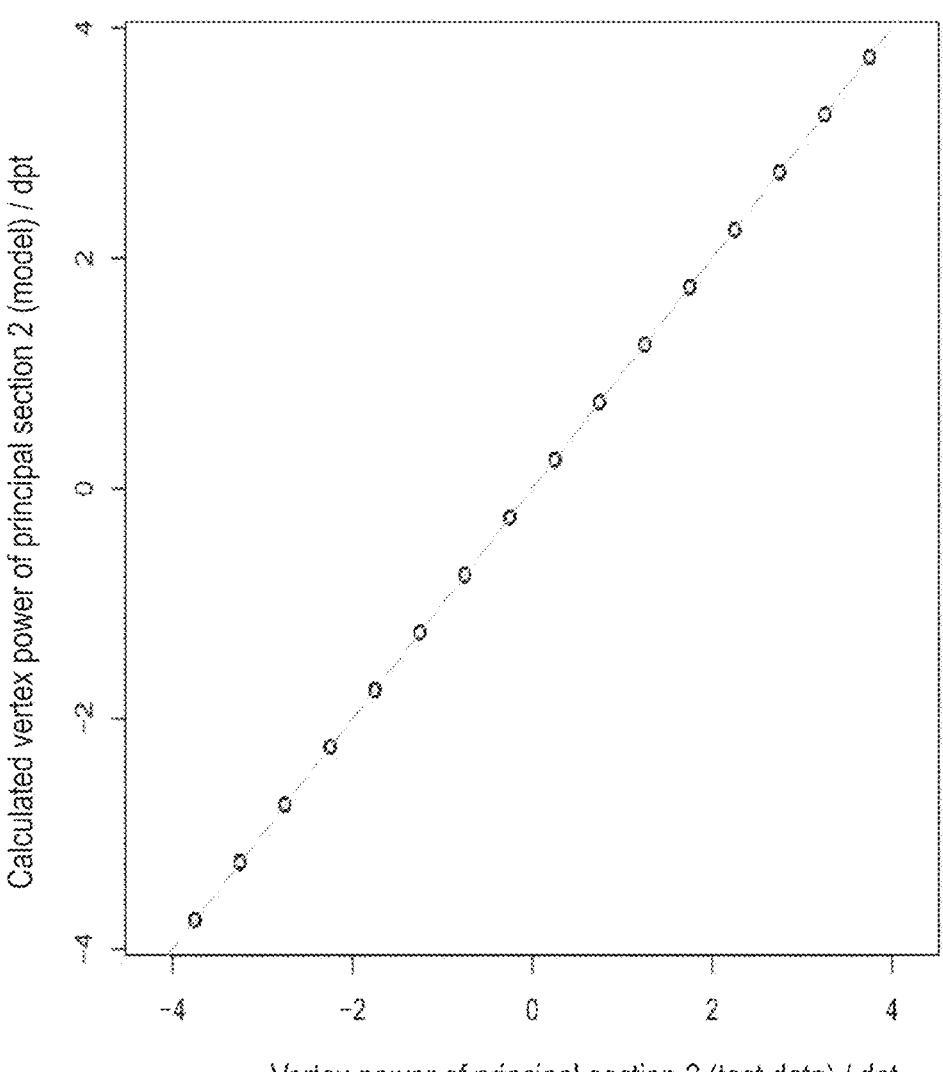
Figure 8J:
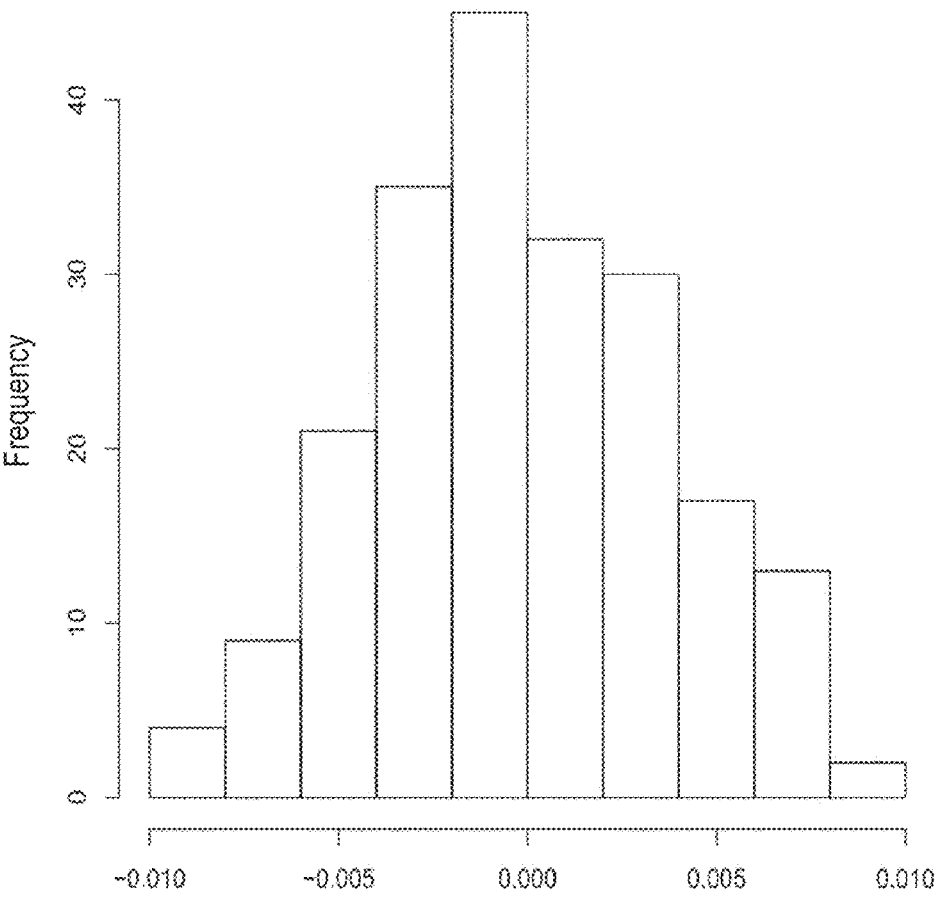
Figure 9A:
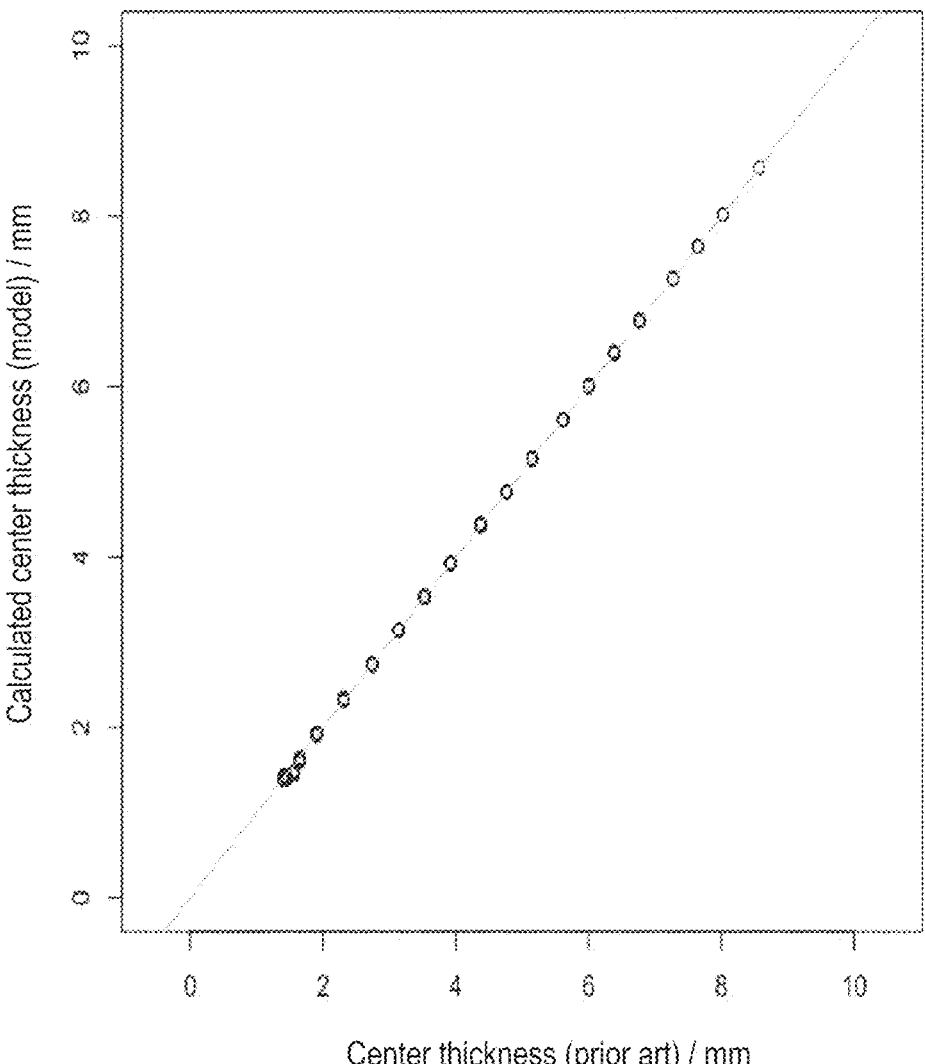
Figure 9B:
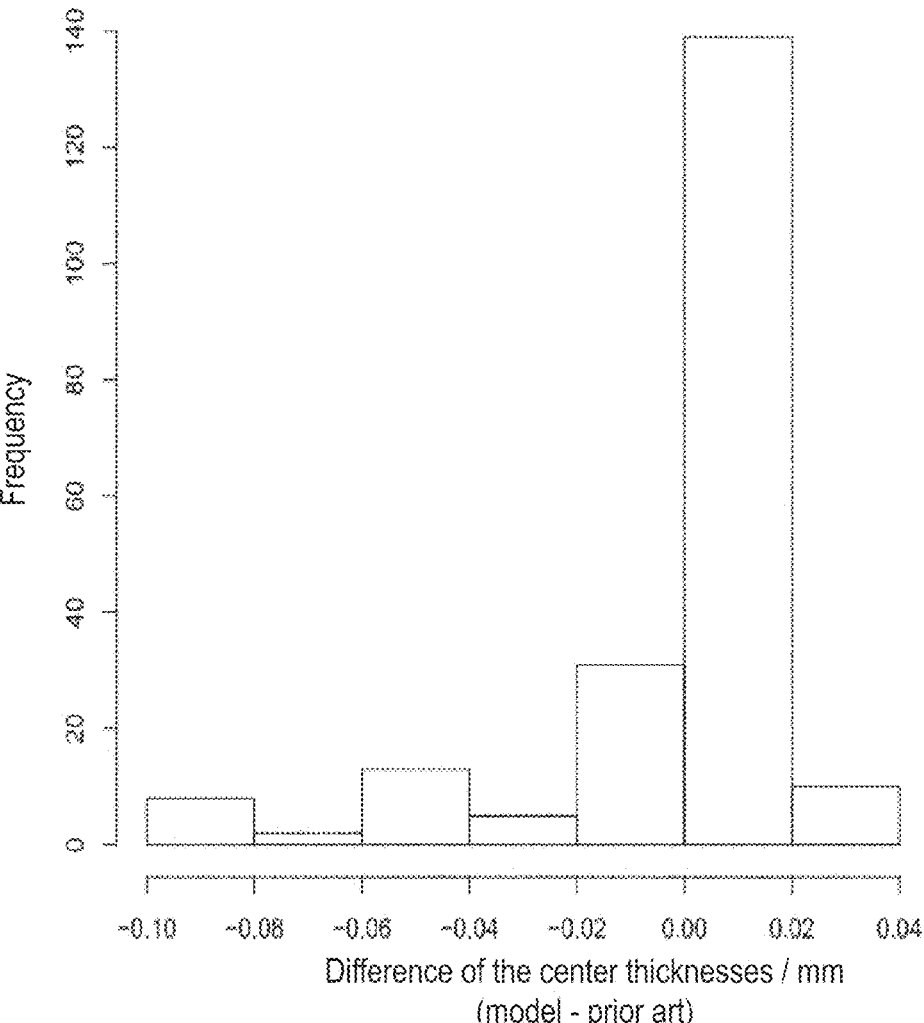
Figure 9C:
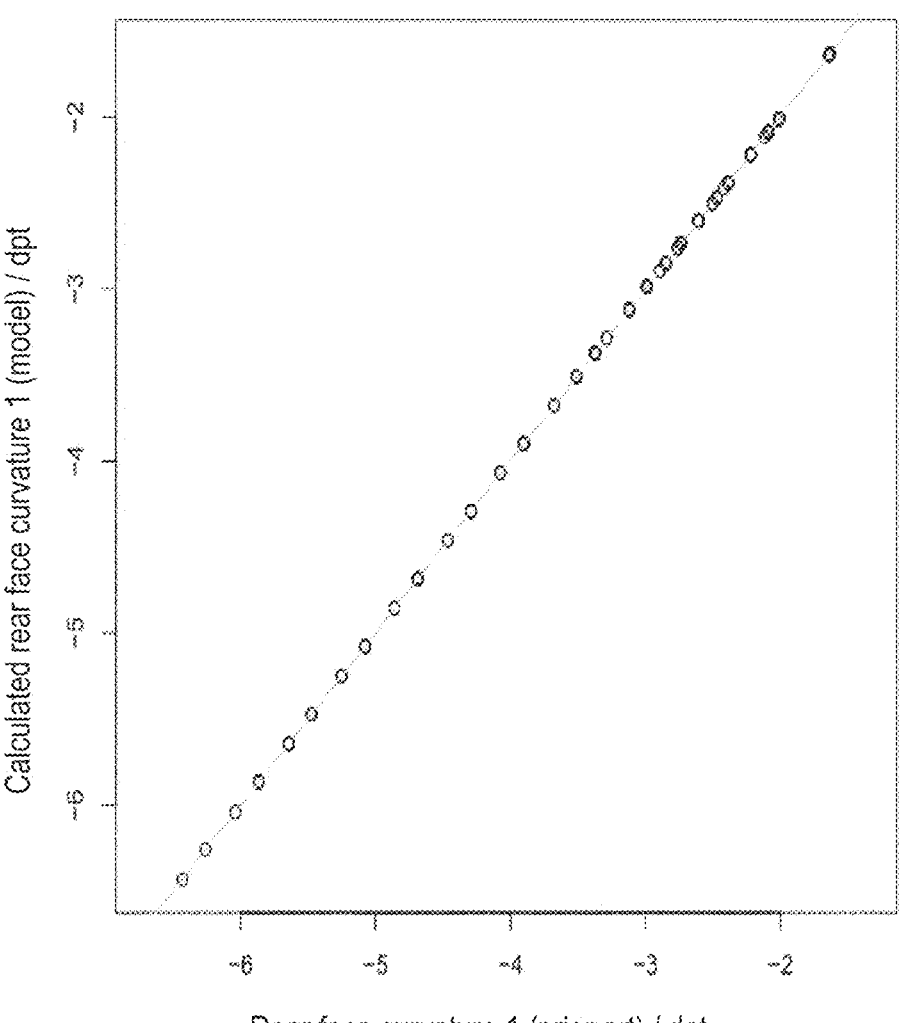
Figure 9D:
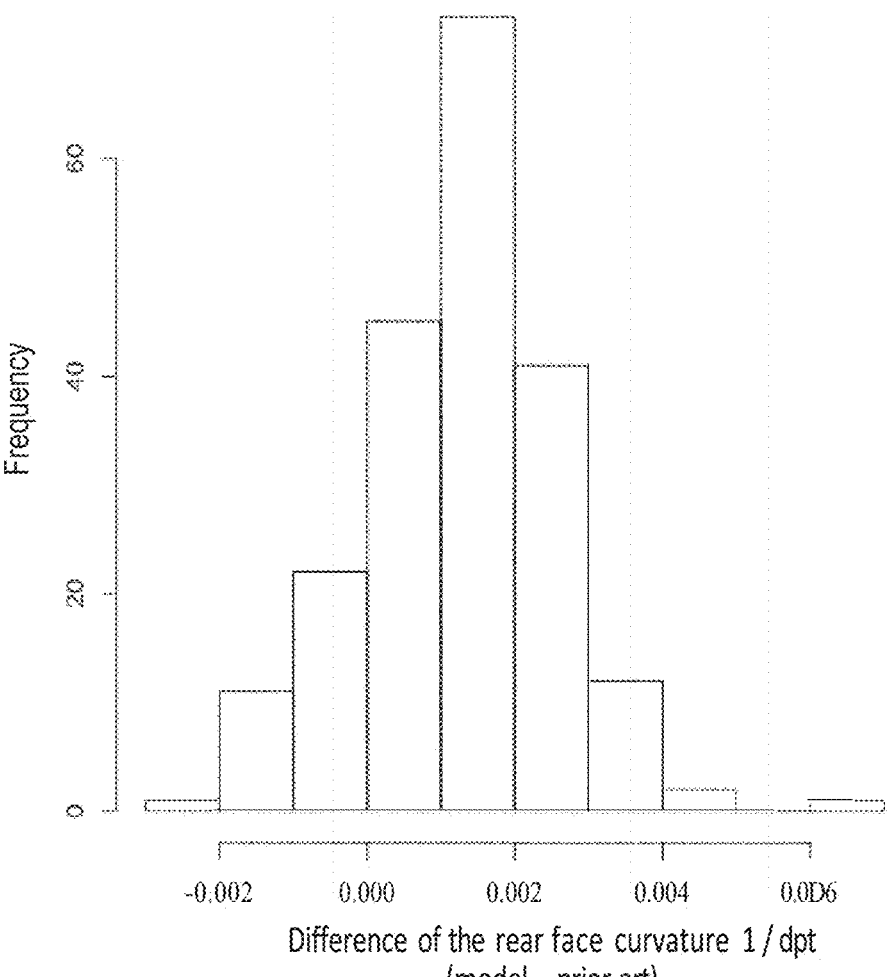
Figure 9E:
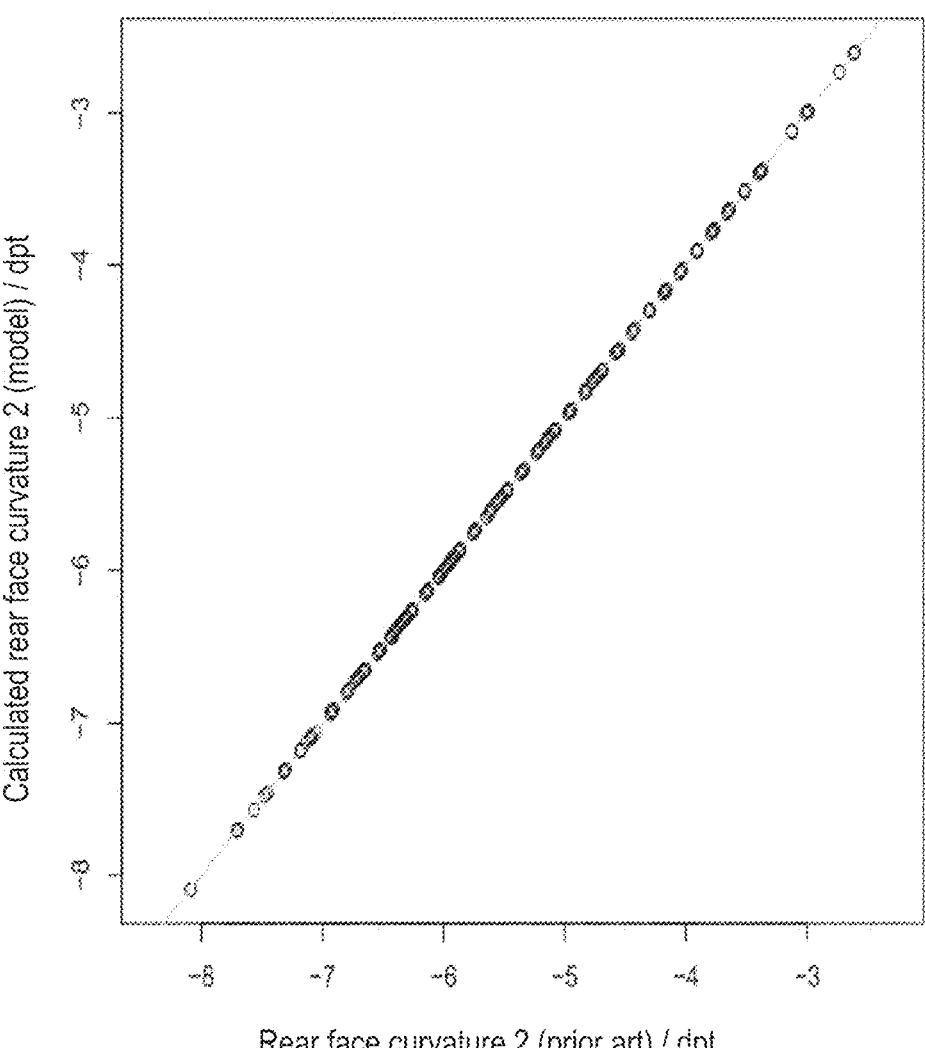
Figure 9F:
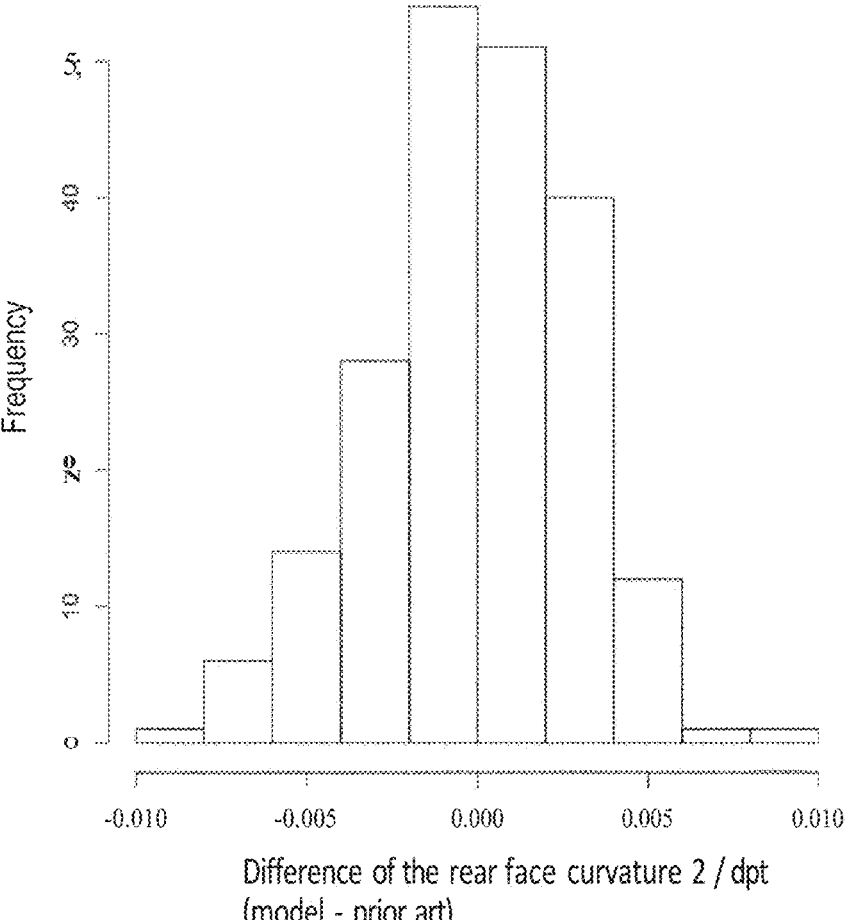
Figure 9G:
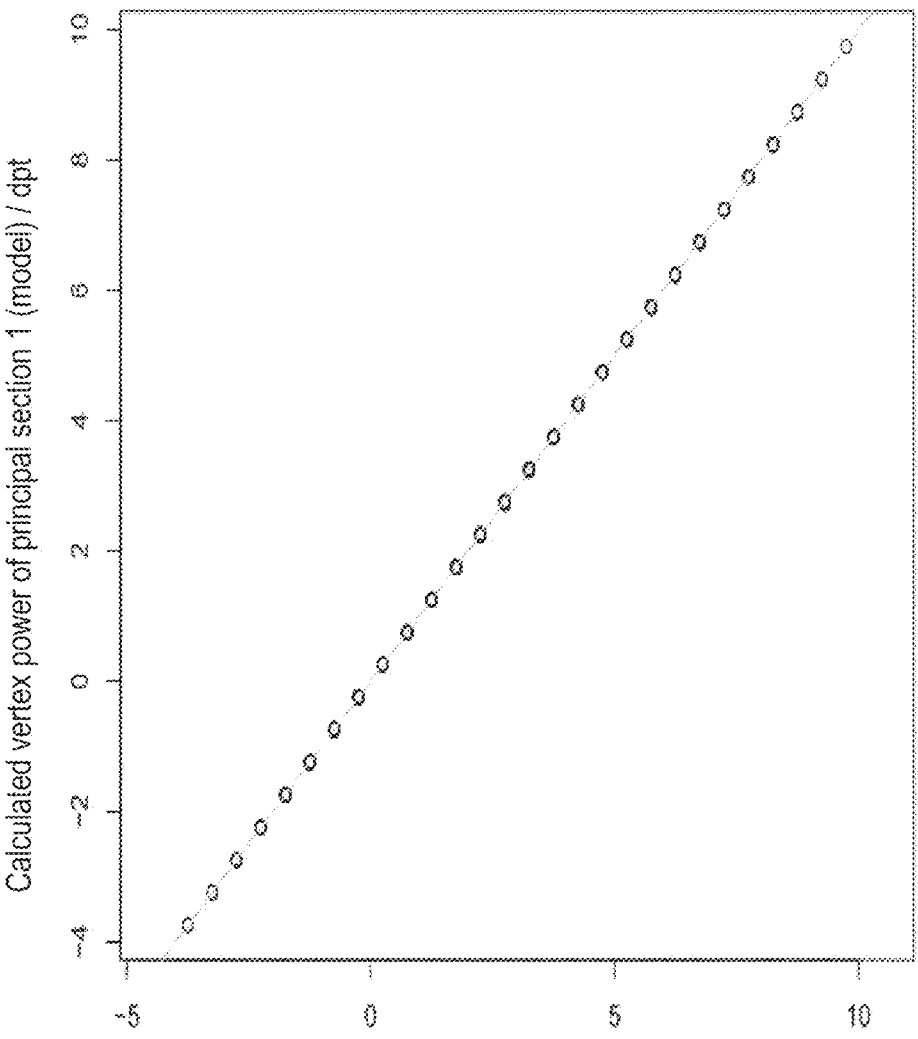
Figure 9H:
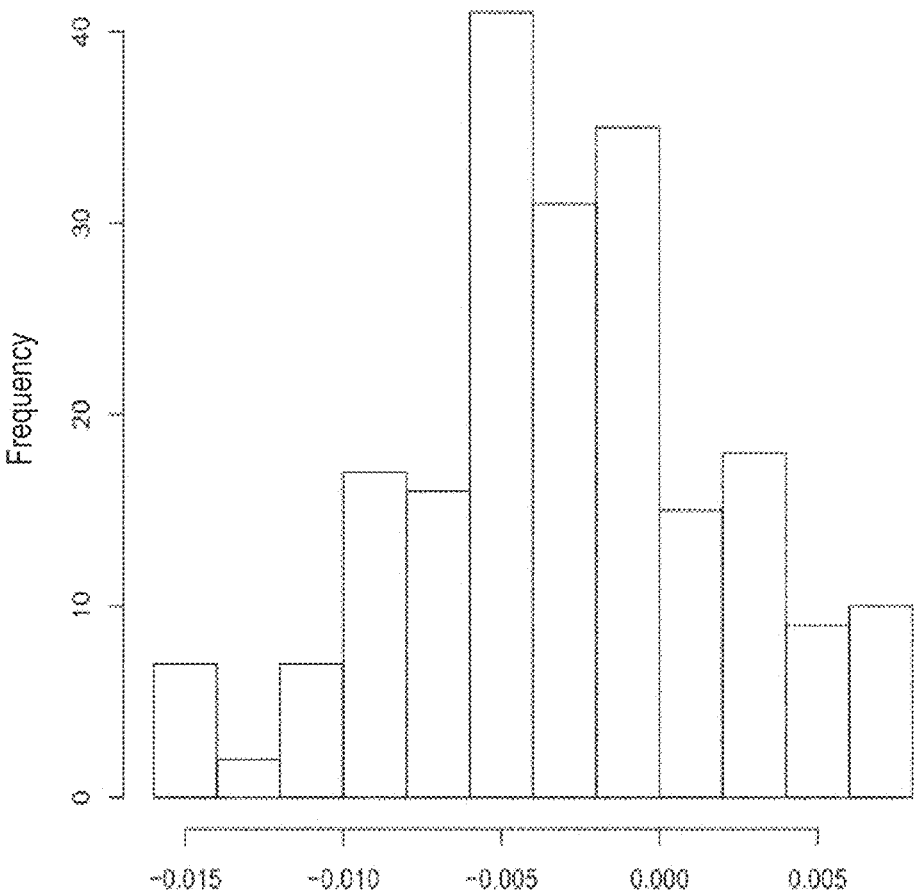
Figure 9I:
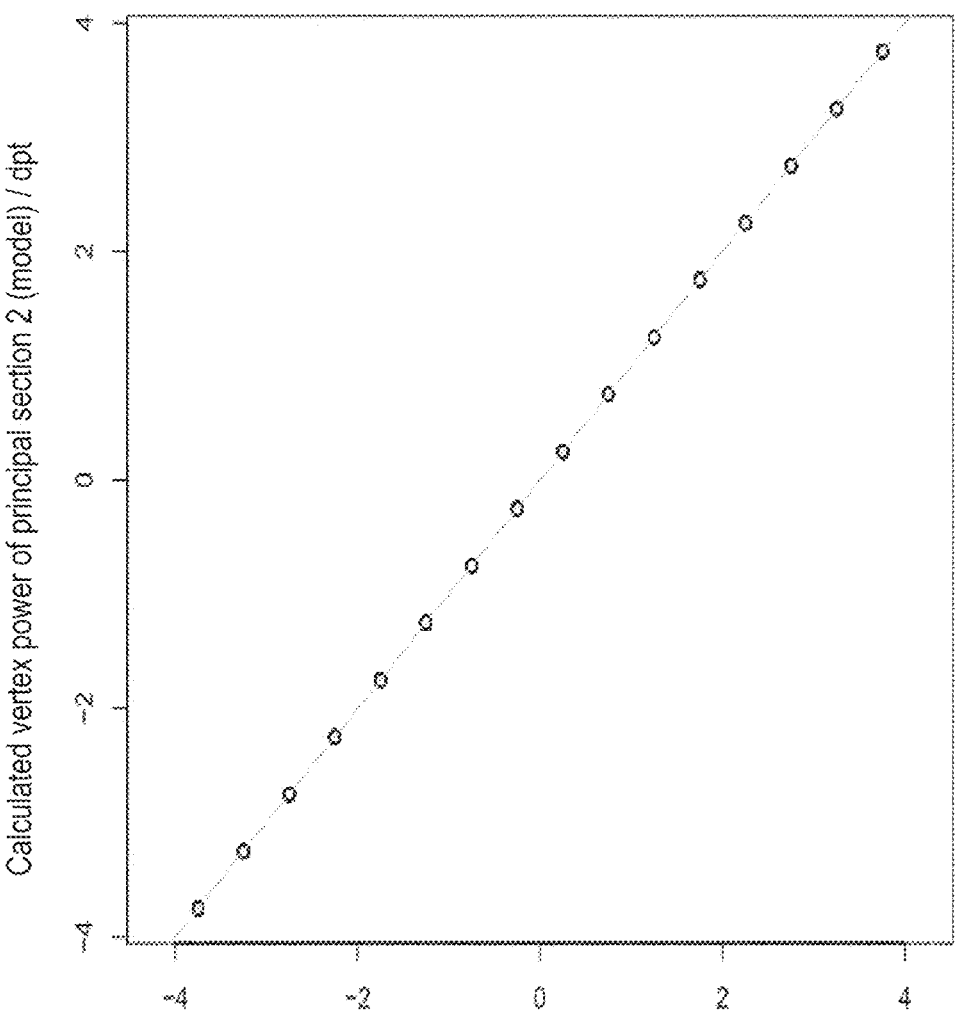
Figure 9J:
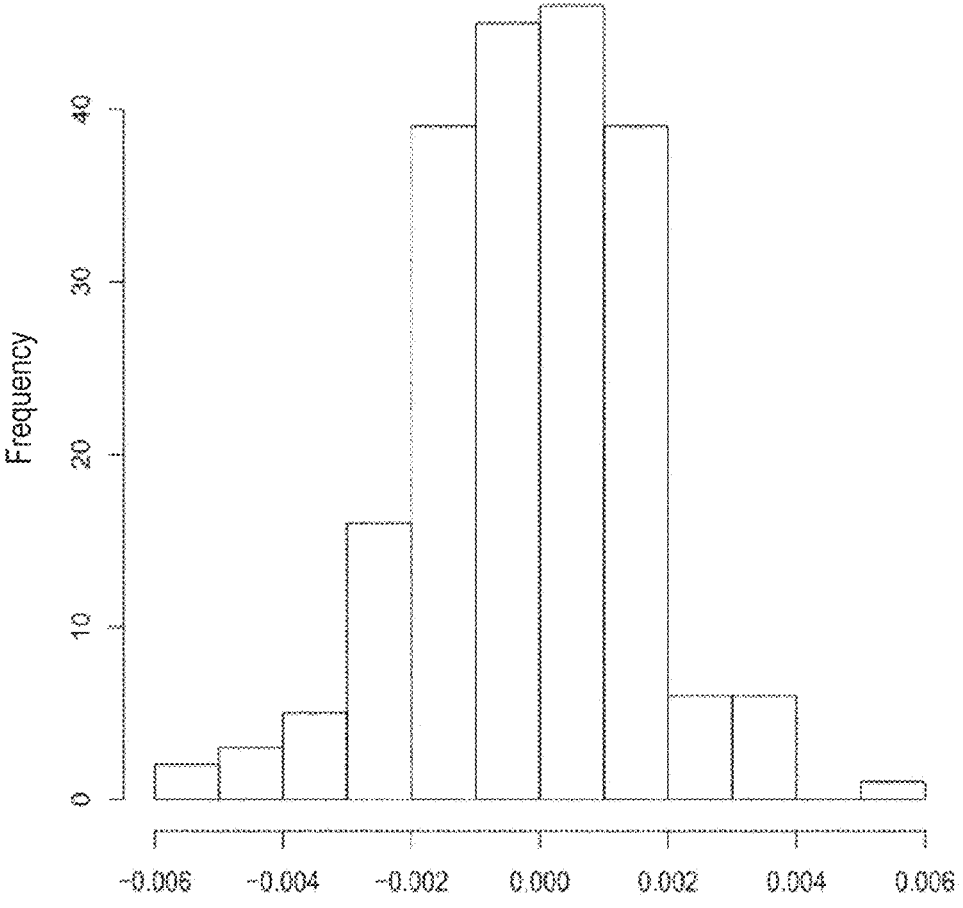
Figure 10:
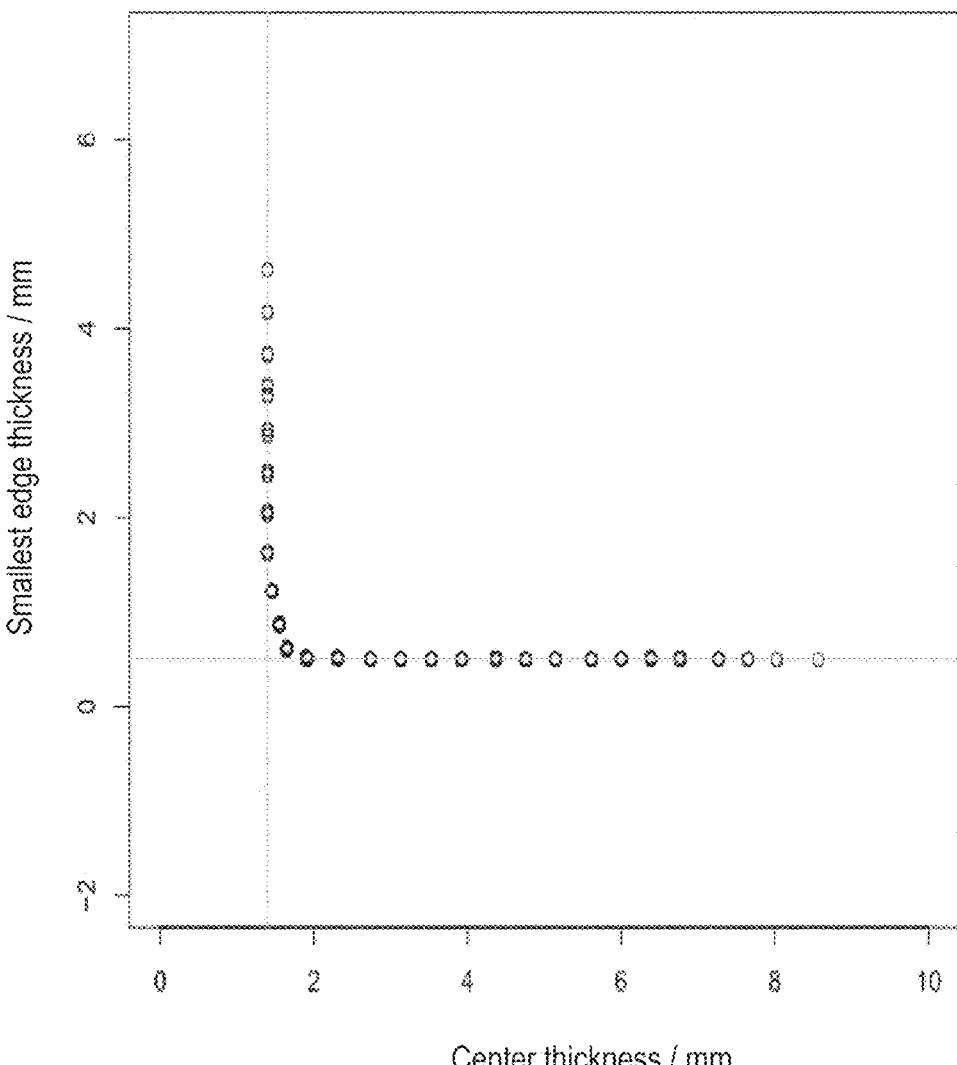

In the following, preferred embodiments of the present invention are described by way of example using accompanying Figures. Individual elements of the described embodiments are not limited to the respective embodiment. Rather, elements of the embodiments may be arbitrarily combined with one another, and new embodiments may thereby be created. Shown are:

FIG. 1 an example of a method for calculating an ophthalmic lens with the aid of a surface model;

FIG. 2 an example of a method for calculating an ophthalmic lens with the aid of a parameterized surface model;

FIG. 3 a further example of a method for calculating an ophthalmic lens with the aid of a surface model and with a correction;

FIG. 4 a further example of a method for calculating an ophthalmic lens with the aid of a surface model and with optional correction;

FIG. 5 an example of a method for determining a surface model with the aid of already calculated ophthalmic lenses;

FIG. 6 an example of a method for determining a surface model without already calculated ophthalmic lenses;

FIG. 7 an example of a division of a data set comprising a plurality of order parameter data sets into a training data set, a validation data set, and a test data set;

FIG. 8A the correlation of the center thickness of spectacle lenses which were calculated with the aid of a first exemplary surface model and the center thickness of test spectacle lenses;

FIG. 8B a histogram of the frequency of the residuals of the center thickness;

FIG. 8C the correlation of the rear face curvature of the first principal section of spectacle lenses which were calculated with the aid of the first surface model and the rear face curvature of the first principal section of test spectacle lenses;

FIG. 8D a histogram of the frequency of the residuals of the rear face curvature of the first principal section;

FIG. 8E the correlation of the rear face curvature of the second principal section of spectacle lenses which were calculated with the aid of the first surface model and the rear face curvature of the second principal section of test spectacle lenses;

FIG. 8F a histogram of the frequency of the residuals of the rear face curvature of the second principal section;

FIG. 8G the correlation of the vertex power in the first principal section of spectacle lenses which were calculated with the aid of the first surface model and the vertex power in the first principal section of test spectacle lenses;

FIG. 8H a histogram of the frequency of the deviations of the vertex power in the first principal section, calculated according to the first surface model, from the vertex power in the first principal section of test spectacle lenses;

FIG. 8I the correlation of the vertex power in the second principal section of spectacle lenses which were calculated with the aid of the first surface model and the vertex power in the second principal section of test spectacle lenses;

FIG. 8J a histogram of the frequency of the deviations of the vertex power in the second principal section, calculated according to the first surface model, from the vertex power in the second principal section of test spectacle lenses;

FIG. 9A the correlation of the center thickness of spectacle lenses which were calculated with the aid of a second exemplary surface model and the center thickness of test spectacle lenses;

FIG. 9B a histogram of the frequency of the residuals of the center thickness;

FIG. 9C the correlation of the rear face curvature of the first principal section of spectacle lenses which were calculated with the aid of the second surface model and the rear face curvature of the first principal section of test spectacle lenses;

FIG. 9D a histogram of the frequency of the residuals of the rear face curvature of the first principal section;

FIG. 9E the correlation of the rear face curvature of the second principal section of spectacle lenses which were calculated with the aid of the second surface model and the rear face curvature of the second principal section of test spectacle lenses;

FIG. 9F a histogram of the frequency of the residuals of the rear face curvature of the second principal section;

FIG. 9G the correlation of the vertex power in the first principal section of spectacle lenses which were calculated with the aid of the second surface model and the vertex power in the first principal section of test spectacle lenses;

FIG. 9H a histogram of the frequency of the deviations of the vertex power in the first principal section, calculated according to the second surface model, from the vertex power in the first principal section of test spectacle lenses;

FIG. 9I the correlation of the vertex power in the second principal section of spectacle lenses which were calculated with the aid of the second surface model and the vertex power in the second principal section of test spectacle lenses;

FIG. 9J a histogram of the frequency of the deviations of the vertex power in the second principal section, calculated according to the second surface model, from the vertex power in the second principal section of test spectacle lenses;

FIG. 10 the compliance with minimum edge thickness and center thickness in spectacle lenses which were calculated with the aid of the second surface model.

A conventional method for calculating an ophthalmic lens $L_i$ with respect to an order parameter set $d_i$ normally comprises the following steps:

provide order data $d_i$ (order parameter set);

calculate or optimize at least one of the surfaces of the ophthalmic lens; and obtain the surfaces of the ophthalmic lens $L_i$ to be produced with respect to the order data $d_i$.

The optimization normally takes place iteratively via a minimization or maximization of a target function into which enter nominal values for at least one property of the lens (for example an optical property). The target function is normally evaluated for a determined parameterization of the surface to be calculated. The parameters of the surface are modified until predetermined criteria are fulfilled.

FIG. 1 shows an example of a method for calculating an ophthalmic lens or a pair of ophthalmic lenses with respect to the order data with the aid of a surface model and direct, non-iterative calculation, or calculation with few iterative steps. The method comprises the steps of:

S1-1: providing order data comprising an order parameter set $d_k$ for the ophthalmic lens or the ophthalmic lenses;

S1-2: calculating/optimizing at least one surface of the lens(es) with the aid of a surface model;

S1-3: obtaining the surfaces of the ophthalmic lens(es) $L_k$ to be produced with respect to the order parameter set $d_k$.

The calculation of the at least one surface of the lens with the aid of the surface model may take place directly, non-iteratively, or with few iteration steps according to an iterative method. The time required for calculation of the surface is thereby significantly reduced.

The surface model may be a model that has been determined according to one of the previously described aspects and embodiment variants. For example, the surface model may be determined parametrically, wherein the model parameters (parameters of the parametric representation of the surface model) are used, together with at least a portion of the order parameters and/or variables derived therefrom, to calculate the surface or surfaces of the ophthalmic lens. The surface model may be a linear or non-linear regression model. The non-linear regression model may, for example, be a neural network. Refer in this regard to the aforementioned preferred embodiment variants or the aforementioned advantages of different surface models.

FIG. 2 shows an example of a method for calculating an ophthalmic lens or a pair of ophthalmic lenses with respect to order data, with the aid of a parametric surface model and direct calculation. The method comprises the steps of:

S2-1: providing order data comprising an order parameter set $d_k$ for the ophthalmic lens or the ophthalmic lenses;

S2-2: providing parameters of a surface model;

S2-3: calculating/optimizing the ophthalmic lens(es) with the aid of the surface model (direct, non-iterative, or with few iteration steps according to an iterative method);

S2-4: obtaining the surfaces of the ophthalmic lens(es) $L_k$ to be produced with respect to the order parameter set $d_k$.

The surface model may be determined using pre-existing order parameter sets with associated target values. For this purpose, an initial complexity and an initial parameterization may be determined or defined. The model parameters may subsequently be determined by means of an optimization method in which the model parameters are varied iteratively. The goal of the optimization method is that the surfaces output from the surface model for different sets of order parameters, and/or the properties of said surfaces, correspond optimally well to the target values for the same sets of order parameters.

The optimizing of the parameterization, and if applicable of the complexity of the surface model, may take place as described above via a minimization or maximization of a target function for the model parameters, wherein the target function is preferably evaluated across all order parameter sets in the training data set. The target function contains at least one term which is dependent on the deviation, determined for each order parameter set in the training data set, of the value or values of at least one predetermined property of an ophthalmic lens calculated according to the surface model from the at least one target value of this property for the same order parameter set.

In one example, the target function for the model parameters may include the following term:

$$f_i = f(Z_i, Z_{Nominal}) = \sum_j g_z(j)(Z_i(j) - Z_i(j)_{Nominal})^2 + \dots$$

35 wherein:

$Z_i(j)$ designates the j-th value of the at least one property Z of a lens calculated according to the surface model for the i-th order parameter set;

$Z_i(j)_{Nominal}$ designates the j-th target value of the at least one property Z für for the i-th order parameter set; and $g_z(j)$ designates the weighting of the j-th value of the at least one property Z.

The j-th value of the at least one property Z of the lens may be determined using the current parameterization or the current model parameters of the surface model. The j-th value of the at least one property Z of the lens may, for example, be the value of this property at the j-th evaluation point of the lens.

The function $f_i=f(Z_i,Z_{Nominal})$ may also comprise additional terms that depend on other or more properties of the ophthalmic lens.

The function $f_i$ may, for example, be a target function which is used for the optimization of ophthalmic lenses according to a conventional method, and which is evaluated for the current parameterization or the current parameters of the surface model.

One or more target values $Z_i(j)_{Nominal}$ may be equal to 0. For example, the astigmatism in the usage position at one or more evaluation points of the lens may thus have the target value of 0 dpt.

The above function $f_i$ and/or its derivatives with respect to the surfaces may be subsequently evaluated across all order parameter sets in the training data set, wherein the evaluation takes place depending on the parameterization of the surface model. For example, a weighted or non-weighted sum $f$ may be calculated and evaluated from the functions $f_i$, and/or their derivatives with respect to the surfaces, determined for all order parameter sets.

$$f = \sum_{i=1}^{N} g_i f_i,$$

wherein N designates the number of order parameter sets (for example the number of order parameter sets in a training set); and $g_i$ designates the weighting of the i-th term for the i-th order parameter set, which given a non-weighted sum is identical or equal to 1.

If the evaluation of the target function $f$ results in that predetermined criteria are not yet fulfilled, the model parameters are modified and the target function $f$ is re-evaluated. This is repeated iteratively until the predetermined criteria are fulfilled.

The surface model with the model parameters so determined may be suitably stored and be used as described above for calculation of new ophthalmic lenses.

FIG. 3 shows a further example of a method for calculating an ophthalmic lens or a pair of ophthalmic lenses with respect to order data, with the aid of a surface model and direct calculation. The method is similar to the method shown in FIG. 1 and further comprises a correction of the surface calculated with the surface model. The correction of the surface may be one of the corrections described above. The method comprises the steps of:

S3-1: providing order data comprising an order parameter set $d_k$ for the ophthalmic lens or the ophthalmic lenses;

S3-2: calculating/optimizing the ophthalmic lens(es) with the aid of a surface model (direct, non-iterative); S3-3: correcting the surface(s) calculated with the surface model (post-calculation/post-optimization);

S3-4: obtaining the surfaces of the ophthalmic lens(es) $L_k$ to be produced with respect to the order parameter set $d_k$.

The correction of the surface or surfaces calculated with the surface model may be one of the corrections described previously. Due to the optimal starting surface for the post-calculation or post-optimization, such a correction normally requires one or only a few iterations. The total computing time may thereby be significantly reduced.

FIG. 4 shows a further example of a method for calculating an ophthalmic lens or a pair of ophthalmic lenses with respect to order data, with the aid of a surface model and direct calculation and with optional correction. The method comprises the steps of:

S4-1: providing order data comprising a plurality of order parameter sets $d_k$ for the ophthalmic lens or the ophthalmic lenses;

S4-2: calculating/optimizing the ophthalmic lens(es) with the aid of a surface model (direct, preferably non-iterative, or with few iterative steps);

S4-3: checking whether a correction is necessary;

S4-4: implementing a correction of the surface(s) calculated with the surface model (post-calculation/post-optimization with one or only few iterations) if a correction is necessary;

S4-5: obtaining the surface(s) of the ophthalmic lens(es) $L_k$ to be produced with respect to the order parameter set $d_k$.

FIG. 5 shows an example of a method for determining a surface model with the aid of already calculated ophthalmic lenses. The method comprises the steps of:

S5-1: providing an order data set $\{d_i, L_i\}$ comprising a plurality of order parameter sets $\{d_i\}$ and a plurality of already calculated surfaces of a plurality of ophthalmic lenses $L_i$, and dividing the data set into training data set (if applicable validation data set) and test data set. The provided ophthalmic lenses $L_i$ are lenses which were calculated for the order parameter sets in the order data set according to a known calculation or optimization method. The provided lenses may be lenses which were respectively optimized using a target function $f_i$;

S5-2: providing an initial complexity and parameterization of the surface model;

S5-3: optimizing the parameterization and, if applicable, the complexity of the surface model (iteratively) with the goal that the surface model reflects the training data set (and if applicable the validation data set) optimally well. The optimizing takes place using a target function G for model parameters. Ophthalmic lenses $BL_i$ or their surfaces are thereby calculated with the surface model with respect to the order data $d_i$. The surfaces or lenses calculated with the surface model are compared, using the target function G, with the surfaces of the provided lenses $L_i$ or with the provided lenses. For example, in the optimizing of the model parameters, the sum of the target functions $G(BL_i, L_i)$ is minimized over i.

S5-4: testing the optimized parameters and, if applicable, the optimized complexity of the surface model using the reproduction of the test data set; and S5-5: obtaining optimized parameters of the surface model and, if applicable, an optimized complexity of the surface model to provide for a direct calculation of ophthalmic lenses from order data.

The above method may also be implemented with measured surfaces and/or intervals of the surfaces of already produced lenses, instead of with calculated surfaces.

FIG. 6 shows an example of a method for determining a surface model without already calculated ophthalmic lenses. The method comprises the steps of:

S6-1: providing an order data set $d_i$ for a plurality of imaginary ophthalmic lenses, and dividing the data set into training data set (if applicable validation data set) and test data set;

S6-2: providing an initial complexity and parameterization of the surface model;

S6-3: optimizing the parameterization and, if applicable, the complexity of the surface model, with the goal that the lenses $L_i$ calculated from the surface model minimize the running sum, across the training data set (and if applicable validation data set), of the target functions $f_i$ for the optimization of individual lenses. The target functions $f_i$ may be target functions known from the prior art;

S6-4: testing the optimized parameters and, if applicable, the optimized complexity of the surface model, using the running sum of the target functions $f_i$ across the test data set, for the optimization of individual lenses according to the prior art; and S6-5: obtaining optimized parameters of the surface model and, if applicable, an optimized complexity of the surface model to provide for a direct calculation of ophthalmic lenses from order data.

In the above examples, each of the order parameter sets $d_k$ may comprise one or more order parameters necessary to order a single ophthalmic lens or a pair of ophthalmic lenses. Examples of order parameters are found in the established standards for spectacle lenses (cf., for example, EU guideline 93/42/EWG regarding medical products). Refer to the above statements in the corresponding sections with regard to further examples of order parameters and the variables derived therefrom, as well as with regard to further details.

All features described there, embodiment variants, and/or advantages reasonably apply to the above examples.

In the following, the calculation of ophthalmic lenses (spectacle lenses) is explained in detail using two further examples.

Example of the Lens Calculation with a Regression Model

A first example relates to a glass calculation by means of a regression model. In this example, the rear face curvatures and the center thickness of unifocal lenses are calculated directly from the order values of sphere and cylinder of the refraction, with the aid of a surface model designed as a regression model. The parameters and the complexity of the regression model are determined starting from data of already calculated ophthalmic lenses. The glass diameter is predetermined at 65 mm in this example.

A complex iterative algorithm is conventionally used for the calculation of the center thickness. In the present example, the conventional iterative algorithm is replaced by a regression model that is evaluated without iterations.

The starting point for the calculation is a data set with in total 825 lenses already calculated according to methods from the prior art, whose sphere and cylinder vary in steps of 0.25 dpt. The data set was subdivided into a training data set with 425 lenses, a validation data set with 192 lenses, and a test data set with 208 lenses, as shown in FIG. 7. The subdivision is according to a determined pattern (see FIG. 7) and not random, as is typical, since the data form an equidistant grid in sphere and cylinder. However, it is possible to subdivide the initial data set randomly into a training data set, a validation data set, and a test data set.

The calculation of the curvature of the front face KVFL initially takes place with the aid of tables in which the basic curve is tabulated depending on sphere, cylinder. Of course, the curvature of the front face might also be calculated in a more complex surface model using a classification model of sphere, cylinder, and if applicable the index of refraction of the material and if applicable the information about the glass blanks available for production. However, for clarity this was deliberately disregarded in this example.

The determination of the curvatures K1 and K2 of the principal sections of the refraction initially takes place with the greatest or least curvature (assuming the positive cylinder convention):

$$K1 = \text{sphere} + \text{cylinder and } K2 = \text{sphere}.$$

The determination of a regression model follows, which in this example is designed with the aid of spline functions. Cubic splines are used in K1, K2, or KVFL, respectively, and the linear interaction term is additionally used. The node points of the splines are respectively equidistantly distributed in the value range of K1, K2, and KVFL, meaning that the nodes form a grid with identical spacings in the respective parameters K1, K2, and KVFL. The spline coefficients represent the model parameters.

The sum of the squares of the residuals (i.e. the differences of the variable to be calculated minus the corresponding value in the data set) has been used as a measure of how well the model describes the existing data. The quadratic deviation of the center thickness in mm, as well as respectively both curvatures of the rear face in dpt, was thus minimized in separate adaptations.

To adapt to the training data set, the complexity of the model was varied in that the number of spline node points was varied. The model with the smallest sum of squared errors, calculated starting from the validation data set, was finally chosen. The model used for the center thickness can be summarized as follows (see Table 1):

TABLE 1

| Spline | Value range | Number of node points | Number of spline functions = number of model parameters |
|---|---|---|---|
| Constant | — | — | 1 |
| Spline(K1) | −4 dpt to +10 dpt | 14 | 13 |
| Spline(K2) | −4 dpt to +4 dpt | 3 | 2 |
| Spline(KVFL) | 3.25 dpt to 9.5 dpt | 3 | 2 |
| Spline(K1) * Spline(K2) * Spline(KVFL) | See corresponding value ranges above | 126 = 14(K1) * 3(K2) * 3(KVFL) | 52 = 13(K1) * 2(K2) * 2(KVFL) |
| Total | — | — | 70 |

The process may also proceed analogously for the curvatures of the rear face. Ultimately, splines in K1, K2, and KVFL with respectively 3 node points (within the same value ranges) were chosen so that each curvature of the rear face was adapted with a model having respectively 15 parameters (1(Constant)+2($K1$)+2($K2$)+2($KVFL$)+2^3(Mixed terms)=15 parameters in total).

In this example, the curvatures of the rear face are indicated in diopters relative to the index of refraction of 1.525.

The unifocal lenses calculated here are completely described by the index of refraction of the material (here 1.668), the diameter (here 65 mm), the center thickness, and front and rear face curvature (the latter since they have a spherical front face and spheroidal-toroidal rear faces). In this instance, there is also no tilting of the rear face relative to the front face, since in this example prism=0 dpt is predetermined and there exists a centering according to the requirement of the eye's center of rotation.

The model parameters contained in Table 2 were determined by minimizing the deviation of the actual center thickness from the center thickness calculated by means of splines (model parameters in mm) using the training data set. The basic spline functions are numbered in the following with a multi-index, wherein 0 means that the spline function in the order parameter or in the derived variable is constantly equal to 1, and higher indices correspond, in increasing order, to the cubic basic spline functions that, in the value range of the respective order parameter or the variable derived therefrom, assume a space near the lower edge up to the upper edge:

TABLE 2

| Spline(K1) Nr | 0 | 1 | 2 | 3 | 4 | 5 | 6 |
|---|---|---|---|---|---|---|---|
| Spline(K2) Nr | 0 | 0 | 0 | 0 | 0 | 0 | 0 |
| Spline(KVFL) Nr | 0 | 0 | 0 | 0 | 0 | 0 | 0 |
| Parameter value | 3.37 | -1.78 | -1.63 | -1.59 | -1.36 | -1.03 | -0.19 |
| Spline(K1) Nr | 7 | 8 | 9 | 10 | 11 | 12 | 13 |
| Spline(K2) Nr | 0 | 0 | 0 | 0 | 0 | 0 | 0 |
| Spline(KVFL) Nr | 0 | 0 | 0 | 0 | 0 | 0 | 0 |
| Parameter value | 0.67 | 1.47 | 2.20 | 2.91 | 3.62 | 4.33 | 5.02 |
| Spline(K1) Nr | 0 | 0 | 0 | 0 | 1 | 2 | 3 |
| Spline(K2) Nr | 1 | 2 | 0 | 0 | 1 | 1 | 1 |
| Spline(KVFL) Nr | 0 | 0 | 1 | 2 | 1 | 1 | 1 |
| Parameter value | -0.01 | -0.01 | 0.04 | 0.38 | 0.02 | 0.10 | 0.04 |
| Spline(K1) Nr | 4 | 5 | 6 | 7 | 8 | 9 | 10 |
| Spline(K2) Nr | 1 | 1 | 1 | 1 | 1 | 1 | 1 |
| Spline(KVFL) Nr | 1 | 1 | 1 | 1 | 1 | 1 | 1 |
| Parameter value | 0.18 | 0.02 | -0.24 | 0.03 | -0.44 | 0.07 | 0.30 |
| Spline(K1) Nr | 11 | 12 | 13 | 1 | 2 | 3 | 4 |
| Spline(K2) Nr | 1 | 1 | 1 | 2 | 2 | 2 | 2 |
| Spline(KVFL) Nr | 1 | 1 | 1 | 1 | 1 | 1 | 1 |
| Parameter value | 0.12 | 0.55 | 0.07 | -0.05 | 0.12 | -0.10 | 0.09 |
| Spline(K1) Nr | 5 | 6 | 7 | 8 | 9 | 10 | 11 |
| Spline(K2) Nr | 2 | 2 | 2 | 2 | 2 | 2 | 2 |
| Spline(KVFL) Nr | 1 | 1 | 1 | 1 | 1 | 1 | 1 |
| Parameter value | 0.27 | 0.16 | 0.49 | 0.07 | 0.17 | 0.14 | 0.30 |
| Spline(K1) Nr | 12 | 13 | 1 | 2 | 3 | 4 | 5 |
| Spline(K2) Nr | 2 | 2 | 1 | 1 | 1 | 1 | 1 |
| Spline(KVFL) Nr | 1 | 1 | 2 | 2 | 2 | 2 | 2 |
| Parameter value | 0.18 | 0.31 | 0.33 | 0.57 | 0.11 | 0.20 | 0.21 |
| Spline(K1) Nr | 6 | 7 | 8 | 9 | 10 | 11 | 12 |
| Spline(K2) Nr | 1 | 1 | 1 | 1 | 1 | 1 | 1 |
| Spline(KVFL) Nr | 2 | 2 | 2 | 2 | 2 | 2 | 2 |
| Parameter value | 0.36 | 0.09 | 0.11 | 0.16 | 0.20 | 0.05 | 0.15 |
| Spline(K1) Nr | 13 | 1 | 2 | 3 | 4 | 5 | 6 |
| Spline(K2) Nr | 1 | 2 | 2 | 2 | 2 | 2 | 2 |
| Spline(KVFL) Nr | 2 | 2 | 2 | 2 | 2 | 2 | 2 |
| Parameter value | 0.09 | 0.28 | 0.04 | 0.08 | 0.07 | 0.15 | -0.01 |
| Spline(K1) Nr | 7 | 8 | 9 | 10 | 11 | 12 | 13 |
| Spline(K2) Nr | 2 | 2 | 2 | 2 | 2 | 2 | 2 |
| Spline(KVFL) Nr | 2 | 2 | 2 | 2 | 2 | 2 | 2 |
| Parameter value | 0.06 | -0.03 | 0.11 | -0.03 | 0.02 | -0.06 | 0.04 |

The following model parameters, in dpt, analogously result from the adaptations of the first principal section of the rear face curvature (see Table 3):

TABLE 3

| Spline(K1) Nr | 0 | 1 | 2 | 0 | 0 |
|---|---|---|---|---|---|
| Spline(K2) Nr | 0 | 0 | 0 | 1 | 2 |
| Spline(KVFL) Nr | 0 | 0 | 0 | 0 | 0 |
| Parameter value | -3.12 | 4.71 | 6.00 | 0.00 | 0.00 |
| Spline(K1) Nr | 0 | 0 | 1 | 2 | 1 |
| Spline(K2) Nr | 0 | 0 | 1 | 1 | 2 |
| Spline(KVFL) Nr | 1 | 2 | 1 | 1 | 1 |
| Parameter value | -2.35 | -4.41 | 0.00 | -0.06 | 0.00 |
| Spline(K1) Nr | 2 | 1 | 2 | 1 | 2 |
| Spline(K2) Nr | 2 | 1 | 1 | 2 | 2 |
| Spline(KVFL) Nr | 1 | 2 | 2 | 2 | 2 |
| Parameter value | 0.03 | 0.02 | -0.15 | 0.03 | -0.15 |

The following model parameters, in dpt, analogously result from the adaptations of the second principal section of the rear face curvature (see Table 4):

TABLE 4

| Spline(K1) Nr | 0 | 1 | 2 | 0 | 0 |
|---|---|---|---|---|---|
| Spline(K2) Nr | 0 | 0 | 0 | 1 | 2 |
| Spline(KVFL) Nr | 0 | 0 | 0 | 0 | 0 |
| Parameter value | -5.48 | -0.01 | -0.18 | 2.14 | 3.90 |
| Spline(K1) Nr | 0 | 0 | 1 | 2 | 1 |
| Spline(K2) Nr | 0 | 0 | 1 | 1 | 2 |
| Spline(KVFL) Nr | 1 | 2 | 1 | 1 | 1 |
| Parameter value | -2.35 | -4.41 | 0.00 | -0.06 | 0.00 |
| Spline(K1) Nr | 2 | 1 | 2 | 1 | 2 |
| Spline(K2) Nr | 2 | 1 | 1 | 2 | 2 |
| Spline(KVFL) Nr | 1 | 2 | 2 | 2 | 2 |
| Parameter value | 0.03 | 0.02 | -0.15 | 0.03 | -0.15 |

In the following, using the spectacle lenses from the test data set (test spectacle lenses) it is shown that the method according to the invention, in comparison to a method according to the prior art, leads to spectacle lenses that possess nearly identical properties. For this purpose, the center thicknesses, the rear face curvatures, and the vertex powers of the spectacle lenses are plotted against one another, or the histograms of the deviations of these variables are calculated. FIGS. 8A through 8J show the corresponding results.

FIG. 8A shows the correlation of the center thickness of spectacle lenses which were calculated with the aid of the surface model and the measured center thickness of test spectacle lenses. The center thickness (in mm) measured using test data or using test spectacle lenses is plotted on the abscissa of FIG. 8A, and the center thickness (in mm) calculated according to the model is plotted on the ordinate. FIG. 8B shows a histogram of the frequency of the residuals of the center thickness (in mm), meaning the deviations of the calculated center thickness of test lenses from the measured center thickness of test lenses.

FIG. 8C shows the correlation of the rear face curvature of the first principal section (curvature of the first principal section of the rear face or rear face curvature 1) of spectacle lenses which were calculated with the aid of the surface model, and the measured rear face curvature of the first principal section of test spectacle lenses. The rear face curvature 1 (in dpt) measured using test data or using test spectacle lenses is plotted on the abscissa of FIG. 8C. The rear face curvature 1 (in dpt) calculated according to the surface model is plotted on the ordinate. FIG. 8D shows a histogram of the frequency of the residuals of the rear face curvature 1 (in dpt), i.e. the deviations of the calculated rear face curvature 1 from the measured rear face curvature 1.

FIG. 8E shows the correlation of the rear face curvature of the second principal section (curvature of the second principal section of the rear face or rear face curvature 2) of spectacle lenses which were calculated with the aid of the surface model, and the measured rear face curvature of the first principal section of test spectacle lenses. The rear face curvature 2 (in dpt) measured using test data or using test spectacle lenses is plotted on the abscissa in FIG. 8E. The rear face curvature 2 (in dpt) calculated according to the surface model is plotted on the ordinate. FIG. 8F shows a histogram of the frequency of the residuals of the rear face curvature 2 (in dpt), i.e. the deviations of the calculated rear face curvature 2 from the measured rear face curvature 2.

FIG. 8G shows the correlation of the vertex power in the first principal section (vertex power in the principal section 1) of spectacle lenses which were calculated with the aid of the surface model, and the measured vertex power in the first principal section of test spectacle lenses. The vertex power in the principal section 1 (in dpt) measured using test data or using test spectacle lenses is plotted on the abscissa of FIG. 8G, and the vertex power in the principal section 1 (in dpt) calculated according to the model is plotted on the ordinate. FIG. 8H shows a histogram of the frequency of the deviations (differences) of the vertex power in the principal section 1 calculated according to the model from the measured vertex power in the principal section 1 (in dpt).

FIG. 8I shows the correlation of the vertex power in the second principal section (vertex power in the second principal section 2) of spectacle lenses which were calculated with the aid of the surface model, and the measured vertex power in the first principal section of test spectacle lenses. The vertex power in the principal section 2 (in dpt) measured using test data or using test spectacle lenses is plotted on the abscissa in FIG. 8I, and the vertex power in the principal section 2 (in dpt) calculated according to the model is plotted on the ordinate. FIG. 8J shows a histogram of the frequency of the deviations (differences) of the vertex power in the principal section 2 calculated according to the model from the measured vertex power in the principal section 2 (in dpt).

To calculate the center thickness and the two rear face curvatures given arbitrary values of sphere sph and cylinder cyl, the basic spline functions were evaluated at the corresponding point in KVFL(sph, cyl), K1(sph,cyl), K2(sph, cyl), respectively with the parameters (see tables) created from the adaptation and a sum calculated therefrom, without an iterative calculation being required.

Obviously, the surface model proposed here by way of example might also be expanded by the order parameters of prism and prism base, for example in that the surface model was expanded by the prism itself and, as derived parameters, by the angle between the prism base and the axis of the astigmatism.

Example for Determining a Regression Model without Using Already Pre-Calculated Data Differently than in the prior example, in the following a surface model designed as a regression model is determined without needing to resort to the data of already calculated ophthalmic lenses. Instead of these, the parameters of the surface model are calculated directly by minimizing the sum of the target functions that are used according to a known method from the prior art for (iterative) calculation of a plurality of lenses. The surface model determined in such a manner is therefore capable of implementing the calculation of a unifocal lens with arbitrary effect which was specified exclusively via one or more target functions as well as the desired effect and diameter.

An example of a target function according to the prior art for a single lens i, whose vertex power is characterized by the two principal sections $K1_i$ and $K2_i$, that possesses a spherical front face curvature $KVFL_i$ and a diameter $D_i$, reads as follows:

$$f\left(d_{M,i}, K1_i, K2_i, KVFL_i, D_i; S1_i^{nominal}, S2_i^{nominal}, d_{M,i}^{min}, d_{R,i}^{min}\right) =$$
$$g_s\left(\Delta S1_i^2 + \Delta S2_i^2\right) + g_D\left(\Delta D_{VFL,i}^2 + \Delta D_{RFL1,i}^2 + \Delta D_{RFL2,i}^2\right) +$$
$$g_d\left(\Delta d_{M,i}^2 + \Delta d_{R1,i}^2 + \Delta d_{R2,i}^2\right)$$

The center thickness is specified by $d_{M,i}$, and the order values of the two principal sections are specified by $$S1_i^{nominal} = sph_i + cyl_i$$

and $$S2_i^{nominal} = sph_i.$$

The minimum allowed center and edge thicknesses are designated with $$d_{M,i}^{min}$$

and $$d_{R,i}^{min} \cdot \Delta S1_i^2$$

and $$\Delta S2_i^2$$

designate the quadratic deviations of the principal sections of the vertex power, $$\Delta D_{VFL,i}^2, \Delta D_{RFL1,i}^2,$$

and $$\Delta D_{RFL2,i}^2$$

the quadratic deviations of the diameter of the lenses, and $$\Delta d_{M,i}^2, \Delta d_{R1,i}^2, \text{ and } \Delta d_{R2,i}^2$$

the quadratic deviations in the center thickness and the edge thicknesses in the two principal sections of the rear face. The weightings of the different terms among one another were chosen here as follows: $g_S = (0,005 \text{ dpt})^{-2}$, $g_D = (0.5 \text{ mm})^{-2}$, and $g_d = (0.1 \text{ mm})^{-2}$. The quadratic deviations were calculated as follows; it is thereby to be noted that the deviations of the diameter from the curvature of the front face or from the curvature of the rear face are calculated in their two principal sections:

$$\Delta S1_i^2 = \left(S1_i(d_{M,i}, K1_i, K2_i, KVFL_i) - S1_i^{nominal}\right)^2$$

$$\Delta S2_i^2 = \left(S2_i(d_{M,i}, K1_i, K2_i, KVFL_i) - S2_i^{nominal}\right)^2$$

$$\Delta D_{VFL,i}^2 = (2r_{VFL,i}(KVFL_i) - D_i)^2 \cdot \begin{cases} 1 \text{ for } D_i \geq 2r_{VFL,i}(KVFL_i) \\ 0 \text{ for } D_i < 2r_{VFL,i}(KVFL_i) \end{cases}$$

$$\Delta D_{RFL1,i}^2 = (2r_{RFL1,i}(K1_i) - D_i)^2 \cdot \begin{cases} 1 \text{ for } D_i \geq 2r_{RFL1,i}(K1_i) \\ 0 \text{ for } D_i < 2r_{RFL1,i}(K1_i) \end{cases}$$

$$\Delta D_{RFL2,i}^2 = (2r_{RFL2,i}(K2_i) - D_i)^2 \cdot \begin{cases} 1 \text{ for } D_i \geq 2r_{RFL2,i}(K2_i) \\ 0 \text{ for } D_i < 2r_{RFL2,i}(K2_i) \end{cases}$$

$$\Delta d_{M,i}^2 = (d_{M,i} - d_{M,i}^{min})^2 \cdot \begin{cases} 1 \text{ for } d_{M,i} \geq d_{M,i}^{min} \\ p \text{ for } d_{M,i} < d_{M,i}^{min} \end{cases}$$

$$\Delta d_{R1,i}^2 = (d_{R1,i} - d_{R,i}^{min})^2 \cdot \begin{cases} 1 \text{ for } d_{R1,i} \geq d_{R,i}^{min} \\ p \text{ for } d_{R1,i} < d_{R,i}^{min} \end{cases}$$

$$\Delta d_{R2,i}^2 = (d_{R2,i} - d_{R,i}^{min})^2 \cdot \begin{cases} 1 \text{ for } d_{R2,i} \geq d_{R,i}^{min} \\ p \text{ for } d_{R2,i} < d_{R,i}^{min} \end{cases}$$

$r_{VFL,i}$, $r_{RFL1,i}$ and $r_{RFL1,i}$ are hereby the curvature radii of the front face or rear face in their two principal sections, and p is a factor that penalizes the undercuts of the glass thicknesses (here p=100 was used).

In this example, the minimum allowed center thickness and edge thicknesses for all lenses are constant $$\left(d_{M,i}^{min} = 1.4 \text{ mm and } d_{R,i}^{min} = 0.5 \text{ mm}\right),$$

but may, without further measures, also be functions that may depend on the lens material, diameter, nominal effect, or even coating of the lens. These minimum allowed center and edge thickness values represent target values.

Obviously, other target functions might also be used, be it alone or as additional terms, insofar as they embody desirable properties of the spectacle lenses such as, for example, the desired distribution of the refraction error and of the unwanted astigmatism in the usage position.

The target function for the optimization of the parameters of the surface model is composed of the sum of the target functions for individual lenses, wherein a sum is calculated across all lenses i from the respective data set (i.e., training data set, validation data set, or test data set), and the center thicknesses and curvatures of the rear face now parametrically depend on the parameters of the surface model:

$$g\left(\theta; \{KVFL_i, D_i, S1_i^{nominal}, S2_i^{nominal}, d_{M,i}^{min}, d_{R,i}^{min}\}\right) =$$

$$\sum_i f\left(d_{M,i}(\theta), K1_i(\theta), K2_i(\theta), KVFL_i, D_i; S1_i^{nominal}, S2_i^{nominal}, d_{M,i}^{min}, d_{R,i}^{min}\right)$$

$\theta = (\theta_{dM}, \theta_{K1}, \theta_{K2})$ thereby designates the parameters of the surface model, which here may be split up into three separate parameter sets of the spline coefficients for center thickness and the two principal curvatures of the rear face. The values for front face curvature, lens diameter, the nominal values for the principal curvatures of the vertex power, and the minimum center and edge thicknesses, predetermined for each lens, are designated as a whole by $$\{KVFL_i, D_i, S1_i^{nominal}, S2_i^{nominal}, d_{M,i}^{min}, d_{R,i}^{min}\}.$$

The values calculated with the aid of the surface model are now used for the center thickness as well as the two rear face curvatures, which values for their part depend on the current parameters of the surface model:

$$d_{M,i} = d_M\left(KVFL_i, S1_i^{nominal}, S2_i^{nominal}; \theta_{dM}\right)$$

$$K1_i = K1\left(KVFL_i, S1_i^{nominal}, S2_i^{nominal}; \theta_{K1}\right)$$

$$K2_i = K2\left(KVFL_i, S1_i^{nominal}, S2_i^{nominal}; \theta_{K2}\right)$$

The data set that was used for training, for validating, and for testing the trained regression model consists of the same values for sphere and cylinder as in the prior example (see FIG. 7). The same spline-based regression model is also used which, however, initially possesses as a starting point of the optimization a parameter set that corresponds to lenses with center thickness of 2 mm and rear face curvatures of respectively −5 dpt (independently of their front face curvature) (i.e., only the parameters that correspond to a constant, thus those with multi-index (Spline(K1)Nr, Spline (K2)Nr, Spline(KVFL)Nr)=(0, 0, 0) are populated with 2 mm or, respectively, −5 dpt in the respective different adaptations for KVFL, K1, and K2; all other parameters are 0).

In order to determine the optimal parameters of the surface model, here the Nelder-Mead algorithm (with 20000 function evaluations) was initially used because it is relatively robust and manages without derivatives with respect to the parameters. Optimization with 200 iterations was subsequently performed with the BFGS algorithm (Broyden-Fletcher-Goldfarb-Shanno algorithm), since it converges more quickly at a local optimum. The gradients for the latter algorithm were calculated numerically; however, they could also be specified analytically, which would once again accelerate the optimization. The number of iterations may be accelerated via a more suitable selection of the starting point of the optimization. For example, it may be helpful that the parameters of an already-determined surface model are used if a new surface model should be determined whose target function for individual lenses differs slightly (for example in the minimal thicknesses, in the reciprocal weighting of the terms, or in an additional term) from the target function for individual lenses of the first surface model.

The following model parameters $\theta_{dM}$ were found for the center thickness (in mm) (see Table 5):

TABLE 5

| Spline(K1) Nr | 0 | 1 | 2 | 3 | 4 | 5 | 6 |
|---|---|---|---|---|---|---|---|
| Spline(K2) Nr | 0 | 0 | 0 | 0 | 0 | 0 | 0 |
| Spline(KVFL) Nr | 0 | 0 | 0 | 0 | 0 | 0 | 0 |
| Parameter value | 3.40 | −1.67 | −1.31 | −1.08 | −0.85 | −0.32 | 0.61 |
| Spline(K1) Nr | 7 | 8 | 9 | 10 | 11 | 12 | 13 |
| Spline(K2) Nr | 0 | 0 | 0 | 0 | 0 | 0 | 0 |
| Spline(KVFL) Nr | 0 | 0 | 0 | 0 | 0 | 0 | 0 |
| Parameter value | 1.47 | 2.21 | 2.81 | 3.46 | 4.37 | 4.70 | 4.81 |

TABLE 5-continued

| | | | | | | | |
|---|---|---|---|---|---|---|---|
| Spline(K1) Nr | 0 | 0 | 0 | 0 | 1 | 2 | 3 |
| Spline(K2) Nr | 1 | 2 | 0 | 0 | 1 | 1 | 1 |
| Spline(KVFL) Nr | 0 | 0 | 1 | 2 | 1 | 1 | 1 |
| Parameter value | −0.05 | 0.03 | 0.00 | 0.33 | −0.06 | −0.81 | −0.30 |
| Spline(K1) Nr | 4 | 5 | 6 | 7 | 8 | 9 | 10 |
| Spline(K2) Nr | 1 | 1 | 1 | 1 | 1 | 1 | 1 |
| Spline(KVFL) Nr | 1 | 1 | 1 | 1 | 1 | 1 | 1 |
| Parameter value | −1.53 | −0.12 | −0.73 | −1.13 | −0.55 | −0.16 | −0.26 |
| Spline(K1) Nr | 11 | 12 | 13 | 1 | 2 | 3 | 4 |
| Spline(K2) Nr | 1 | 1 | 1 | 2 | 2 | 2 | 2 |
| Spline(KVFL) Nr | 1 | 1 | 1 | 1 | 1 | 1 | 1 |
| Parameter value | −1.48 | −0.36 | −0.19 | −0.36 | −1.69 | 0.16 | −0.34 |
| Spline(K1) Nr | 5 | 6 | 7 | 8 | 9 | 10 | 11 |
| Spline(K2) Nr | 2 | 2 | 2 | 2 | 2 | 2 | 2 |
| Spline(KVFL) Nr | 1 | 1 | 1 | 1 | 1 | 1 | 1 |
| Parameter value | 0.19 | −1.91 | −0.17 | −0.12 | −0.43 | −2.18 | 0.61 |
| Spline(K1) Nr | 12 | 13 | 1 | 2 | 3 | 4 | 5 |
| Spline(K2) Nr | 2 | 2 | 1 | 1 | 1 | 1 | 1 |
| Spline(KVFL) Nr | 1 | 1 | 2 | 2 | 2 | 2 | 2 |
| Parameter value | 0.51 | 0.68 | −2.02 | 1.10 | 0.19 | 0.18 | −2.09 |
| Spline(K1) Nr | 6 | 7 | 8 | 9 | 10 | 11 | 12 |
| Spline(K2) Nr | 1 | 1 | 1 | 1 | 1 | 1 | 1 |
| Spline(KVFL) Nr | 2 | 2 | 2 | 2 | 2 | 2 | 2 |
| Parameter value | 0.56 | −0.01 | −0.08 | −1.77 | 0.17 | −0.07 | −0.56 |
| Spline(K1) Nr | 13 | 1 | 2 | 3 | 4 | 5 | 6 |
| Spline(K2) Nr | 1 | 2 | 2 | 2 | 2 | 2 | 2 |
| Spline(KVFL) Nr | 2 | 2 | 2 | 2 | 2 | 2 | 2 |
| Parameter value | −1.57 | 0.06 | −1.45 | −0.87 | −2.05 | −0.52 | −0.69 |
| Spline(K1) Nr | 7 | 8 | 9 | 10 | 11 | 12 | 13 |
| Spline(K2) Nr | 2 | 2 | 2 | 2 | 2 | 2 | 2 |
| Spline(KVFL) Nr | 2 | 2 | 2 | 2 | 2 | 2 | 2 |
| Parameter value | −0.18 | −1.09 | −0.16 | 0.49 | 0.64 | 0.23 | 0.44 |

Refer to the prior example with regard to the individual designations.

For the first principal section of the rear face curvature, the following model parameters $\theta_{K1}$ were found (in dpt):

TABLE 6

| | | | | | |
|---|---|---|---|---|---|
| Spline(K1) Nr | 0 | 1 | 2 | 0 | 0 |
| Spline(K2) Nr | 0 | 0 | 0 | 1 | 2 |
| Spline(KVFL) Nr | 0 | 0 | 0 | 0 | 0 |
| Parameter value | −3.12 | 4.72 | 6.00 | 0.00 | 0.00 |
| Spline(K1) Nr | 0 | 0 | 1 | 2 | 1 |
| Spline(K2) Nr | 0 | 0 | 1 | 1 | 2 |
| Spline(KVFL) Nr | 1 | 2 | 1 | 1 | 1 |
| Parameter value | −2.35 | −4.41 | −0.01 | −0.01 | −0.02 |
| Spline(K1) Nr | 2 | 1 | 2 | 1 | 2 |
| Spline(K2) Nr | 2 | 1 | 1 | 2 | 2 |
| Spline(KVFL) Nr | 1 | 2 | 2 | 2 | 2 |
| Parameter value | 0.00 | 0.03 | −0.20 | 0.05 | −0.16 |

For the second principal section of the rear face curvature, the following model parameters $\theta_{K2}$ were found (in dpt):

TABLE 7

| | | | | | |
|---|---|---|---|---|---|
| Spline(K1) Nr | 0 | 1 | 2 | 0 | 0 |
| Spline(K2) Nr | 0 | 0 | 0 | 1 | 2 |
| Spline(KVFL) Nr | 0 | 0 | 0 | 0 | 0 |
| Parameter value | −5.48 | −0.01 | −0.18 | 2.15 | 3.90 |
| Spline(K1) Nr | 0 | 0 | 1 | 2 | 1 |
| Spline(K2) Nr | 0 | 0 | 1 | 1 | 2 |
| Spline(KVFL) Nr | 1 | 2 | 1 | 1 | 1 |
| Parameter value | −2.35 | −4.40 | −0.01 | −0.05 | 0.02 |
| Spline(K1) Nr | 2 | 1 | 2 | 1 | 2 |
| Spline(K2) Nr | 2 | 1 | 1 | 2 | 2 |
| Spline(KVFL) Nr | 1 | 2 | 2 | 2 | 2 |
| Parameter value | −0.03 | 0.00 | −0.17 | 0.05 | −0.16 |

In the following, using the ophthalmic lenses from the test data set it is shown that the method according to the invention, in comparison to a method according to the prior art, leads to ophthalmic lenses that possess nearly identical properties. For this purpose, the center thicknesses, the rear face curvatures, and the vertex powers of the lenses are plotted against one another, or the histograms of the deviations of these variables are calculated. The minimum center thicknesses and the minimum edge thicknesses are likewise complied with. FIG. 9A through 9J show the corresponding results.

In particular, FIG. 9A shows the correlation of the center thickness calculated according to the surface model and the center thickness of spectacle lenses according to the prior art (test spectacle lenses). The center thickness of spectacle lenses according to the prior art (in mm) is plotted on the abscissa of FIG. 9A, and the center thickness (in mm) calculated according to the model is plotted on the ordinate. FIG. 9B shows a histogram of the frequency of the residuals of the center thickness (in mm), meaning the deviations of the center thickness calculated according to the surface model from the center thickness of spectacle lenses according to the prior art.

FIG. 9C shows the correlation of the rear face curvature of the first principal section (rear face curvature 1) calculated according to the surface model and the rear face curvature 1 of spectacle lenses according to the prior art (test spectacle lenses). Rear face curvature 1 (in dpt) of spectacle lenses according to the prior art is plotted on the abscissa of FIG. 9C, and the rear face curvature 1 (in dpt) calculated according to the model is plotted on the ordinate. FIG. 9D shows a histogram of the frequency of the residuals of the rear face curvature 1 (in dpt), i.e. the deviations of the rear face curvature 1 calculated according to the model from the rear face curvature 1 of spectacle lenses according to the prior art.

FIG. 9E shows the correlation of the rear face curvature of the second principal section (rear face curvature 2) calculated according to the surface model and the rear face curvature 2 of spectacle lenses according to the prior art (test spectacle lenses). The rear face curvature 2 (in dpt) of spectacle lenses according to the prior art is plotted on the abscissa in FIG. 9E, and the rear face curvature 2 (in dpt) calculated according to the surface model is plotted on the ordinate. FIG. 9F shows a histogram of the frequency of the residuals of the rear face curvature 2 (in dpt), i.e. the deviations of the rear face curvature 2 calculated according to the model from the rear face curvature 2 of spectacle lenses according to the prior art.

FIG. 9G shows the correlation of the vertex power calculated according to the surface model in the first principal section (vertex power in the principal section 1) and the vertex power in the first principal section of spectacle lenses according to the prior art (test spectacle lenses). The vertex power in the principal section 1 (in dpt) of spectacle lenses according to the prior art is plotted on the abscissa of FIG. 9G, and the vertex power in the principal section 1 (in dpt) calculated according to the surface model is plotted on the ordinate. FIG. 9H shows a histogram of the frequency of the deviations (differences) of the vertex power in the principal section 1 calculated according to the model from the vertex power in the principal section 1 of spectacle lenses according to the prior art (in dpt).

FIG. 9I shows the correlation of the vertex power in the second principal section (vertex power in the principal section 2), calculated according to the surface model, and the vertex power in the second principal section of spectacle lenses (test spectacle lenses). The vertex power in the principal section 2 (in dpt) of spectacle lenses according to the prior art is plotted on the abscissa in FIG. 9I, and the vertex power in the principal section 2 (in dpt) calculated according to the surface model is plotted on the ordinate. FIG. 9J shows a histogram of the frequency of the deviations (differences) of the vertex power in the principal section 2, calculated according to the model, from the vertex power in the principal section 2 of spectacle lenses according to the prior art (in dpt).

FIG. 10 illustrates the compliance with minimum edge and center thickness. The center thickness (in mm) is plotted on the abscissa of FIG. 10, and the edge thickness (in mm) is plotted on the ordinate.

The calculation of the center thickness and of the two rear face curvatures, given arbitrary values of sphere sph and cylinder cyl, with the aid of the surface model is implemented as in the first example.

In the preceding, preferred embodiment variants of the invention were described using examples. Individual elements of the described embodiment variants are not limited to the respective embodiment variants. Rather, elements of the embodiment variants may be arbitrarily combined with one another, and new embodiment variants may thereby be created. Individual features may also be modified. To determine the surface model, other suitable functions, for example polynomial functions, may thus also be used instead of spline functions. Likewise, the number of model coefficients or model parameters (for example spline coefficients) may be changed. Furthermore, other representations of the surface to be calculated, other order parameter sets, target values, target functions, and/or optimization methods may be used.

The invention claimed is:

1. A computer-implemented method for determining a surface model trained to generalize across a plurality of prescriptions for calculating at least one surface of at least one ophthalmic lens, at least from one or both of a set of order parameters for the at least one ophthalmic lens and variables depending on the order parameters, the method comprising:

providing a training data set including a plurality of order parameter sets which respectively include values of at least a portion of the parameters necessary for ordering at least one ophthalmic lens;

providing at least one target value of at least one optical or geometric property of the at least one ophthalmic lens for each of the order parameter sets in the training data set;

providing at least one surface model parameterized by model parameters, with which, for given values of the model parameters, at least one surface of at least one ophthalmic lens can be calculated at least from an order parameter set and/or from variables depending on an order parameter set; and obtaining the surface model for the calculation of at least one surface of at least one ophthalmic lens, comprises:

determining optimized values for the model parameters of the at least one surface model using the provided target values, wherein the surface model is trained across the plurality of order parameter sets and is configured to directly calculate lens surface data without requiring iterative per-lens optimization.

2. The method according to claim 1, wherein the step of determining optimized values for the model parameters of the at least one surface model comprises:

optimizing the values of the model parameters of the at least one surface model, with an aim of minimizing or maximizing a target function for the model parameters of the at least one surface model, the target function depending at least on the model parameters and on the provided target values, wherein the target function for the model parameters for each of the order parameter sets contains at least one term which assumes a minimum or maximum when the provided target value of the at least one property of the at least one ophthalmic lens for the respective order parameter set coincides with the value of the same property of at least one lens which can be or is calculated with the surface model for given values of the model parameters of the surface model for the corresponding order parameter set.

3. The method according to claim 1, wherein the providing at least one surface model parameterized by model parameters comprises providing at least two surface models of mutually different complexity, wherein two surface models are of mutually different complexity when they differ in at least one of the following complexity-defining variables:

type and/or number of the order parameters used in the model;

type and/or number of the variables depending on order parameters;

number of model parameters; and type and/or strength of a regularization of the target function used in the optimization of the model parameters;

wherein the method further comprises:

providing a validation data set comprising a plurality of order parameter sets which respectively include values of at least a portion of the parameters necessary for ordering at least one ophthalmic lens; and providing at least one target value of at least one optical or geometric surface property of the at least one ophthalmic lens for each of the order parameter sets in the validation data set; and wherein the obtaining of the surface model for calculation of at least one surface of at least one ophthalmic lens further comprises:

calculating values of a validation target function, and/or values of the variables derived from the validation target function, for the provided surface models of differing complexity for given predefined optimized values of the model parameters of the respective surface models, wherein the validation target function depends on the provided target values and contains at least one term for each of the order parameter sets in the validation data set, which term assumes a minimum or maximum when the provided target value of the at least one property of the at least one ophthalmic lens for the respective order parameter set coincides with the value of the same property of at least one lens which can be or is calculated with the surface model for given optimized values of the model parameters of the surface model for the corresponding order parameter set; and selecting or determining the surface model for the calculation of at least one surface of at least one ophthalmic lens from the surface models of differing complexity that are parameterized with the optimized values of the model parameters, on the basis of the calculated values of the validation target function and/or using the values of the variables derived from the validation target function.

4. The method according to claim 3, wherein the at least one term of the target function for the model parameters and/or the validation target function comprises a difference or a convex or concave function of the difference between the at least one value of the at least one property of the lens, whose at least one surface can be or is calculated according to the surface model for an order parameter set, and the at least one target value for this property for the same order parameter set.

5. The method according to claim 1, wherein one or more terms of the target function for the model parameters and/or the validation target function form a target function for the optimization or calculation of at least one ophthalmic lens for a given order parameter set.

6. The method according to claim 1, wherein:

a measured value of the at least one optical or geometric surface property of an already produced ophthalmic lens whose order parameters are known; or a value which is or can be determined from one or more measured values of already produced ophthalmic lenses; or a nominal value of an ophthalmic lens to be produced, whose order parameters are at least partially known, is set as a target value of the at least one property of the at least ophthalmic lens.

7. The method according to claim 3, wherein:

the target function for the model parameters and/or the validation target function comprises a weighted or unweighted sum over all order parameter sets in the training data set and/or validation data set of the terms evaluated for each of the order parameter sets.

8. The method according to claim 1, wherein the sets of order parameters respectively comprise one or more of the following parameters:

at least one refraction value;

at least one geometric parameter or material parameter of the ophthalmic lens;

at least one geometric parameter of a spectacles frame;

at least one intended use of the ophthalmic lens;

at least one parameter for individualization and/or personalization of ophthalmic lenses;

at least one physiological property of a future wearer of the ophthalmic lens; and at least one biometric property of an eye or of eyes of the future wearer of the ophthalmic lens.

9. The method according to claim 1, wherein the at least one property is one of the following properties:

vertex depth of the at least one surface, and/or its derivative(s);

a surface parameter of the at least surface, or a combination of surface parameters;

an optical property of the ophthalmic lens and/or its gradient(s) and/or distribution;

width of at least one zone of good vision of the ophthalmic lens;

a geometric property of the ophthalmic lens;

a sense of discomfort, with respect to quality of vision and/or posture, of a wearer of the ophthalmic lenses calculated with the surface model;

a property of a visual perception of a wearer of the ophthalmic lenses calculated with the surface model;

geometric parameters or material parameters of the ophthalmic lens that are not contained in the order parameters; and geometric parameters of a spectacles frame that are not contained in the order parameters.

10. The method according to claim 1, wherein:

the at least one ophthalmic lens is one of the lenses of a pair of lenses;

the plurality of order parameter sets include respective values of at least a portion of the parameters necessary to order the pair of lenses; and the at least one property comprises a binocular property of the pair of lenses.

11. The method according to claim 1, wherein the surfaces generated by the surface model are a continuous or continuously derivable function of the order parameters in the order parameter sets.

12. The method according to claim 1, wherein:

the surface model is or comprises a linear or a non-linear regression model, wherein coefficients of the linear or non-linear regression model represent at least a portion of the model parameters of the surface model; and/or the surface model is or comprises a classification model; and/or the surface model is or comprises a neural network.

13. The method according to claim 1, wherein the optimization of the values for the model parameters comprises a regularization of the target function used in the optimization of the model parameters.

14. The method according to claim 1, further comprising:

providing a test data set comprising a plurality of order data sets;

providing at least one target value of the at least one property of the ophthalmic lens for each of the order parameter sets in the test data set; and testing the obtained surface model for calculation of at least one surface of at least one ophthalmic lens on the basis of the test data set.

15. A computer-implemented method for determining at least one surface of at least one ophthalmic lens, comprising:

providing an order parameter set for the at least one ophthalmic lens;

providing a function for calculating at least one surface of at least one ophthalmic lens from a set of order parameters for the at least one ophthalmic lens and/or from variables depending on the order parameters, wherein the function is a surface model determined according to the method according to claim 1, or is a function which approximately implements a mapping of an order parameter set to at least one surface of the at least one ophthalmic lens, which mapping can be implemented with a surface model determined according to claim 1; and determining surface data of the at least one surface of the at least one ophthalmic lens, with aid of the provided function, from the provided order parameter set.

16. The computer-implemented method according to claim 15, further comprising:

implementing a correction of the at least one surface calculated with the surface model, wherein the correction comprises an optimization of the surface calculated with the surface model, and/or a superposition with a superposition surface, and/or a correction of production-dependent deviations of the surfaces or of the properties of the ophthalmic lens, and/or an expansion of the surface to a diameter of the ophthalmic lens as is required for production.

17. The computer-implemented method according to claim 15, also comprising:

reviewing the at least one surface calculated with the surface model for fulfillment of desired or requested properties; and storing information about fulfillment or non-fulfillment of the requested properties together with at least a portion of the order parameter set used to determine the surface data, and/or with the at least one surface calculated and possibly corrected with the surface model, and/or with at least one value of the desired or requested properties that can be provided as a target value of properties during a determination of the surface model.

18. The computer-implemented method according to claim 15, further comprising:

adapting the model parameter of the surface model after determining and/or storing each of the surfaces calculated and possibly corrected with the surface model, or after a predefined number of surfaces calculated and possibly corrected with the surface model.

19. A non-transitory computer program product which, when is loaded into a memory of a computer and executed on the computer, has an effect that the computer implements a method according to claim 1.

20. A device for determining a surface model for calculating at least one surface of at least one ophthalmic lens from a set of order parameters for the at least one ophthalmic lens, and/or from the variables depending on the order parameters, wherein the device comprises a computing device which is designed to implement the method according to claim 1.

21. A device for determining at least one surface of at least one ophthalmic lens, wherein the device comprises a computing device which is designed to implement the computer-implemented method according to claim 15.

22. A method for producing an ophthalmic lens, comprising:

determining at least one surface of the at least one ophthalmic lens according to the computer-implemented method according to claim 15; and producing the ophthalmic lens with the at least one surface.

23. A device for producing an ophthalmic lens, comprising:

a device operable to determine at least one surface of an ophthalmic lens according to claim 21; and a production device operable to produce the ophthalmic lens with the at least one surface.

* * * * *